United States Patent
Casey et al.

(10) Patent No.: US 10,645,466 B2
(45) Date of Patent: May 5, 2020

(54) VIDEO FILE UNIVERSAL IDENTIFIER FOR METADATA RESOLUTION

(71) Applicant: CenturyLink Intellectual Property LLC, Denver, CO (US)

(72) Inventors: Steven M. Casey, Littleton, CO (US); Kiran Ganuthula, Aurora, CO (US); Mayur Kudtarkar, Lone Tree, CO (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 0 days.

(21) Appl. No.: 15/386,228

(22) Filed: Dec. 21, 2016

(65) Prior Publication Data

US 2017/0180823 A1 Jun. 22, 2017

Related U.S. Application Data

(63) Continuation of application No. 15/375,448, filed on Dec. 12, 2016.
(Continued)

(51) Int. Cl.
*H04N 21/8352* (2011.01)
*H04N 21/472* (2011.01)
(Continued)

(52) U.S. Cl.
CPC ......... *H04N 21/8352* (2013.01); *G06F 16/78* (2019.01); *H04N 21/2353* (2013.01);
(Continued)

(58) Field of Classification Search
CPC ................................................ H04N 21/4542
See application file for complete search history.

(56) References Cited

U.S. PATENT DOCUMENTS

2002/0054608 A1* 5/2002 Wan ................. H03M 13/2707
370/474
2002/0106190 A1* 8/2002 Nygren ................. H04N 21/21
386/353
(Continued)

FOREIGN PATENT DOCUMENTS

EP 2400757 12/2011
WO WO-2014101417 A1 * 7/2014 ........... H04N 21/454

OTHER PUBLICATIONS

WO/2014101417 English machine translation, Zhou, 2014.*
(Continued)

*Primary Examiner* — Fernando Alcon

(57) ABSTRACT

Novel tools and techniques are provided for implementing media content delivery. In some embodiments, a globally unique identifier ("GUID") associated with a particular media content might be embedded in headers of packets of a transport stream of the media content. When the transport stream is received by a user device, the GUID might enable retrieval of the necessary metadata (and/or updates of metadata) for enabling presentation of the media content. Alternatively or additionally, ratings or similar information can likewise be embedded in the headers of packets or I-frames of the transport stream, which enables a user (e.g., parent) to easily block or skip objectionable content from children who may be present. Alternatively or additionally, the transport stream may be combined with auxiliary data streams containing metadata and other associated auxiliary content to create a combined transport stream, to ensure no lost or corrupted media content during transmission.

34 Claims, 21 Drawing Sheets

Related U.S. Application Data

(60) Provisional application No. 62/270,209, filed on Dec. 21, 2015.

(51) Int. Cl.

| | | |
|---|---|---|
| *H04N 21/8543* | (2011.01) | |
| *H04N 21/854* | (2011.01) | |
| *H04N 21/278* | (2011.01) | |
| *H04N 21/236* | (2011.01) | |
| *H04N 21/235* | (2011.01) | |
| *H04N 21/84* | (2011.01) | |
| *H04N 21/845* | (2011.01) | |
| *G06F 16/78* | (2019.01) | |
| *G06F 16/74* | (2019.01) | |

(52) U.S. Cl.
CPC ..... *H04N 21/23605* (2013.01); *H04N 21/278* (2013.01); *H04N 21/47202* (2013.01); *H04N 21/47208* (2013.01); *H04N 21/84* (2013.01); *H04N 21/8455* (2013.01); *H04N 21/8543* (2013.01); *H04N 21/85403* (2013.01); *G06F 16/74* (2019.01)

(56) References Cited

U.S. PATENT DOCUMENTS

| | | | |
|---|---|---|---|
| 2003/0093790 A1* | 5/2003 | Logan | G06F 17/30265 |
| | | | 725/38 |
| 2004/0070593 A1 | 4/2004 | Neely | |
| 2004/0085342 A1* | 5/2004 | Williams | H04N 21/235 |
| | | | 715/723 |
| 2005/0022254 A1* | 1/2005 | Adolph | G11B 27/034 |
| | | | 725/135 |
| 2005/0028193 A1* | 2/2005 | Candelore | H04N 7/1675 |
| | | | 725/32 |
| 2005/0149557 A1* | 7/2005 | Moriya | G06F 17/30802 |
| 2005/0182792 A1 | 8/2005 | Israel et al. | |
| 2005/0210145 A1 | 9/2005 | Kim et al. | |
| 2006/0130119 A1* | 6/2006 | Candelore | H04N 7/163 |
| | | | 725/135 |
| 2006/0159109 A1* | 7/2006 | Lamkin | G06F 17/30174 |
| | | | 370/401 |
| 2006/0258324 A1 | 11/2006 | Vare et al. | |
| 2008/0059884 A1 | 3/2008 | Ellis | |
| 2009/0025045 A1* | 1/2009 | Kliegman | G06F 17/30056 |
| | | | 725/87 |
| 2009/0133054 A1 | 5/2009 | Boggie | |
| 2009/0249222 A1 | 10/2009 | Schmidt | |
| 2012/0311625 A1* | 12/2012 | Nandi | H04N 21/23418 |
| | | | 725/28 |
| 2016/0119657 A1* | 4/2016 | Sun | H04N 21/6118 |
| | | | 725/94 |
| 2016/0212501 A1* | 7/2016 | Master | H04N 21/8133 |
| 2017/0180821 A1 | 6/2017 | Casey et al. | |
| 2017/0180824 A1 | 6/2017 | Casey et al. | |
| 2019/0141111 A1* | 5/2019 | Gamble | H04L 67/025 |

OTHER PUBLICATIONS

U.S. Appl. No. 15/375,448; Non-Final Rejection dated Jun. 7, 2017; 22 pages.

U.S. Appl. No. 15/386,233; Non-Final Rejection dated Jun. 12, 2017; 20 pages.

\* cited by examiner

VIDEO FILE UNIVERSAL IDENTIFIER FOR METADATA RESOLUTION

CROSS-REFERENCES TO RELATED APPLICATIONS

This application is a continuation of U.S. patent application Ser. No. 15/375,448 (the "'448 application"), filed Dec. 12, 2016 by Steven M. Casey et al. and titled, "Video File Universal Identifier for Metadata Resolution", which claims priority to U.S. Patent Application Ser. No. 62/270,209 (the "'209 application"), filed Dec. 21, 2015 by Steven M. Casey et al. and titled, "Video File Universal Identifier for Metadata Resolution", both of which are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing media content delivery, and, in particular embodiments, to methods, systems, apparatus, and computer software for implementing metadata solutions for media content delivery.

BACKGROUND

Today, an average broadband video provider (e.g., a cable provider, satellite television provider, IPTV provider, etc.) processes 5,000-10,000 video on demand assets per month. This is set to double each year going forward. One of the main challenges is getting a complete video on demand ("VOD") package from the content provider that provides the video, so that the packet can be processed through the video provider's Content Management System. Today, the video provider has to have a complete VOD package; otherwise, the video provider will not be able to use the content. Unfortunately, the content providers do not always send all the necessary files, as specified by the Cable Lab 1.1 ADI specification. In such cases, the VOD package might become corrupted or might otherwise be unusable. This might result in resending of complete VOD package, which might tie up bandwidth and might take additional time in the process. Any updates to the metadata in the VOD package might also require resending of the complete updated VOD package.

Hence, there is a need for more robust and scalable solutions for implementing media content delivery, and, in particular embodiments, to methods, systems, apparatus, and computer software for implementing metadata solutions for media content delivery.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
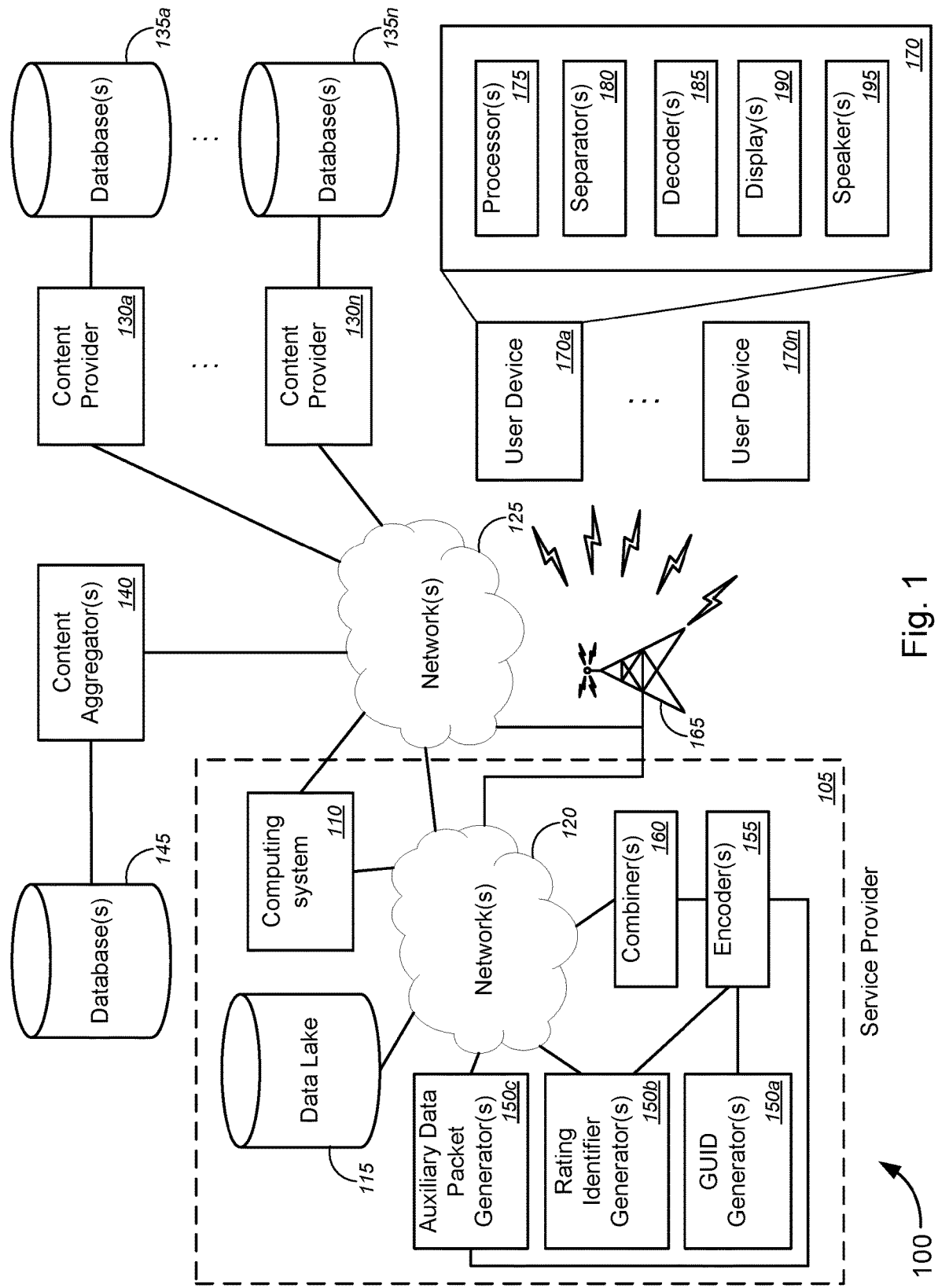
FIG. 1 is a schematic diagram illustrating a system for implementing metadata solutions for media content delivery, in accordance with various embodiments.

Various embodiments provide tools and techniques for implementing media content delivery, and, in particular embodiments, to methods, systems, apparatus, and computer software for implementing metadata solutions for media content delivery.

In some embodiments, a globally unique identifier ("GUID") associated with a particular media content might be embedded in headers of packets of a transport stream of the media content. When the transport stream (which may be sent without any metadata associated with presentation of the media content) is received by a user device, the GUID might enable retrieval of the necessary metadata (and/or updates of metadata) for enabling presentation of the media content to the user. Alternatively or additionally, ratings or similar information can likewise be embedded in the headers of packets or I-frames of the transport stream of the media content, which enables a user (e.g., parent) to easily block or skip objectionable content from children who may be present. Alternatively or additionally, the transport stream may be combined with auxiliary data streams containing metadata and other associated auxiliary content to create a combined transport stream, to ensure no lost or corrupted media content during transmission.

Various embodiments also define a way of managing a video on demand system by assigning unique identifiers for each video file and embedding this in the video file. One of the challenges today is video file information is in a separate file which can be lost or corrupted. If this happens, the video will not be usable. This means the content provider needs to send the video provider a new video file package before we can use it. This disclosure defines a system and method for embedding unique identifiers in the video file itself. Then, the metadata for the file can be updated and enhanced at any time without requiring the transmission of a new video file package.

This disclosure provides a system & method for removing the requirement for a metadata package being sent with the video file. Information associated with the metadata package (e.g., location information, unique identifier (e.g., GUID) of the video file, etc.) is inserted into the video package and the metadata is subsequently retrieved from cloud services or external metadata providers. This allows content providers to send only the video file and then the additional information can be retrieved from other systems. This reduces the video on demand ("VOD") package from 4-6 files down to only 1 file. The examples described below illustrate certain features of various embodiments in further detail. None of these examples should be considered limiting of the scope of the various embodiments. The described embodiments can be used with any type of video service (e.g., cable, satellite, IPTV, over-the-top video delivery, mobile apps, web delivery, and/or the like). In some embodiments, this method and system of sending the video file with the unique identifier without currently sending the metadata package itself might be similarly applicable to other media content, including, but not limited to, at least one of (other) video content, audio content, image content, or gaming content, and/or the like.

In alternative or additional embodiments, parental control functionality might be embedded in the MPEG2 header of an I-frame of a transport stream file, thereby allowing a parent to control filtering of video or other media content when a child may be present during presentation of the video or other media content. In some cases, a method might embed a marking to indicate scenes including, but not limited to, adult scenes, violent scenes, scenes containing foul language, scenes depicting drug use, scenes depicting people smoking, scenes depicting alcohol use in the video or other media content file. In some instances, the method might enable an individual (e.g., the parent) to set up the device to skip any unwanted (and/or objectionable) scenes altogether.

Alternatively or additionally, a method and system might encode and multiplex a transport stream of a video or media content with one or more auxiliary streams containing auxiliary data associated with the video or media content into a combined transport stream. For example, for VOD content, the auxiliary streams—which might include, without limitation, at least one of a preview content file, a poster image file, a box cover image file, an extensible markup language ("XML") document(s) containing metadata of the VOD content, or a document type definition ("DTD") document(s) defining a structure of the metadata of the VOD content, and/or the like—might be multiplexed with the transport stream containing the video or movie content file, to create a combined VOD transport stream. In this manner, the handling of multiple files constituting a complete VOD package can be eased, while minimizing the errors during transmission by combining the various streams into a single stream.

These various embodiments enable minimization or elimination of instances of lost or corrupted media content files during transmission, particular with separate yet concurrently sent streams that depend on each other (e.g., main video file in one stream sent with a separate set of metadata streams that contain metadata required for presentation of the main video file, and/or the like). Other benefits may also be realized, including, but not limited to, obviating the need to resend complete or near complete packages if there is an error or if there are updates, as updates can be retrieved separately in the case where unique identifiers are used to link the updates to the particular media content identified by the unique identifiers. The rating control or parental control may also be linked by the unique identifiers that identify the particular media content version.

These embodiments are described in greater detail below with respect to the non-limiting embodiments depicted by the figures, including, without limitation, additional advantages and implementations, and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, media content delivery technologies, and/or the like. In other aspects, certain embodiments, can improve the functioning of user equipment or systems themselves (e.g., media content delivery systems, etc.), for example, by embedding a globally unique identifier in a header of packets of a transport stream of a particular media content and by sending the transport stream (in some cases, without having to send any metadata associated with presentation of the particular media content) to one or more user devices and by enabling, at the user devices, retrieval of the metadata from a network based on information in the globally unique identifier, and/or by embedding ratings information in a header of packets and/or I-frames of a transport stream of a particular media content and by enabling a user (e.g., a parent) to block or skip objectionable portions of the particular media content (particularly when a child may be present during presentation of the particular media content), and/or by combining or multiplexing a transport stream of the particular media content with one or more additional elementary streams (or auxiliary data streams) that contain metadata and/or other auxiliary content associated with the particular media content into a single combined transport stream and sending the single combined transport stream to the one or more user devices, and/or the like.

In particular, to the extent any abstract concepts are present in the various embodiments, those concepts can be implemented as described herein by devices, software, systems, and methods that involve specific novel functionality (e.g., steps or operations), such as embedding a globally unique identifier in a header of packets of a transport stream of a particular media content and sending the transport stream (in some cases, without having to send any metadata associated with presentation of the particular media content) to one or more user devices and enabling, at the user devices, retrieval of the metadata from a network based on information in the globally unique identifier, and/or embedding ratings information in a header of packets and/or I-frames of a transport stream of a particular media content and enabling a user (e.g., a parent) to block or skip objectionable portions of the particular media content (particularly when a child may be present during presentation of the particular media content), and/or combining or multiplexing a transport stream of the particular media content with one or more additional elementary streams (or auxiliary data streams) that contain metadata and/or other auxiliary content associated with the particular media content into a single combined transport stream and sending the single combined transport stream to the one or more user devices, and/or the like, which improves the efficacy of media content delivery, while minimizing or eliminating occurrences of lost or corrupted media content streams or files, and/or which improves ability by users (e.g., parents) to filter or block objectionable content when children are present, and/or the like, to name a few examples, that extend beyond mere conventional computer processing operations. These functionalities can produce tangible results outside of the implementing computer system, including, merely by way of example, improved functionality of the content delivery systems (e.g., faster delivery of GUID-only transport streams that later retrieve the necessary metadata files; fewer instances of corrupted files and fewer instances of resending the media content packages for the GUID-only embodiments as well as for the combined transport stream embodiments), improved customer experience with media content presentation (as there will be fewer corrupted files and fewer instances of having to re-download media content packages), improved parental control implementation (with the ratings information embedded in the media content transport stream itself), and/or the like, at least some of which may be observed or measured by customers and/or service providers.

Metadata Globally Unique Identifier ("GUID") in Media Content Transport Stream

In an aspect, a method might comprise generating, with a first identifier generator, a globally unique identifier ("GUID") that is specific to and uniquely identifies a first media content and encoding, with an encoder, the generated GUID in a header of a transport stream of the first media content. The method might further comprise sending, with a computing system of a service provider, the transport stream of the first media content to a user device associated with a user, without concurrently sending metadata associated with presenting the first media content.

In some embodiments, the first media content might comprise video on demand ("VOD") content. In some cases, sending the transport stream of the first media content to the user device associated with the user might comprise sending, with the computing system of the service provider, the transport stream of the VOD content to the user device associated with the user, without concurrently sending auxiliary data associated with the VOD content. The auxiliary data associated with the VOD content might comprise at least one of a preview content file, a poster image file, a box cover image file, an extensible markup language ("XML") document containing metadata of the VOD content, or a document type definition ("DTD") document defining a structure of the metadata of the VOD content, and/or the like. According to some embodiments, the method might further comprise decoding, with a decoder communicatively coupled to the user device, the transport stream of the VOD content to access the header of the transport stream and to access the VOD content, wherein the GUID further comprises information regarding locations of the XML document and the DTD document within a network associated with a content provider of the VOD content; retrieving, with the user device, the XML document and the DTD document of the VOD content based on the information regarding the locations of the XML document and the DTD document within the network associated with the content provider of the VOD content that is contained in the GUID that is encoded in the header of the transport stream; presenting, with the user device and on a display screen and through one or more speakers, the VOD content to the user based at least in part on the metadata contained in the retrieved XML document of the VOD content that is defined in the retrieved DTD document of the VOD content.

In some instances, the method might further comprise retrieving, with the user device, at least one of updates of the metadata, up-to-date program-related information associated with the VOD content, updated program-related information associated with the VOD content, or additional program-related information associated with the VOD content, and/or the like, by retrieving one or more second XML documents and one or more second DTD documents of the VOD content based on the information regarding locations of the XML document and the DTD document within the network associated with the content provider of the VOD content that is contained in the GUID, the one or more second XML documents and the one or more second DTD documents having respectively replaced the XML document and the DTD document at the locations of the XML document and the DTD document within the network associated with the content provider of the VOD content. In some cases, presenting the VOD content to the user might comprise presenting, with the user device and on the display screen and through the one or more speakers, the VOD content to the user based at least in part on the at least one of the updates of the metadata, the up-to-date program-related information associated with the VOD content, the updated program-related information associated with the VOD content, or the additional program-related information associated with the VOD content, and/or the like.

In some cases, the information regarding locations of the XML document and the DTD document within the network might comprise information regarding one or more locations of one or more second XML documents and one or more second DTD documents of the VOD content. The method might further comprise retrieving, with the user device, at least one of updates of the metadata, up-to-date program-related information associated with the VOD content, updated program-related information associated with the VOD content, or additional program-related information associated with the VOD content, by retrieving the one or more second XML documents and the one or more second DTD documents of the VOD content via an application programming interface ("API") between the user device and the one or more locations of the one or more second XML documents and the one or more second DTD documents within the network associated with the content provider of the VOD content. In some cases, presenting the VOD content to the user might comprise presenting, with the user device and on the display screen and through the one or more speakers, the VOD content to the user based at least in part on the at least one of the updates of the metadata, the up-to-date program-related information associated with the VOD content, the updated program-related information associated with the VOD content, or the additional program-related information associated with the VOD content, and/or the like.

According to some embodiments, the transport stream of the VOD content might be a MPEG2 transport stream. In some instances, encoding the generated GUID in the header of the transport stream of the first media content might comprise encoding, with the encoder, the generated GUID in at least one of an adaptation field, an optional data field, or a private data field of the header of the MPEG2 transport stream of the VOD content, and/or the like. Alternatively, the transport stream of the VOD content might be a MPEG4 transport stream.

Merely by way of example, in some cases, the first media content might comprise at least one of video content, audio content, image content, or gaming content, and/or the like. The method might, in some embodiments, further comprise decoding, with a decoder communicatively coupled to the user device, the transport stream of the first media content to access the header of the transport stream and to access the first media content, wherein the GUID further comprises information regarding location of metadata of the first media content within at least one of a network associated with a content provider of the first media content, one or more networks associated with other metadata providers, or one or more networks associated with a cloud service provider, and/or the like; retrieving, with the user device, the metadata of the first media content based on the information regarding the location of the metadata of the first media content that is contained in the GUID that is encoded in the header of the transport stream; and presenting, with the user device, the first media content to the user based at least in part on the retrieved metadata of the first media content.

In some embodiments, the GUID might uniquely represent characteristics of the first media content. The characteristics might comprise at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

In another aspect, a media content encoding system might comprise a first identifier generator, an encoder, and a computing system of a service provider. The first identifier generator might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first identifier generator to: generate a globally unique identifier ("GUID") that is specific to and uniquely identifies a first media content; and send the generated GUID to the encoder.

The encoder might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the encoder to: encode the generated GUID in a header of a transport stream of the first media content; and send the resultant transport stream of the first media content to the computing system of the service provider.

The computing system might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the computing system to: receive the transport stream of the first media content; and send the transport stream of the first media content to a user device associated with a user, without concurrently sending metadata associated with presenting the first media content.

According to some embodiments, the first media content might comprise video on demand ("VOD") content. In some instances, sending the transport stream of the first media content to the user device associated with the user might comprise sending, with the computing system of the service provider, the transport stream of the VOD content to the user device associated with the user, without concurrently sending auxiliary data associated with the VOD content. The auxiliary data associated with the VOD content might comprise at least one of a preview content file, a poster image file, a box cover image file, an extensible markup language ("XML") document containing metadata of the VOD content, or a document type definition ("DTD") document defining a structure of the metadata of the VOD content, and/or the like. In some cases, the transport stream of the VOD content might be a MPEG2 transport stream, and encoding the generated GUID in the header of the transport stream of the first media content might comprise encoding, with the encoder, the generated GUID in at least one of an adaptation field, an optional data field, or a private data field of the header of the MPEG2 transport stream of the VOD content, and/or the like. Alternatively, the transport stream of the VOD content might be a MPEG4 transport stream.

In some embodiments, the first media content might comprise at least one of video content, audio content, image content, or gaming content, and/or the like. In some cases, the second set of instructions, when executed by the at least one second processor, might further cause the encoder to: encode the at least one of video content, audio content, image content, or gaming content, and/or the like in a payload data portion of the transport stream of the first media content.

In some instances, the GUID might uniquely represent characteristics of the first media content. The characteristics might comprise at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

In yet another aspect, a method might comprise receiving, with a user device, a transport stream of a first media content, the transport stream comprising a header and a payload data portion, the payload data portion comprising the first media content and the header comprising a globally unique identifier ("GUID") that is specific to and uniquely identifies the first media content. The method might also comprise decoding, with a decoder communicatively coupled to the user device, the transport stream of the first media content to access the header of the transport stream and to access the first media content. The GUID might further comprise information regarding location of metadata of the first media content within at least one of a network associated with a content provider of the first media content, one or more networks associated with other metadata providers, or one or more networks associated with a cloud service provider. The method might further comprise retrieving, with the user device, the metadata of the first media content based on the information regarding the location of the metadata of the first media content that is contained in the GUID that is encoded in the header of the transport stream, and presenting, with the user device, the first media content to the user based at least in part on the retrieved metadata of the first media content.

In some embodiments, the first media content might comprise video on demand ("VOD") content. The transport stream of the VOD content might be received at the user device associated with the user, without concurrently receiving auxiliary data associated with the VOD content. The auxiliary data associated with the VOD content might comprise at least one of a preview content file, a poster image file, a box cover image file, an extensible markup language ("XML") document containing metadata of the VOD content, or a document type definition ("DTD") document defining a structure of the metadata of the VOD content, and/or the like.

In some instances, the method might further comprise decoding the transport stream of the first media content to access the header of the transport stream and to access the first media content comprises decoding, with the decoder, the transport stream of the VOD content to access the header of the transport stream and to access the VOD content, wherein the GUID further comprises information regarding locations of the XML document and the DTD document within a network associated with a content provider of the VOD content; retrieving metadata of the first media content based on the information regarding the location of the metadata of the first media content comprises retrieving, with the user device, the XML document and the DTD document of the VOD content based on the information regarding the locations of the XML document and the DTD document within the network associated with the content provider of the VOD content that is contained in the GUID that is encoded in the header of the transport stream; and presenting the first media content to the user based at least in part on the retrieved metadata of the first media content comprises presenting, with the user device and on a display screen and through one or more speakers, the VOD content to the user based at least in part on the metadata contained in the retrieved XML document of the VOD content that is defined in the retrieved DTD document of the VOD content.

In some cases, the method might further comprise retrieving, with the user device, at least one of updates of the metadata, up-to-date program-related information associated with the VOD content, updated program-related information associated with the VOD content, or additional program-related information associated with the VOD content, and/or the like, by retrieving one or more second XML documents and one or more second DTD documents of the VOD content based on the information regarding locations of the XML document and the DTD document within the network associated with the content provider of the VOD content that is contained in the GUID, the one or more second XML documents and the one or more second DTD documents having respectively replaced the XML document and the DTD document at the locations of the XML document and the DTD document within the network associated with the content provider of the VOD content. In some instances, presenting the VOD content to the user might comprise presenting, with the user device and on the display screen and through the one or more speakers, the VOD content to the user based at least in part on the at least one of the updates of the metadata, the up-to-date program-related information associated with the VOD content, the updated program-related information associated with the VOD content, or the additional program-related information associated with the VOD content, and/or the like. According to some embodiments, the transport stream of the VOD content might be a MPEG2 transport stream, and the GUID might be contained in at least one of an adaptation field, an optional data field, or a private data field of the header of the MPEG2 transport stream of the VOD content, and/or the like. Alternatively, the transport stream of the VOD content might be a MPEG4 transport stream.

Merely by way of example, in some embodiments, the first media content might comprise at least one of video content, audio content, image content, or gaming content, and/or the like. In some cases, the GUID might uniquely represent characteristics of the first media content, and the characteristics might comprise at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

In still another aspect, a media content decoding system might comprise a user device and a decoder communicatively coupled to the user device. The user device might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the user device to: receive a transport stream of a first media content, the transport stream comprising a header and a payload data portion, the payload data portion comprising the first media content and the header comprising a globally unique identifier ("GUID") that is specific to and uniquely identifies the first media content.

The decoder might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the decoder to: decode the transport stream of the first media content to access the header of the transport stream and to access the first media content, wherein the GUID further comprises information regarding location of metadata of the first media content within at least one of a network associated with a content provider of the first media content, one or more networks associated with other metadata providers, or one or more networks associated with a cloud service provider.

The first set of instructions, when executed by the at least one first processor, might further cause the user device to: retrieve the metadata of the first media content based on the information regarding the location of the metadata of the first media content that is contained in the GUID that is encoded in the header of the transport stream; and present the first media content to the user based at least in part on the retrieved metadata of the first media content.

According to some embodiments, the first media content might comprise video on demand ("VOD") content, and the transport stream of the VOD content might be received at the user device associated with the user, without concurrently receiving auxiliary data associated with the VOD content. The auxiliary data associated with the VOD content might comprise at least one of a preview content file, a poster image file, a box cover image file, an extensible markup language ("XML") document containing metadata of the VOD content, or a document type definition ("DTD") document defining a structure of the metadata of the VOD content, and/or the like.

In some embodiments, decoding the transport stream of the first media content to access the header of the transport stream and to access the first media content might comprise decoding, with the decoder, the transport stream of the VOD content to access the header of the transport stream and to access the VOD content, and the GUID might further comprise information regarding locations of the XML document and the DTD document within a network associated with a content provider of the VOD content. In some cases, retrieving the metadata of the first media content based on the information regarding the location of the metadata of the first media content might comprise retrieving, with the user device, the XML document and the DTD document of the VOD content based on the information regarding the locations of the XML document and the DTD document within the network associated with the content provider of the VOD content that is contained in the GUID that is encoded in the header of the transport stream. In some instances, presenting the first media content to the user based at least in part on the retrieved metadata of the first media content might comprise presenting, with the user device and on a display screen and through one or more speakers, the VOD content to the user based at least in part on the metadata contained in the retrieved XML document of the VOD content that is defined in the retrieved DTD document of the VOD content.

According to some embodiments, the first set of instructions, when executed by the at least one first processor, might further cause the user device to: retrieve at least one of updates of the metadata, up-to-date program-related information associated with the VOD content, updated program-related information associated with the VOD content, or additional program-related information associated with the VOD content, and/or the like, by retrieving one or more second XML documents and one or more second DTD documents of the VOD content based on the information regarding locations of the XML document and the DTD document within the network associated with the content provider of the VOD content that is contained in the GUID, the one or more second XML documents and the one or more second DTD documents having respectively replaced the XML document and the DTD document at the locations of the XML document and the DTD document within the network associated with the content provider of the VOD content. In some cases, presenting the VOD content to the user might comprise presenting, with the user device and on the display screen and through the one or more speakers, the VOD content to the user based at least in part on the at least one of the updates of the metadata, the up-to-date program-related information associated with the VOD content, the updated program-related information associated with the VOD content, or the additional program-related information associated with the VOD content, and/or the like.

In some instances, the transport stream of the VOD content might be a MPEG2 transport stream, and the GUID might be contained in at least one of an adaptation field, an optional data field, or a private data field of the header of the MPEG2 transport stream of the VOD content, and/or the like. Alternatively, the transport stream of the VOD content might be a MPEG4 transport stream.

Merely by way of example, in some embodiments, the first media content might comprise at least one of video content, audio content, image content, or gaming content, and/or the like. In some cases, the GUID might uniquely represent characteristics of the first media content, and the characteristics might comprise at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

According to some embodiments, the user device might comprise the decoder.

Audience Appropriate Information ("AAI") in Media Content Transport Stream

In an aspect, a method might comprise encoding, with an encoder, audience appropriateness information regarding each of one or more portions of a first media content in a header of a transport stream of the first media content. The method might further comprise sending, with a computing system of a service provider, the transport stream of the first media content to a user device associated with a user.

In some embodiments, the audience appropriateness information regarding each of the one or more portions of the first media content might comprise at least one of ratings information for each of the one or more portions of the first media content, locations of any inappropriate portions in the first media content, length of any inappropriate portions, or location of an appropriate portion of the first media content to skip to for each inappropriate portion of the first media content, and/or the like. The inappropriate portions might each comprise at least one of a portion containing adult content, a portion containing disturbing subject matter, a portion containing violence, a portion containing foul language, a portion containing drug use, a portion containing people smoking, or a portion containing alcohol use, and/or the like.

In some cases, encoding the audience appropriateness information regarding each of the one or more portions of the first media content might comprise encoding, with the encoder, audience appropriateness information regarding each of the one or more portions of the first media content in a header of each I-frame of the transport stream of the first media content. In some instances, the method might further comprise generating, with a rating identifier generator, the audience appropriateness information for each of the one or more portions of the first media content.

According to some embodiments, the first media content might comprise video on demand ("VOD") content, and the one or more portions of the first media content might comprise one or more scenes of the VOD content. The method might further comprise decoding, with a decoder communicatively coupled to the user device, the transport stream of the VOD content to access the header of the transport stream and to access the VOD content; providing, with the user device, options to the user associated with user preferences regarding ratings levels of one or more scenes in the VOD content based at least in part on the audience appropriateness information for each of the one or more portions of the first media content that is contained in the decoded header of the transport stream; receiving, with the user device, user input in response to providing the options to the user associated with the user preferences; and presenting, with the user device and on a display screen and through one or more speakers, the VOD content to the user based at least in part on the user input and based at least in part on the audience appropriateness information for each of the one or more portions of the VOD content that is contained in the decoded header of the transport stream.

In some instances, the audience appropriateness information might comprise a globally unique identifier ("GUID") that is specific to and uniquely identifies the first media content. The GUID might further comprise information regarding locations of the XML document and the DTD document within a network associated with a content provider of the VOD content, and the XML document might comprise metadata comprising at least one of ratings information for each of the one or more portions of the first media content, locations of any inappropriate portions in the first media content, length of any inappropriate portions, or location of an appropriate portion of the first media content to skip to for each inappropriate portion of the first media content, and/or the like. In some cases, the method might further comprise retrieving, with the user device, the XML document and the DTD document of the VOD content based on the information regarding the locations of the XML document and the DTD document within the network associated with the content provider of the VOD content that is contained in the GUID that is encoded in the header of the transport stream. In some instances, presenting the VOD content to the user might comprise presenting, with the user device and on a display screen and through one or more speakers, the VOD content to the user based at least in part on the user input and at least in part on the audience appropriateness information for each of the one or more portions of the first media content as contained in the metadata contained in the retrieved XML document of the VOD content.

In some embodiments, the GUID might uniquely represent characteristics of the VOD content. The characteristics might comprise at least one of a VOD package from a particular content provider, name of the particular content provider, title name of the VOD content, one or more actor names associated with the VOD content, series name of the VOD content, release year of the VOD content, run time of the VOD content, rating of the VOD content, issued-to information of the VOD content, director's cut of the VOD content, extended edition of the VOD content, anniversary edition of the VOD content, special edition of the VOD content, or preview of the VOD content, and/or the like. In some cases, the transport stream of the VOD content might be a MPEG2 transport stream, and encoding the audience appropriateness information might comprise encoding, with the encoder, the audience appropriateness information regarding each of the one or more portions of the VOD content in at least one of an adaptation field, an optional data field, or a private data field of the header of the MPEG2 transport stream of the VOD content, and/or the like.

According to some embodiments, the first media content might comprise at least one of video content, audio content, image content, or gaming content, and/or the like.

In another aspect, a media content encoding system might comprise a rating identifier generator, an encoder, and a computing system of a service provider. The rating identifier generator might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the rating identifier generator to: generate audience appropriateness information for each of one or more portions of a first media content; and send the generated audience appropriateness information for each of the one or more portions of the first media content to the encoder.

The encoder might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the encoder to: encode the audience appropriateness information for each of the one or more portions of the first media content in a header of a transport stream of the first media content; and send the resultant transport stream of the first media content to the computing system of the service provider.

The computing system might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the computing system to: receive the transport stream of the first media content; and send the transport stream of the first media content to a user device associated with a user.

According to some embodiments, the audience appropriateness information regarding each of the one or more portions of the first media content might comprise at least one of ratings information for each of the one or more portions of the first media content, locations of any inappropriate portions in the first media content, length of any inappropriate portions, or location of an appropriate portion of the first media content to skip to for each inappropriate portion of the first media content, and/or the like. The inappropriate portions might each comprise at least one of a portion containing adult content, a portion containing disturbing subject matter, a portion containing violence, a portion containing foul language, a portion containing drug use, a portion containing people smoking, or a portion containing alcohol use, and/or the like.

In some cases, encoding the audience appropriateness information regarding each of the one or more portions of the first media content might comprise encoding, with the encoder, audience appropriateness information regarding each of the one or more portions of the first media content in a header of each I-frame of the transport stream of the first media content.

In some embodiments, the first media content might comprise video on demand ("VOD") content, and the one or more portions of the first media content might comprise one or more scenes of the VOD content. In some instances, the audience appropriateness information might comprise a globally unique identifier ("GUID") that is specific to and uniquely identifies the first media content. The GUID might further comprise information regarding locations of the XML document and the DTD document within a network associated with a content provider of the VOD content. The XML document might comprise metadata comprising at least one of ratings information for each of the one or more portions of the first media content, locations of any inappropriate portions in the first media content, length of any inappropriate portions, or location of an appropriate portion of the first media content to skip to for each inappropriate portion of the first media content, and/or the like. According to some embodiments, the transport stream of the VOD content might be a MPEG2 transport stream, and encoding the audience appropriateness information might comprise encoding, with the encoder, the audience appropriateness information regarding each of the one or more portions of the VOD content in at least one of an adaptation field, an optional data field, or a private data field of the header of the MPEG2 transport stream of the VOD content, and/or the like. Alternatively, the transport stream of the VOD content might be a MPEG4 transport stream.

Merely by way of example, according to some embodiments, the first media content comprises at least one of video content, audio content, image content, or gaming content, and/or the like. The second set of instructions, when executed by the at least one second processor, might further cause the encoder to: encode the at least one of video content, audio content, image content, or gaming content, and/or the like in a payload data portion of the transport stream of the first media content.

In yet another aspect, a method might comprise receiving, with a user device, a transport stream of a first media content, the transport stream comprising a header and a payload data portion, the payload data portion comprising the first media content and the header comprising audience appropriateness information regarding each of one or more portions of the first media content; and decoding, with a decoder communicatively coupled to the user device, the transport stream of the first media content to access the header of the transport stream and to access the first media content. The method might also comprise providing, with the user device, options to the user associated with user preferences regarding ratings levels of one or more portions of the first media content based at least in part on the audience appropriateness information for each of the one or more portions of the first media content that is contained in the decoded header of the transport stream; and receiving, with the user device, user input in response to providing the options to the user associated with the user preferences. The method might further comprise presenting, with the user device, the first media content to the user based at least in part on the user input and based at least in part on the audience appropriateness information for each of the one or more portions of the first media content that is contained in the decoded header of the transport stream.

In some embodiments, the audience appropriateness information might comprise a globally unique identifier ("GUID") that is specific to and uniquely identifies the first media content. The GUID might further comprise information regarding locations of the XML document and the DTD document within a network associated with a content provider of the first media content, and the XML document might comprise metadata comprising at least one of ratings information for each of the one or more portions of the first media content, locations of any inappropriate portions in the first media content, length of any inappropriate portions, or location of an appropriate portion of the first media content to skip to for each inappropriate portion of the first media content, and/or the like.

In some instances, the method might further comprise retrieving, with the user device, the XML document and the DTD document of the first media content based on the information regarding the locations of the XML document and the DTD document within the network associated with the content provider of the first media content that is contained in the GUID that is encoded in the header of the transport stream. In some cases, presenting the first media content to the user might comprise presenting, with the user device, the first media content to the user based at least in part on the user input and at least in part on the audience appropriateness information for each of the one or more portions of the first media content as contained in the metadata contained in the retrieved XML document of the first media content.

In some embodiments, the GUID might uniquely represent characteristics of the first media content. The characteristics might comprise at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

According to some embodiments, the first media content might comprise at least one of video content, audio content, image content, or gaming content, and/or the like. Alternatively, the first media content might comprise video on demand ("VOD") content, the transport stream of the VOD content might be a MPEG2 transport stream, and encoding the generated audience appropriateness information in the header of the transport stream of the first media content might comprise encoding, with the encoder, the generated audience appropriateness information in at least one of an adaptation field, an optional data field, or a private data field of the header of the MPEG2 transport stream of the VOD content, and/or the like. Alternatively, the transport stream of the VOD content might be a MPEG4 transport stream.

In still another aspect, a media content decoding system might comprise a user device and a decoder communicatively coupled to the user device. The user device might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the user device to: receive a transport stream of a first media content, the transport stream comprising a header and a payload data portion, the payload data portion comprising the first media content and the header comprising audience appropriateness information regarding each of one or more portions of the first media content. The decoder might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the decoder to: decode the transport stream of the first media content to access the header of the transport stream and to access the first media content. The first set of instructions, when executed by the at least one first processor, might further cause the user device to: provide options to the user associated with user preferences regarding ratings levels of one or more portions of the first media content based at least in part on the audience appropriateness information for each of the one or more portions of the first media content that is contained in the decoded header of the transport stream; receive user input in response to providing the options to the user associated with the user preferences; and present the first media content to the user based at least in part on the user input and based at least in part on the audience appropriateness information for each of the one or more portions of the first media content that is contained in the decoded header of the transport stream.

In some cases, the audience appropriateness information might comprise a globally unique identifier ("GUID") that is specific to and uniquely identifies the first media content. The GUID might further comprise information regarding locations of the XML document and the DTD document within a network associated with a content provider of the first media content. The XML document might comprise metadata comprising at least one of ratings information for each of the one or more portions of the first media content, locations of any inappropriate portions in the first media content, length of any inappropriate portions, or location of an appropriate portion of the first media content to skip to for each inappropriate portion of the first media content, and/or the like.

In some embodiments, the first set of instructions, when executed by the at least one first processor, might further cause the user device to retrieve the XML document and the DTD document of the first media content based on the information regarding the locations of the XML document and the DTD document within the network associated with the content provider of the first media content that is contained in the GUID that is encoded in the header of the transport stream. In some instances, presenting the first media content to the user might comprise presenting, with the user device, the first media content to the user based at least in part on the user input and at least in part on the audience appropriateness information for each of the one or more portions of the first media content as contained in the metadata contained in the retrieved XML document of the first media content.

According to some embodiments, the GUID might uniquely represents characteristics of the first media content. The characteristics might comprise at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

Merely by way of example, in some embodiments, the first media content might comprise at least one of video content, audio content, image content, or gaming content, and/or the like. Alternatively, the first media content might comprise video on demand ("VOD") content, the transport stream of the VOD content might be a MPEG2 transport stream, and encoding the generated audience appropriateness information in the header of the transport stream of the first media content might comprise encoding, with the encoder, the generated audience appropriateness information in at least one of an adaptation field, an optional data field, or a private data field of the header of the MPEG2 transport stream of the VOD content, and/or the like. Alternatively, the transport stream of the VOD content might be a MPEG4 transport stream.

Auxiliary Data in Additional Elementary Streams Combined with Media Content Transport Stream In an aspect, a method might comprise generating, with an auxiliary data packet generator, one or more auxiliary data streams containing one or more auxiliary data that are associated with a first media content; and encoding, with an encoder, the generated one or more auxiliary data streams as one or more additional elementary streams to a transport stream of the first media content. The method might further comprise combining, with a combiner, the one or more additional elementary streams and the transport stream of the first media content to create a combined transport stream of the first media content; and sending, with a computing system of a service provider, the combined transport stream of the first media content to a user device associated with a user.

In some embodiments, the first media content might comprise video on demand ("VOD") content. In some cases, the one or more auxiliary data associated with the VOD content might comprise at least one of a preview content file, a poster image file, a box cover image file, an extensible markup language ("XML") document containing metadata of the VOD content, or a document type definition ("DTD") document defining a structure of the metadata of the VOD content, and/or the like.

According to some embodiments, the method might further comprise generating, with a first identifier generator, a globally unique identifier ("GUID") that is specific to and uniquely identifies the first media content. In some cases, the method might further comprise decoding, with a decoder communicatively coupled to the user device, the transport stream of the first media content to access the header of the transport stream and to access the first media content, wherein the GUID further comprises information regarding location of metadata of the first media content within at least one of a network associated with a content provider of the first media content, one or more networks associated with other metadata providers, or one or more networks associated with a cloud service provider; retrieving, with the user device, the metadata of the first media content based on the information regarding the location of the metadata of the first media content that is contained in the GUID that is encoded in the header of the transport stream, wherein the metadata comprises at least one of updates to the one or more auxiliary data, up-to-date media content-related information associated with the first media content, updated media content-related information associated with the first media content, or additional media content-related information associated with the first media content; and presenting, with the user device, the first media content to the user based at least in part on the retrieved metadata of the first media content.

In some instances, the GUID might uniquely represent characteristics of the first media content. The characteristics might comprise at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

Merely by way of example, in some cases, the first media content might comprise at least one of video content, audio content, image content, or gaming content, and/or the like. According to some embodiments, the combiner might be or might comprise a multiplexer.

In another aspect, a media content encoding system might comprise an auxiliary data packet generator, an encoder, a combiner, and a computing system of a service provider. The auxiliary data packet generator might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the auxiliary data packet generator to: generate one or more auxiliary data streams containing one or more auxiliary data that are associated with a first media content; and send the generated one or more auxiliary data streams to an encoder.

The encoder might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the encoder to: encode the generated one or more auxiliary data streams as one or more additional elementary streams to a transport stream of the first media content; and send the one or more additional elementary streams to a combiner.

The combiner might comprise at least one third processor and a third non-transitory computer readable medium communicatively coupled to the at least one third processor. The third non-transitory computer readable medium might have stored thereon computer software comprising a third set of instructions that, when executed by the at least one third processor, causes the combiner to: receive a transport stream of the first media content; receive the one or more additional elementary streams; combine the one or more additional elementary streams and the transport stream of the first media content to create a combined transport stream of the first media content; and send the combined transport stream of the first media content to a computing system of a service provider.

The computing system might comprise at least one fourth processor and a fourth non-transitory computer readable medium communicatively coupled to the at least one fourth processor. The fourth non-transitory computer readable medium might have stored thereon computer software comprising a fourth set of instructions that, when executed by the at least one fourth processor, causes the computing system to: receive the combined transport stream of the first media content; and send the combined transport stream of the first media content to a user device associated with a user.

According to some embodiments, the first media content might comprise video on demand ("VOD") content. In some instances, the one or more auxiliary data associated with the VOD content might comprise at least one of a preview content file, a poster image file, a box cover image file, an extensible markup language ("XML") document containing metadata of the VOD content, or a document type definition ("DTD") document defining a structure of the metadata of the VOD content, and/or the like.

In some embodiments, the media content encoding system might further comprise a first identifier generator comprising at least one fifth processor and a fifth non-transitory computer readable medium communicatively coupled to the at least one fifth processor. The fifth non-transitory computer readable medium might have stored thereon computer software comprising a fifth set of instructions that, when executed by the at least one fifth processor, causes the first identifier generator to: generate a globally unique identifier ("GUID") that is specific to and uniquely identifies the first media content; and send the generated GUID to the encoder.

The second set of instructions, when executed by the at least one second processor, might further cause the encoder to: encode the generated GUID in a header of a transport stream of the first media content; and send the resultant transport stream of the first media content to the combiner for combining with one or more additional elementary streams. In some cases, combining the one or more additional elementary streams and the transport stream of the first media content to create the combined transport stream of the first media content might comprise combining the one or more additional elementary streams and the resultant transport stream of the first media content to create the combined transport stream of the first media content.

In some cases, the GUID might further comprise information regarding location of metadata of the first media content within at least one of a network associated with a content provider of the first media content, one or more networks associated with other metadata providers, or one or more networks associated with a cloud service provider. The metadata might comprise at least one of updates to the one or more auxiliary data, up-to-date media content-related information associated with the first media content, updated media content-related information associated with the first media content, or additional media content-related information associated with the first media content, and/or the like. In some instances, the GUID might uniquely represent characteristics of the first media content. The characteristics might comprise at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

Merely by way of example, in some embodiments, the first media content might comprise at least one of video content, audio content, image content, or gaming content, and/or the like. The second set of instructions, when executed by the at least one second processor, might further cause the encoder to: encode the at least one of video content, audio content, image content, or gaming content in a payload data portion of the transport stream of the first media content; and send the transport stream of the first media content to the combiner. According to some embodiments, the combiner might be or might comprise a multiplexer.

In yet another aspect, a method might comprise receiving, with a user device, a combined transport stream of a first media content, the combined transport stream comprising a transport stream of the first media content and one or more additional elementary streams comprising one or more auxiliary data that are associated with the first media content. The transport stream might comprise a header and a payload data portion, the payload data portion comprising the first media content. The method might further comprise decoding, with a decoder communicatively coupled to the user device, the combined transport stream of the first media content to access the header of the transport stream, to access the first media content, and to access the one or more auxiliary data; and presenting, with the user device, the first media content to the user based at least in part on metadata contained in the one or more auxiliary data.

In some embodiments, the first media content might comprise video on demand ("VOD") content. The one or more auxiliary data associated with the VOD content might comprise at least one of a preview content file, a poster image file, a box cover image file, an extensible markup language ("XML") document containing metadata of the VOD content, or a document type definition ("DTD") document defining a structure of the metadata of the VOD content, and/or the like.

In some cases, the header might comprise a globally unique identifier ("GUID") that is specific to and uniquely identifies the first media content. The GUID might further comprise information regarding location of updated metadata of the first media content within at least one of a network associated with a content provider of the first media content, one or more networks associated with other metadata providers, or one or more networks associated with a cloud service provider, and/or the like. The method might further comprise retrieving, with the user device, the updated metadata of the first media content based on the information regarding the location of the updated metadata of the first media content that is contained in the GUID that is encoded in the header of the transport stream. The updated metadata might comprise at least one of updates to the one or more auxiliary data, up-to-date media content-related information associated with the first media content, updated media content-related information associated with the first media content, or additional media content-related information associated with the first media content, and/or the like. In some cases, presenting the first media content might comprise presenting, with the user device, the first media content to the user based at least in part on the retrieved updated metadata of the first media content.

In some instances, the GUID might uniquely represent characteristics of the first media content. The characteristics might comprise at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like. In some embodiments, the first media content might comprise video on demand ("VOD") content, the transport stream of the VOD content might be a MPEG2 transport stream, and the GUID might be contained in at least one of an adaptation field, an optional data field, or a private data field of the header of the MPEG2 transport stream of the VOD content, and/or the like. Alternatively, the transport stream of the VOD content might be a MPEG4 transport stream.

According to some embodiments, the first media content might comprise at least one of video content, audio content, image content, or gaming content, and/or the like.

In still another aspect, a media content decoding system might comprise a user device and a decoder communicatively coupled to the user device. The user device might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the user device to: receive a combined transport stream of a first media content, the combined transport stream comprising a transport stream of the first media content and one or more additional elementary streams comprising one or more auxiliary data that are associated with the first media content, the transport stream comprising a header and a payload data portion, the payload data portion comprising the first media content. The decoder might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the decoder to: decode the combined transport stream of the first media content to access the header of the transport stream, to access the first media content, and to access the one or more auxiliary data. The first set of instructions, when executed by the at least one first processor, might further cause the user device to: present the first media content to the user based at least in part on metadata contained in the one or more auxiliary data.

According to some embodiments, the first media content might comprise video on demand ("VOD") content. In some cases, the one or more auxiliary data associated with the VOD content might comprise at least one of a preview content file, a poster image file, a box cover image file, an extensible markup language ("XML") document containing metadata of the VOD content, or a document type definition ("DTD") document defining a structure of the metadata of the VOD content, and/or the like.

In some embodiments, the header might comprise a globally unique identifier ("GUID") that is specific to and uniquely identifies the first media content. The GUID might further comprise information regarding location of updated metadata of the first media content within at least one of a network associated with a content provider of the first media content, one or more networks associated with other metadata providers, or one or more networks associated with a cloud service provider, and/or the like. In some instances, the first set of instructions, when executed by the at least one first processor, might further cause the user device to: retrieve the updated metadata of the first media content based on the information regarding the location of the updated metadata of the first media content that is contained in the GUID that is encoded in the header of the transport stream. The updated metadata might comprise at least one of updates to the one or more auxiliary data, up-to-date media content-related information associated with the first media content, updated media content-related information associated with the first media content, or additional media content-related information associated with the first media content, and/or the like. In some cases, presenting the first media content might comprise presenting, with the user device, the first media content to the user based at least in part on the retrieved updated metadata of the first media content.

In some instances, the GUID might uniquely represent characteristics of the first media content. The characteristics might comprise at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

According to some embodiments, the first media content might comprise video on demand ("VOD") content, the transport stream of the VOD content might be a MPEG2 transport stream, and the GUID might be contained in at least one of an adaptation field, an optional data field, or a private data field of the header of the MPEG2 transport stream of the VOD content, and/or the like. Alternatively, the transport stream of the VOD content might be a MPEG4 transport stream.

Merely by way of example, in some embodiments, the first media content might comprise at least one of video content, audio content, image content, or gaming content, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-18 illustrate some of the features of the method, system, and apparatus for implementing media content delivery, and, in particular embodiments, to methods, systems, apparatus, and computer software for implementing metadata solutions for media content delivery, as referred to above. The methods, systems, and apparatuses illustrated by FIGS. 1-18 refer to examples of different embodiments that include various components and steps, which can be considered alternatives or which can be used in conjunction with one another in the various embodiments. The description of the illustrated methods, systems, and apparatuses shown in FIGS. 1-18 is provided for purposes of illustration and should not be considered to limit the scope of the different embodiments.

With reference to the figures, FIG. 1 is a schematic diagram illustrating a system 100 for implementing metadata solutions for media content delivery, in accordance with various embodiments. In the non-limiting embodiment of FIG. 1, system 100 might a service provider 105. At one or more locations associated with the service provider 105, system 100 might include, without limitation, a computing system(s) 110, a data lake or data store(s) 115, and one or more service provider networks 120, and/or the like. System 100 might further comprise network(s) 125, which might communicatively couple at least one of the computing system(s) 110 and/or the one or more service provider networks 120 to each of one or more of content provider servers 130a-130n (collectively, "content provider servers 130") that each have corresponding databases 135a-135n (collectively, "databases 135"). The network(s) 125 might also communicatively couple a content aggregator(s) or content aggregator servers 140 (that has corresponding database(s) 145) with each of at least one of the computing system(s) 110 and/or the one or more service provider networks 120 and with each of at least one content provider server 130 of the one or more of content provider servers 130a-130n. Each of the service provider networks 120 and 125 might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks. In a particular embodiment, the network 120 or the network 125 might include an access network of the service provider (e.g., an Internet service provider ("ISP")), or the like.

System 100 might further comprise, at the one or more locations associated with the service provider 105, at least one of a globally unique identifier ("GUID") generator(s) 150a that generates one or more GUIDs that are each specific to and uniquely identifies a particular media content, a rating identifier generator(s) 150b that generates one or more audience appropriateness information ("AAI") regarding each of one or more portions of a particular media content of one or more media content, and/or an auxiliary data packet generator(s) 150c that generates auxiliary data packets associated with a particular media content. At the one or more locations associated with the service provider 105, system 100 might further comprise one or more encoders 155 and one or more combiners 160 (which in some cases might include, but is not limited to, a multiplexer or the like).

In some embodiments, system 100 might also comprise one or more telecommunications relay systems 165, which might include, without limitation, one or more wireless network interfaces (e.g., wireless modems, wireless access points, and the like), one or more towers, one or more satellites, and/or the like. The one or more telecommunications relay systems 165 might provide wired or wireless communications between the service provider 105 (e.g., the computing system(s) 110 or the combiner(s) 160, etc.) and each of one or more user devices 170a-170n (collectively, "user devices 170), each of which might comprise one or more processors 175, and might further comprise, or might be communicatively coupled with, one or more of at least one separator 180 (which in some cases might include, without limitation, a de-multiplexer or the like), at least one decoder 185, at least one display device 190, and/or at least one speaker 195. Each of the at least one separator 180, the at least one decoder 185, the at least one display device 190, and/or the at least one speaker 195 might be either disposed within the user device 170 or external to the user device 170 yet communicatively coupled thereto.

In operation, at least one content provider server 130 of the one or more content provider servers 130 might provide media content from its corresponding database 135, and the content aggregator server 140 might aggregate, collect, or otherwise obtain the media content from the at least one content provider server 130 and/or at least one database 135 via network(s) 125, and might store the media content in database(s) 145. The computing system(s) 110 of the service provider 105 might access or retrieve, via network 120 and/or network 125, the media content from the content aggregator server(s) 140 (or from database 145) and/or from the at least one content provider server 130 (or from corresponding database 135). In some cases, computing system(s) 110 of the service provider 105 might access or retrieve, via network 120 and/or network 125, media content metadata from at least one of a network, server 130, or database 135 associated with a content provider of the particular media content, one or more networks, servers, or databases associated with other metadata providers (not shown), or one or more network, servers, or databases associated with a cloud service provider (also not shown).

In some embodiments, the GUID generator(s) 150a might generate a GUID that is specific to and uniquely identifies a particular media content (including the particular edition, release, version, etc.). The media content might be a video-on-demand ("VOD") content, including, but not limited to, a movie, a television episode, etc. Alternatively, the media content might include, without limitation, (other) video content, audio content, image content, or gaming content, and/or the like. The GUID, according to some embodiments, uniquely represents characteristics of the first media content, the characteristics might include, but are not limited to, at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like. The encoder(s) 155 and/or the combiner 160 might encode, embed, or insert the GUID in a header of each packet of a media content transport stream of the particular media content, and might send the resultant media content transport stream to one or more user devices 170 via network 120 and/or 125 (in some instances, via the one or more telecommunications relay systems 165), and in some cases, without the need to concurrently send metadata or any of the auxiliary data (particularly metadata or auxiliary data that are associated with presentation of the media content) to the user devices 170.

The user devices 170 and/or the separator(s) 180 (which, in some embodiments, might be disposed within a user device 170 or might be separate from yet communicatively coupled to the user device 170) might receive the transport stream. The separator 180 might separate the transport stream into its constituent parts (i.e., video, audio, metadata, etc., where applicable), and might send the separated parts to the decoder 185 for decoding. The decoder 185 (which may be disposed within the user device or may be separate but communicatively coupled to the user device) might decode the separated parts of the transport stream to access the media content and the GUID in the header of the packets of the transport stream, and/or the like. The processor(s) 175 might use the GUID, which might contain location information for metadata and information about the metadata for the media content, to retrieve the metadata (e.g., an extensible markup language ("XML") document containing the metadata, etc.) and the information about the metadata (e.g., a document type definition ("DTD") document that defines the structure of the metadata, etc.) from the location as indicated in the location information contained in the GUID. In some cases, the location as indicated in the GUID might include, without limitation, at least one of a network, server 130, or database 135 associated with a content provider of the particular media content, one or more networks, servers, or databases associated with other metadata providers (not shown), or one or more network, servers, or databases associated with a cloud service provider (also not shown). The processor(s) 175 (which might be disposed within the user device 170 or disposed in a separate but communicatively coupled device) might then format the media content based on the retrieved metadata (as defined in the retrieved DTD document), and might send the formatted media content to the user device(s) 170 (if separate from the user device) or might present the formatted media content to the user (if part of the user device), by presenting any video content, any image content, and/or any gaming content to the user via display device(s) 190 and/or presenting any audio content to the user via speaker(s) 195. The use of GUIDs or other location information in the headers of the main media content stream and/or in the headers of the auxiliary data streams is described in detail below with respect to FIGS. 2-6, 12, and 14.

Alternatively, or additionally, according to some embodiments, the rating identifier generator 150b might use media content metadata—which might be accessed from at least one of a network, server 130, or database 135 associated with a content provider of the particular media content, one or more networks, servers, or databases associated with other metadata providers (not shown), or one or more network, servers, or databases associated with a cloud service provider (also not shown)—to generate audience appropriate information ("AAI") regarding each of the one or more portions of the particular media content and/or regarding auxiliary content of the particular media content (i.e., one or more previews of the particular media content, one or more poster images, one or more box cover images, one or more other auxiliary content associated with the particular media content, and/or the like). The AAI might include, without limitation, at least one of ratings information for each of the one or more portions of the media content, locations of any inappropriate portions in the media content, length of any inappropriate portions, or location of an appropriate portion of the media content to skip to for each inappropriate portion of the media content, wherein the inappropriate portions each comprise at least one of a portion containing adult content, a portion containing disturbing subject matter, a portion containing violence, a portion containing foul language, a portion containing drug use, a portion containing people smoking, or a portion containing alcohol use, and/or the like. The encoder(s) 155 and/or the combiner(s) 160 might encode, embed, or insert the AAI or location information associated with the AAI in a header of a packet or I-frame of a media content transport stream associated with the media content, and might send the resultant media content transport stream to one or more user devices 170 via network 120 and/or 125 (in some instances, via the one or more telecommunications relay systems 165).

In some embodiments, the AAI might comprise a GUID that is specific to and uniquely identifies the media content, and the GUID might further comprise information regarding locations of the XML document and the DTD document within a network associated with a content provider of the media content. The XML document, in such embodiments, might comprise metadata including, but not limited to, at least one of ratings information for each of the one or more portions of the media content, locations of any inappropriate portions in the media content, length of any inappropriate portions, or location of an appropriate portion of the media content to skip to for each inappropriate portion of the media content, and/or the like.

The user devices 170 and/or the separator(s) 180 (which, in some embodiments, might be disposed within a user device 170 or might be separate from yet communicatively coupled to the user device 170) might receive the transport stream. The separator 180 might separate the transport stream into its constituent parts (i.e., video, audio, metadata, etc., where applicable), and might send the separated parts to the decoder 185 for decoding. The decoder 185 (which may be disposed within the user device or may be separate but communicatively coupled to the user device) might decode the separated parts of the transport stream to access the media content and the AAI (or location information of the AAI) in the header of the packet or I-frame of the transport stream, and/or the like. In the case that location information of the AAI (or of updated or updatable AAI, rather than the AAI itself) is embedded in the header of the packet or I-frame of the transport stream, the processor(s) 175 might use the location information of the AAI (or updated or updatable AAI) to retrieve the AAI (or updated or updatable AAI). The processor(s) 175 (which might be disposed within the user device 170 or disposed in a separate but communicatively coupled device) might then provide (or might have previously provided) the user with options associated with user preferences regarding ratings levels of one or more portions in the media content (e.g., scenes in video content, parts of audio content, portions of an image, scenes or parts of gaming content, etc.). Based on user input received in response to providing such options to the user and based on the AAI, the processor(s) 175 might modify the media content (e.g., by deleting or skipping presentation of particular scenes or portions), and might send the modified media content to the user device(s) 170 (if separate from the user device) or might present the modified media content to the user (if part of the user device), by presenting any video content, any image content, and/or any gaming content to the user via display device(s) 190 and/or presenting any audio content to the user via speaker(s) 195. The use of AAIs or other location information in the headers of the packets or I-frames of the main media content stream and/or in the headers of the packets or I-frames of the auxiliary data streams is described in detail below with respect to FIGS. 7-12 and 14.

Alternatively, or additionally, in some embodiments, the auxiliary data packet generator 150c might use media content metadata—which might be accessed from at least one of a network, server 130, or database 135 associated with a content provider of the particular media content, one or more networks, servers, or databases associated with other metadata providers (not shown), or one or more network, servers, or databases associated with a cloud service provider (also not shown)—to generate auxiliary data in the form of additional elementary streams (or auxiliary data streams). The auxiliary data, in the case of VOD content for example, might include, but are not limited to, at least one of a preview content file(s), a poster image file(s), a box cover image file(s), an extensible markup language ("XML") document(s) containing metadata of the VOD content, or a document type definition ("DTD") document(s) defining a structure of the metadata of the VOD content, and/or the like. The various embodiments, however, are not limited to the media content being only VOD content, and the auxiliary data can include any suitable additional or related data associated with the media content. The encoder(s) 155 might encode the various portions of the media content to form a media content transport stream, and the combiner(s) 160 might combine the media content transport stream with each of the additional elementary streams (or auxiliary data streams) to form a combined media content transport stream that is subsequently sent to one or more user devices 170 via network 120 and/or 125 (in some instances, via the one or more telecommunications relay systems 165).

In some embodiments, a GUID that is specific to and uniquely identifies the media content might be encoded, embedded, or inserted into the header of the packets of the transport stream. The GUID might further comprise information regarding locations of the XML document and the DTD document within a network associated with a content provider of the media content. The XML document, in such embodiments, might comprise metadata including, but not limited to, at least one of updates of the metadata, up-to-date program-related information associated with the MEDIA content, updated program-related information associated with the MEDIA content, or additional program-related information associated with the MEDIA content, and/or the like. According to some embodiments, a GUID that is specific to and uniquely identifies each of the auxiliary data or auxiliary data streams might be encoded, embedded, or inserted into the respective header of the packets of the corresponding auxiliary data streams. Such GUID might further comprise information regarding locations of the XML document and the DTD document within a network associated with a content provider of the media content. The XML document, in such embodiments, might comprise metadata including, but not limited to, at least one of updates to the one or more auxiliary data, up-to-date media content-related information associated with the media content, updated media content-related information associated with the media content, or additional media content-related information associated with the media content, and/or the like. In some embodiments, the GUID might also refer to particular (third party) websites and/or social media sites/pages that reference the media content or reference materials that are related to the media content.

The user devices 170 and/or the separator(s) 180 (which, in some embodiments, might be disposed within a user device 170 or might be separate from yet communicatively coupled to the user device 170) might receive the combined media content transport stream. The separator 180 might separate the combined media content transport stream into the transport stream and into each of the additional elementary streams, and might further separate these components into their constituent parts (i.e., video, audio, metadata, etc., where applicable), and might send the separated parts to the decoder 185 for decoding. The decoder 185 (which may be disposed within the user device or may be separate but communicatively coupled to the user device) might decode the separated parts of the transport stream to access the media content and the auxiliary data, and/or the like. The processor(s) 175 (which might be disposed within the user device 170 or disposed in a separate but communicatively coupled device) might then format the media content based on metadata (as defined by information on the metadata), which might be contained in the auxiliary data, and might send the formatted media content to the user device(s) 170 (if separate from the user device) or might present the formatted media content to the user (if part of the user device), by presenting any video content, any image content, and/or any gaming content to the user via display device(s) 190 and/or presenting any audio content to the user via speaker(s) 195. In some cases, the GUID might be embedded in the header of the transport stream (in the manner as described above) and might provide the system with access to updates to the metadata so that the transport stream and/or the auxiliary data need not be resent to the user devices when metadata updates or other new/updated information associated with the media content are available. Alternatively or additionally, AAI might be embedded in the header of the packets or I-frames of the transport stream (in the manner as described above) and might allow modification of the media content based on the AAI and based on user input received in response to providing to the user options associated with user preferences regarding ratings levels of one or more portions in the media content. Merely by way of example, in some aspects, a transport stream ingester or the like might read or receive XML metadata, images from appropriate packet identifiers, and/or the like to create and/or update a media content catalog (e.g., a VOD catalog), or the like. The use of the combined media content transport stream is described in detail below with respect to FIGS. 12-16.

According to some embodiments, a content distributor might use the same GUID associated with the particular media content to retrieve information on the particular media content (including, but not limited to, the metadata, auxiliary content, etc.). The content distributor might then compile the metadata, the auxiliary content, and/or the like into an auxiliary stream, and might send the auxiliary stream to the user device (either separate from the main transport stream of the media content or as a combined transport stream that contains the main stream and the auxiliary stream).

Metadata Globally Unique Identifier ("GUID") in Media Content Transport Stream

Figure 2A:
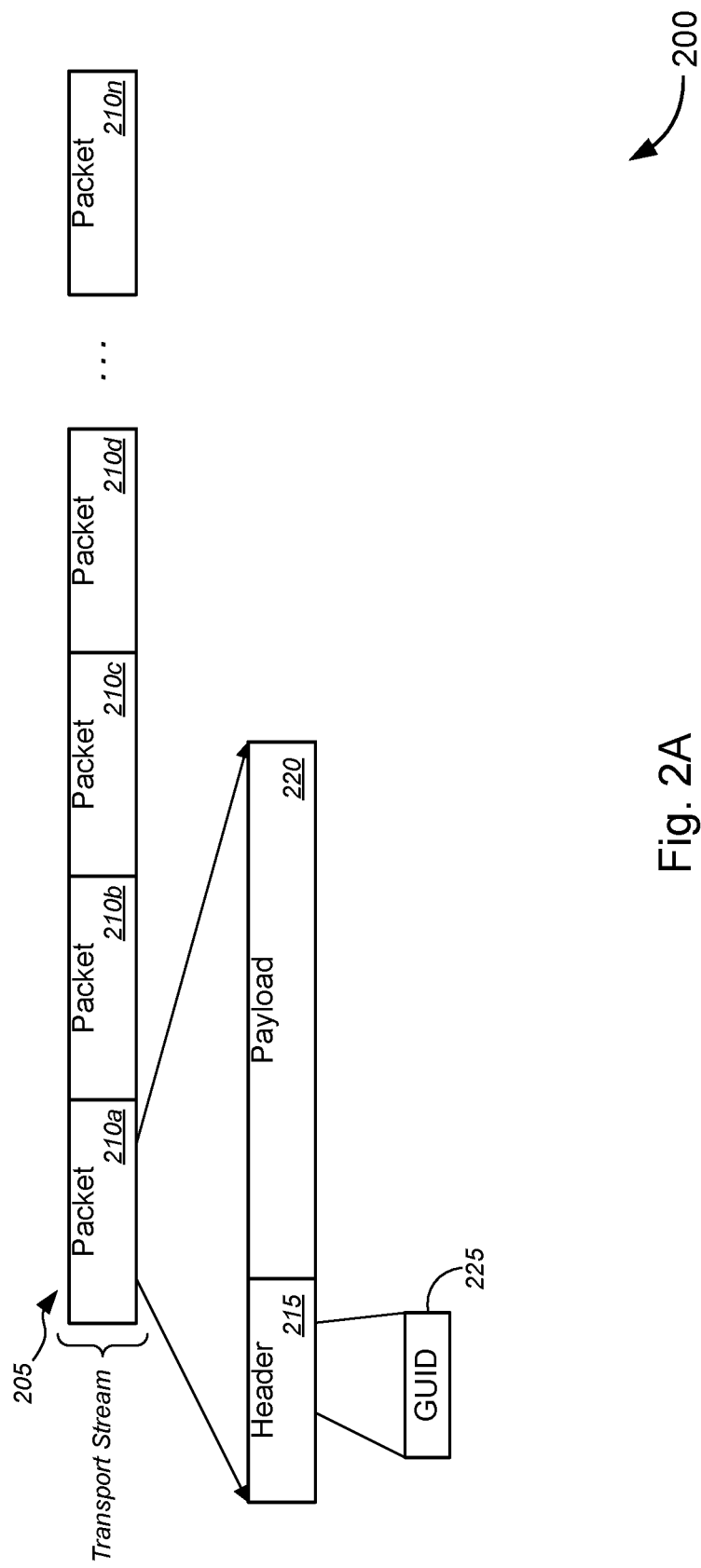
FIGS. 2A and 2B are schematic diagrams illustrating various embodiments of transport streams in which metadata globally unique identifiers ("GUIDs") are inserted to implement metadata solutions for media content delivery.
Figure 2B:
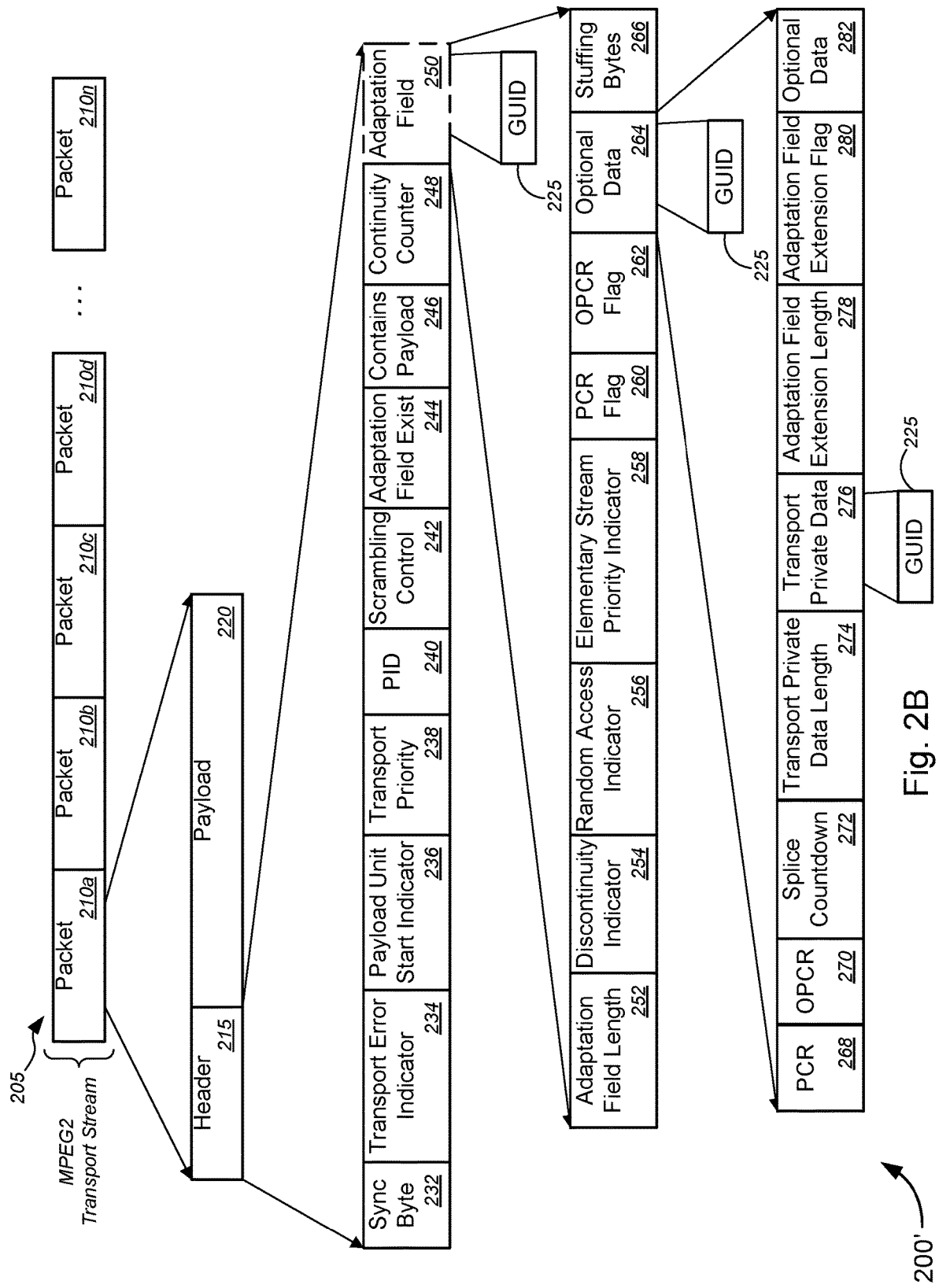

FIGS. 2A and 2B (collectively, "FIG. 2") are schematic diagrams illustrating various embodiments 200 and 200' of transport streams in which metadata globally unique identifiers ("GUIDs") are inserted to implement metadata solutions for media content delivery.

FIG. 2A depicts a generic media content transport stream 205, which comprises a first packet 210a, a second packet 210b, a third packet 210c, a fourth packet 210d, through an $N^{th}$ packet 210n (collectively, "packets 210"). The media content that might be contained in the transport stream 205 might include, without limitation, at least one of video content (e.g., video-on-demand ("VOD") video content, movie content, television episode content, television program content, music video content, video clip content, etc.), audio content (e.g., music, VOD audio content, movie audio content, television episode audio content, television program audio content, music video audio content, video clip audio content, etc.), image content, or gaming content (e.g., cut-scene video and audio content, game play video and audio content, game play dynamic code, character rendering content, environment rendering content, object rendering content, etc.), and/or the like. Each packet 210 might comprise a header 215 and a payload portion 220. In some embodiments, a globally unique identifier ("GUID") that is specific to and uniquely identifies a particular media content contained in the transport stream 205 might be embedded, encoded, or inserted in the header 215 of each packet 210 of the transport stream 205. In some embodiments, the GUID uniquely represents characteristics of the first media content, the characteristics including, but not limited to, at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like. The GUID can be in any suitable form or format and can contain any suitable number of characters that include, but are not limited to one or more of numerals, alphabetic characters, special characters, binary notations, hexadecimal notations, and/or the like.

With reference to FIG. 2B, a specific embodiment of a MPEG2 or MPEG-2 transport stream is shown for purposes of illustration. Herein, although a MPEG2 transport stream is shown, the various embodiments are not so limited and any suitable transport stream (including, MPEG2 transport streams, MPEG4 transport streams, and/or the like) may be used. The MPEG2 transport stream might contain, without limitation, at least one of video content (e.g., VOD video content, movie content, television episode content, television program content, music video content, video clip content, etc.), audio content (e.g., music, VOD audio content, movie audio content, television episode audio content, television program audio content, music video audio content, video clip audio content, etc.), image content, and/or the like. Further for purposes of illustration, as described below in some of the embodiments, the MPEG2 transport stream is used to transport VOD content (including, video, audio, image, and metadata content, and/or the like).

In the non-limiting embodiment 200' of FIG. 2B, the MPEG2 transport stream, like the generic transport stream of FIG. 2A, might comprise a first packet 210a, a second packet 210b, a third packet 210c, a fourth packet 210d, through an $N^{th}$ packet 210n (collectively, "packets 210"). Each packet 210 might comprise a header 215 and a payload portion 220. Each header 215 might comprise a sync byte 232 (which is used to synchronize transmission of the packets 210), a transport error indicator 234 (which indicates whether or not the packet is corrupt), a payload unit start indicator 236 (which indicates whether a packet begins immediately following the header), a transport priority field 238 (which indicates when a packet has a higher priority than other packets with the same PID), a packet identifier ("PID") field 240 (which identifies or describes the payload data), a scrambling control field 242 (which indicates whether or not the payload is scrambled, and if so with what key or what type of key), an adaptation field exist field 244 (which indicates whether or not there is an adaptation field), a contains payload field 246 (which indicates whether or not there is a payload), and a continuity counter 248 (which indicates the sequence number of payload packets within each stream and is incremented per PID only when a payload flag is set).

Although adaptation field 250 is generally optional (as indicated by the dash-long dash outline in FIG. 2B), for purposes of the various embodiments herein, the adaptation field 250 is assumed to be included in the headers 215 of the MPEG2 transport stream 205. The adaptation field 250 might comprise an adaptation field length field 252 (which indicates the number of bytes in the remaining portions of the adaptation field), a discontinuity indicator 254 (which indicates whether or not the packet is in a discontinuity state with respect to either the continuity counter or the program clock reference), a random access indicator 256 (which indicates whether or not the stream may be decoded without errors from this point), an elementary stream priority indicator 258 (which indicates when the stream should be considered "high priority"), a program clock reference ("PCR") flag 260 (which indicates when there is a PCR field), an original program clock reference ("OPCR") flag 262 (which indicates when there is an OPCR field), one or more optional data fields 264, and a stuffing bytes field 266. The one or more optional data fields 264 might comprise one or more of a PCR field 268 (which indicates the program clock reference value), an OPCR field 270 (which indicates the original program clock reference value, and is usually helpful when one transport stream is copied into another), a splice countdown field 272 (which indicates location of a splicing point in the form of the number of packets following the packet until the next splicing point), a transport private data length field 274 (which indicates the length of the transport private data field), a transport private data field 276 (which contains private data), an adaptation field extension length field 278 (which indicates length of an adaptation field extension field), an adaptation field extension flag 280 (which indicates whether or not there is an adaptation field extension), and one or more optional data fields 282.

As mentioned above, the presence of an adaptation field is indicated by the adaptation field control bits in the transport stream packet. If present, the adaptation field directly follows the 4 B packet header, before any payload data. It may contain a variety of data used for timing and control. One important item in most adaptation packets is the PCR field. Another important item is the splice countdown field, which is used to indicate the end of a series of elementary stream ("ES") access units. The splice countdown field allows the MPEG2 transport multiplexer to determine appropriate places in a stream were the video may be spliced to another video from another video source without introducing undesirable disruption to the video replayed by the receiver. Since MPEG2 video uses interframe coding, a seamless switch-over between sources can only occur on an I-frame boundary (which is indicated by a splice count of 0). This feature may, for instance, be used to insert a news flash in a scheduled TV transmission. One other bit of interest is the transport private data flag, which is set to 1 when the adaptation field contains private data bytes. Another bit of interest is the transport private data length field, which specifies how many private data bytes will follow the field. Private data is not allowed to increase the adaptation field beyond the transport stream payload size of 184 bytes.

According to some embodiments, a GUID that is specific to and uniquely identifies a particular media content (e.g., VOD content) contained in the transport stream 205 might be embedded, encoded, or inserted in the header 215 of each packet 210 of the transport stream 205—specifically, embedded, encoded, or inserted in one or more of the adaptation field 250, the one or more optional data fields 264, and/or the transport private data field 276, or the like.

Figure 3:
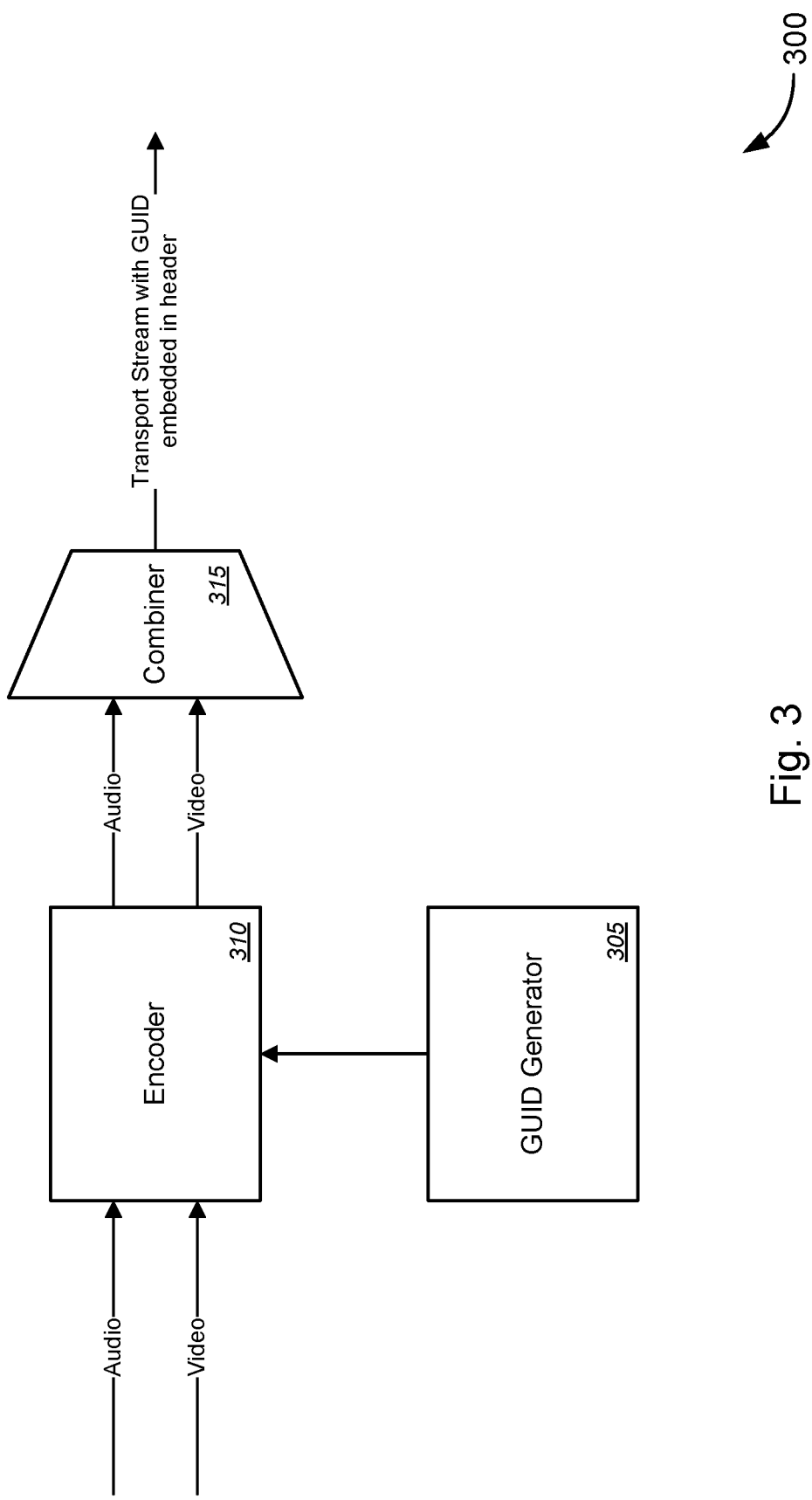
FIG. 3 is a schematic diagram illustrating a system for encoding metadata GUID in a media content transport stream to implement metadata solutions for media content delivery, in accordance with various embodiments.

FIG. 3 is a schematic diagram illustrating a system 300 for encoding metadata GUID in a media content transport stream to implement metadata solutions for media content delivery, in accordance with various embodiments. In the non-limiting embodiment of FIG. 3, system 300 might comprise a GUID generator 305, an encoder 310, and a combiner 315. The GUID generator 305 might generate a GUID that is specific to and uniquely identifies a particular media content that is being (or is intended to be) sent over the transport stream (e.g., transport stream 205 of FIG. 2A or 2B, or the like). The GUID generator 305 then sends the GUID to the encoder 310. The encoder 310, which receives video and/or audio content (e.g., from a content provider server and/or database (e.g., content provider server 130a-130n and/or database 135a-135n of system 100 in FIG. 1) or from a content aggregator server and/or database (e.g., content aggregator server 140 and/or database 145 of system 100 in FIG. 1)), might encode the GUID that is received from the GUID generator 305 in a header of each packet of the transport stream containing the received video and/or audio content. The combiner 315—which in some embodiments might include, without limitation, a multiplexer or the like—might combine (or multiplex) the various component streams of the media content (i.e., the video stream, audio stream, metadata stream, etc.) into a single transport stream (which might have the GUID embedded in the headers of the packets in the stream). The transport stream might subsequently be sent to one or more user devices over a network (e.g., over network 120 and/or 125 of system 100 in FIG. 1, or the like). The one or more user devices, in some embodiments, might include, without limitation, one or more of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like.

Figure 4:
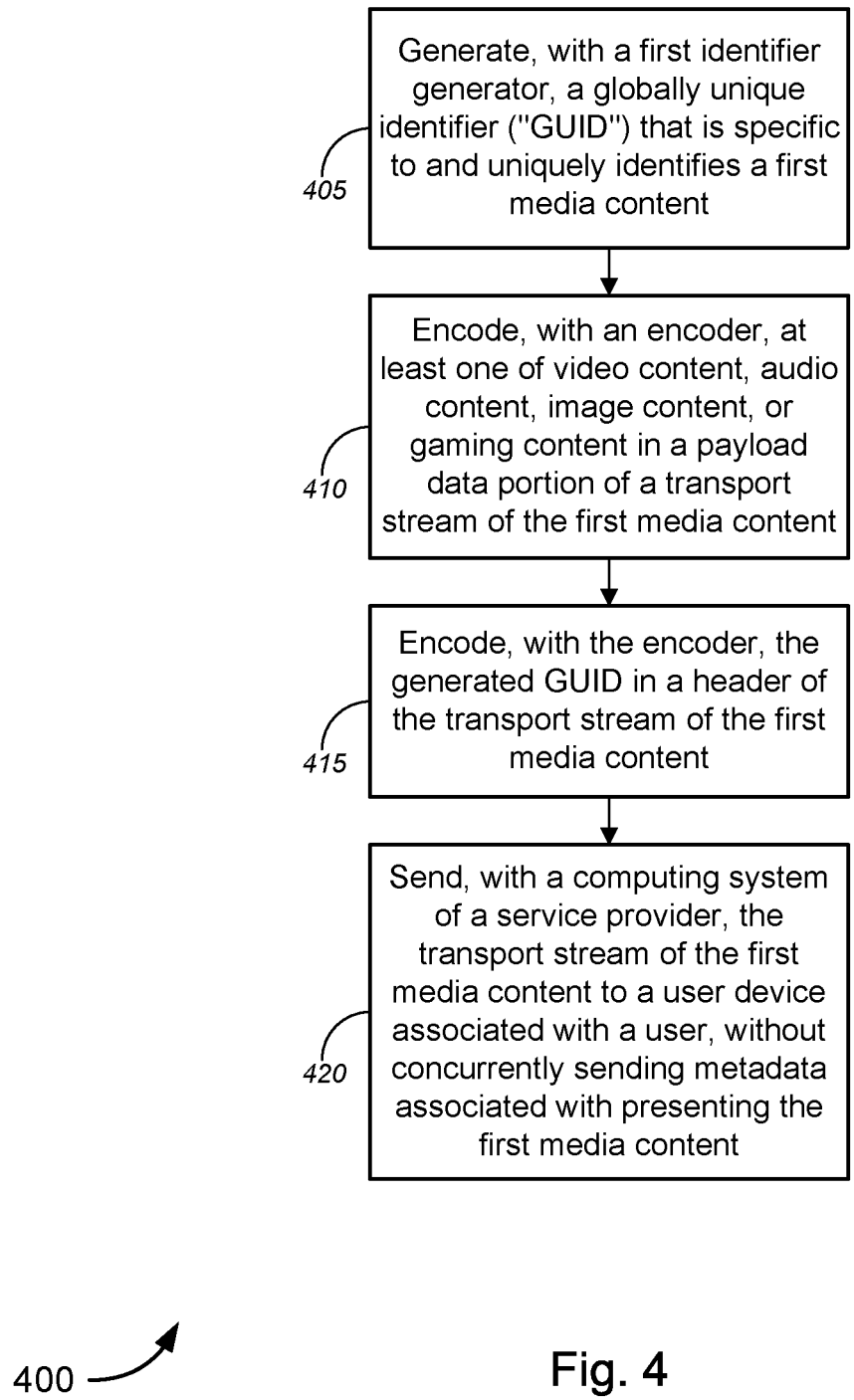
FIG. 4 is a flow diagram illustrating a method for encoding metadata GUID in a media content transport stream to implement metadata solutions for media content delivery, in accordance with various embodiments.

FIG. 4 is a flow diagram illustrating a method 400 for encoding metadata GUID in a media content transport stream to implement metadata solutions for media content delivery, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100 and 300 of FIGS. 1 and 3 respectively (or components thereof), such methods may also be implemented using any suitable hardware (or software) implementation. Similarly, while each of the systems 100 and 300 of FIGS. 1 and 3, respectively (or components thereof), can operate according to the method 400 illustrated by FIG. 4 (e.g., by executing instructions embodied on a computer readable medium), the systems 100 and 300 of FIGS. 1 and 3 can each also operate according to other modes of operation and/or perform other suitable procedures.

In FIG. 4, method 400, at block 405, might comprise generating, with a first identifier generator (which might correspond to GUID generator 305 of system 300 in FIG. 3), a globally unique identifier ("GUID") that is specific to and uniquely identifies a first media content. In some embodiments, the GUID uniquely represents characteristics of the first media content, the characteristics including, but not limited to, at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

Method 400 might further comprise encoding, with an encoder (which might correspond to encoder 310 of system 300 in FIG. 3), at least one of video content, audio content, image content, gaming content, and/or the like in a payload data portion of a transport stream of the first media content (block 410) and encoding, with the encoder, the generated GUID in a header of the transport stream of the first media content (block 415). At block 420, method 400 might comprise sending, with a computing system of a service provider, the transport stream of the first media content to a user device associated with a user, (in some cases) without concurrently sending metadata associated with presenting the first media content. The user device associated with the user, in some embodiments, might include, without limitation, one or more of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like.

Figure 5:
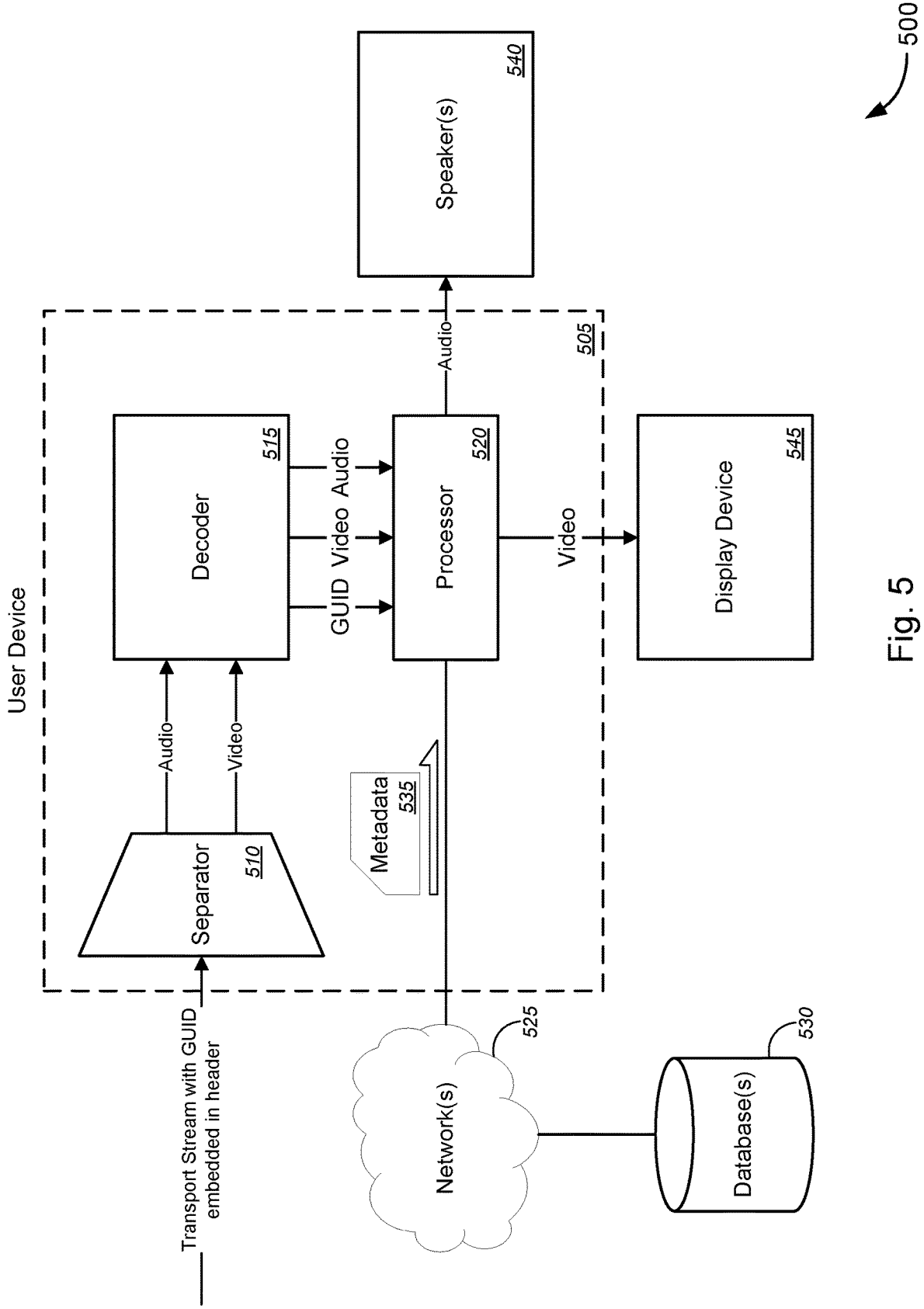
FIG. 5 is a schematic diagram illustrating a system for decoding metadata GUID from a media content transport stream to access metadata from a metadata source based on location information obtained from the decoded metadata GUID to implement metadata solutions for media content delivery, in accordance with various embodiments.

FIG. 5 is a schematic diagram illustrating a system 500 for decoding metadata GUID from a media content transport stream to access metadata from a metadata source based on location information obtained from the decoded metadata GUID to implement metadata solutions for media content delivery, in accordance with various embodiments.

In the non-limiting embodiment of FIG. 5, system 500 might comprise a user device 505, a separator 510, a decoder 515, a processor 520, one or more networks 525, one or more databases 530, one or more speakers 540, and one or more display devices 545. According to some embodiments, the user device 505 might include, but is not limited to, at least one of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like. Although FIG. 5 depicts the separator 510 and the decoder 515 as being disposed within the user device 505, the various embodiments are not so limited, and the separator 510 and/or the decoder 515 might be separate from (i.e., external to) yet communicatively coupled to the user device 505, or might be embodied in different user devices. Similarly, although FIG. 5 depicts the speaker(s) 540, and the display device(s) 545 as being external to, yet communicatively coupled to the user device 505, the various embodiments are not so limited, and one or both of the speaker(s) 540 and/or the display device(s) 545 might be part of, or disposed within, the user device 505. For example, the separator 510 and decoder 515, in some cases might be disposed within a set-top box or the like, which might send the separated and decoded media content signal to a television or digital video recording/playback device, which might send video data to display device 545 and audio data to speaker(s) 540 for presentation of video content (e.g., VOD content or other video content) to the user. Alternatively, the separator 510 and decoder 515 might be disposed within a tablet computer or a smart phone, which might present the media content (i.e., video, audio, image, game, and/or the like) to the user via built-in display 545 (e.g., touchscreen display) and/or via built-in speakers 540 (e.g., device speakers). And so on.

According to some embodiments, the user device 505 and/or the separator 510 might receive the transport stream with the GUID embedded in the headers of the packets in the transport stream, and might separate the transport stream into constituent parts (e.g., video stream, audio stream, image stream, gaming content stream, metadata stream, etc.). The decoder 515 might decode the various streams and might extract or access the GUID that is embedded, encoded, or inserted in the headers of the packets, and might send the various decoded streams and the GUID to the processor 520. In some embodiments, the GUID uniquely represents characteristics of the first media content, the characteristics including, but not limited to, at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

The processor 520 might analyze the GUID to determine if it contains location data for auxiliary data, which might include, without limitation, at least one of metadata, image files, preview files, extensible markup language ("XML") document containing metadata of the media content, or a document type definition ("DTD") document defining a structure of the metadata, and/or the like. Based on a determination that the decoded GUID contains location information for XML documents and/or for DTD documents or location information for updated or updatable metadata, the processor 520 might access one or more databases 530 (which might correspond to databases 135*a*-135*n*, 145, 115, and/or the like of system 100 of FIG. 1, or might be a third party metadata database, and/or the like) via network(s) 525 (which might correspond to networks 120 or 125 of system 100 of FIG. 1, or the like) to retrieve metadata 535 (which might include, but is not limited to, metadata, an XML document containing metadata, and/or a DTD document defining the structure of the metadata, and/or the like). Based on the retrieved metadata 535, the processor 520 might format the various media content streams and might present any video content, any image content, and/or any gaming content to the user via display device(s) 545 and/or might present any audio content to the user via speaker(s) 540.

In this manner, metadata, even if updated or new, might be accessible to format the media content streams without having to re-download or re-retrieve the media content transport stream, thereby obviating excessive bandwidth and/or data access usage, and otherwise freeing up bandwidth for other data for the user or for other users, and/or the like. Time is also saved for the user, because the user need only wait for the updated or new metadata to be retrieved, which would take less time than re-downloading or re-retrieving the transport stream of the media content (and trying to download or retrieve the transport stream with the updated metadata). Further, due to the use of the GUID, there is no longer any issues with respect to corruption of the media content transport stream if the metadata for formatting the media content for presentation is not received together with the transport stream or if other issues occur downloading of the transport stream.

Figure 6:
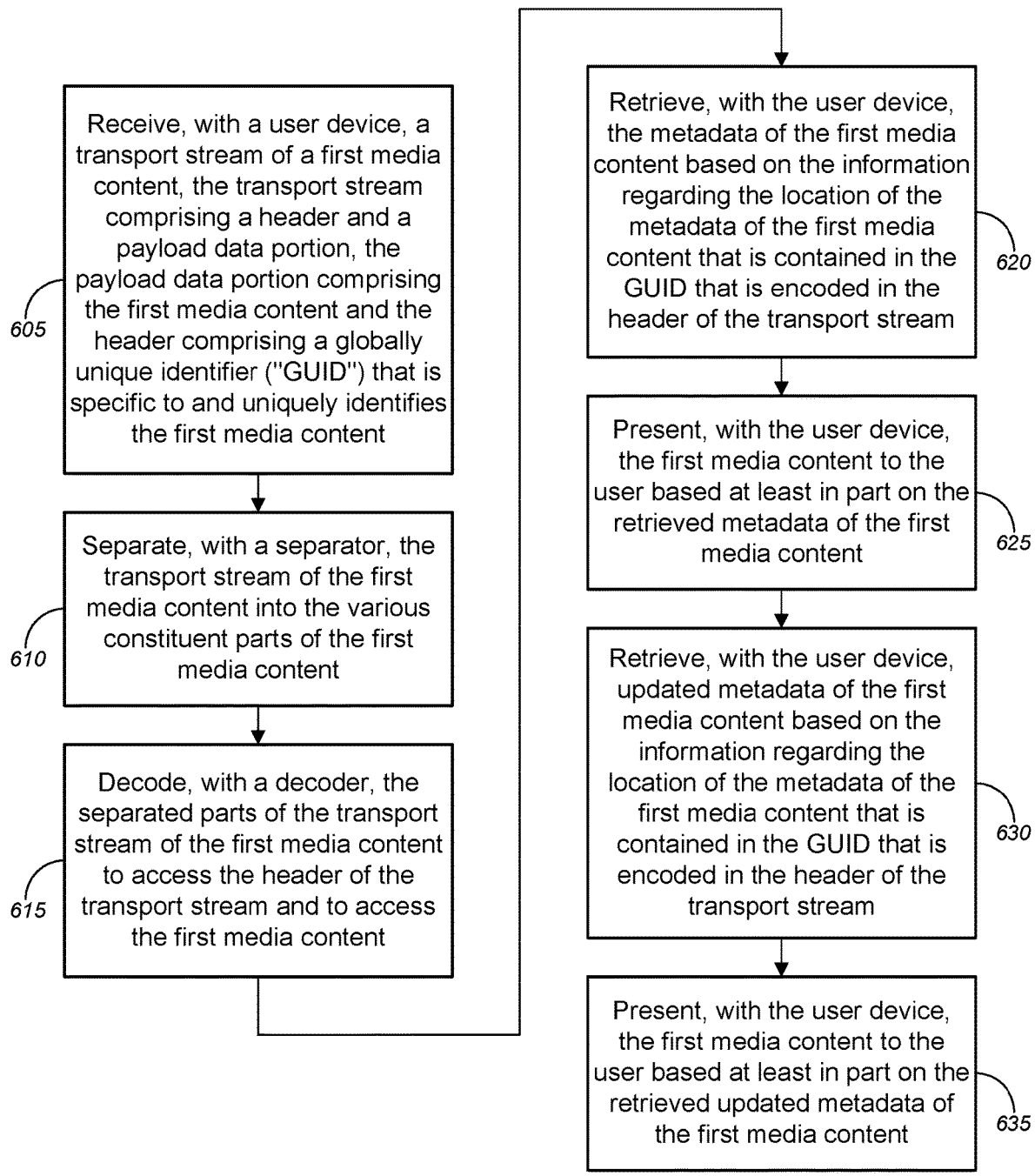
FIG. 6 is a flow diagram illustrating a method for decoding metadata GUID from a media content transport stream to access metadata from a metadata source based on location information obtained from the decoded metadata GUID to implement metadata solutions for media content delivery, in accordance with various embodiments.

FIG. 6 is a flow diagram illustrating a method 600 for decoding metadata GUID from a media content transport stream to access metadata from a metadata source based on location information obtained from the decoded metadata GUID to implement metadata solutions for media content delivery, in accordance with various embodiments.

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems 100 and 500 of FIGS. 1 and 5 respectively (or components thereof), such methods may also be implemented using any suitable hardware (or software) implementation. Similarly, while each of the systems 100 and 500 of FIGS. 1 and 5, respectively (or components thereof), can operate according to the method 600 illustrated by FIG. 6 (e.g., by executing instructions embodied on a computer readable medium), the systems 100 and 500 of FIGS. 1 and 5 can each also operate according to other modes of operation and/or perform other suitable procedures.

In FIG. 6, method 600, at block 605, might comprise receiving, with a user device (which might correspond to user device 505 of system 500 in FIG. 5, or the like), a transport stream of a first media content. The transport stream might comprise a header and a payload data portion, and the payload data portion might comprise the first media content and the header might comprise a globally unique identifier ("GUID") that is specific to and uniquely identifies the first media content. In some embodiments, the GUID uniquely represents characteristics of the first media content, the characteristics including, but not limited to, at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content, and/or the like.

At block 610, method 600 might comprise separating, with a separator (which might correspond to separator 510 of system 500 in FIG. 5) that is communicatively coupled to the user device or that is disposed within the user device, the transport stream of the first media content into the various constituent parts of the first media content (i.e., video stream, audio stream, image stream, gaming content stream, metadata stream, etc.). The method 600 might further comprise decoding, with a decoder (which might correspond to decoder 515 of system 500 in FIG. 5) that is communicatively coupled to the user device or that is disposed within the user device, the separated parts of the transport stream of the first media content to access the header of the transport stream and to access the first media content (block 615). In some cases, the GUID might further comprise information regarding location of metadata of the first media content within at least one of a network associated with a content provider of the first media content, one or more networks associated with other metadata providers, or one or more networks associated with a cloud service provider, and/or the like.

At block 620, method 600 might comprise retrieving, with the user device, the metadata of the first media content based on the information regarding the location of the metadata of the first media content that is contained in the GUID that is encoded in the header of the transport stream. Method 600 might, at block 625, comprise presenting, with the user device, the first media content to the user based at least in part on the retrieved metadata of the first media content.

According to some embodiments, method 600 might further comprise retrieving, with the user device, updated metadata of the first media content based on the information regarding the location of the metadata of the first media content that is contained in the GUID that is encoded in the header of the transport stream, the updated metadata having replaced the metadata at the location of the metadata (block 630) and presenting, with the user device, the first media content to the user based at least in part on the retrieved updated metadata of the first media content (block 635).

Audience Appropriate Information ("AAI") in Media Content Transport Stream

Figure 7A:
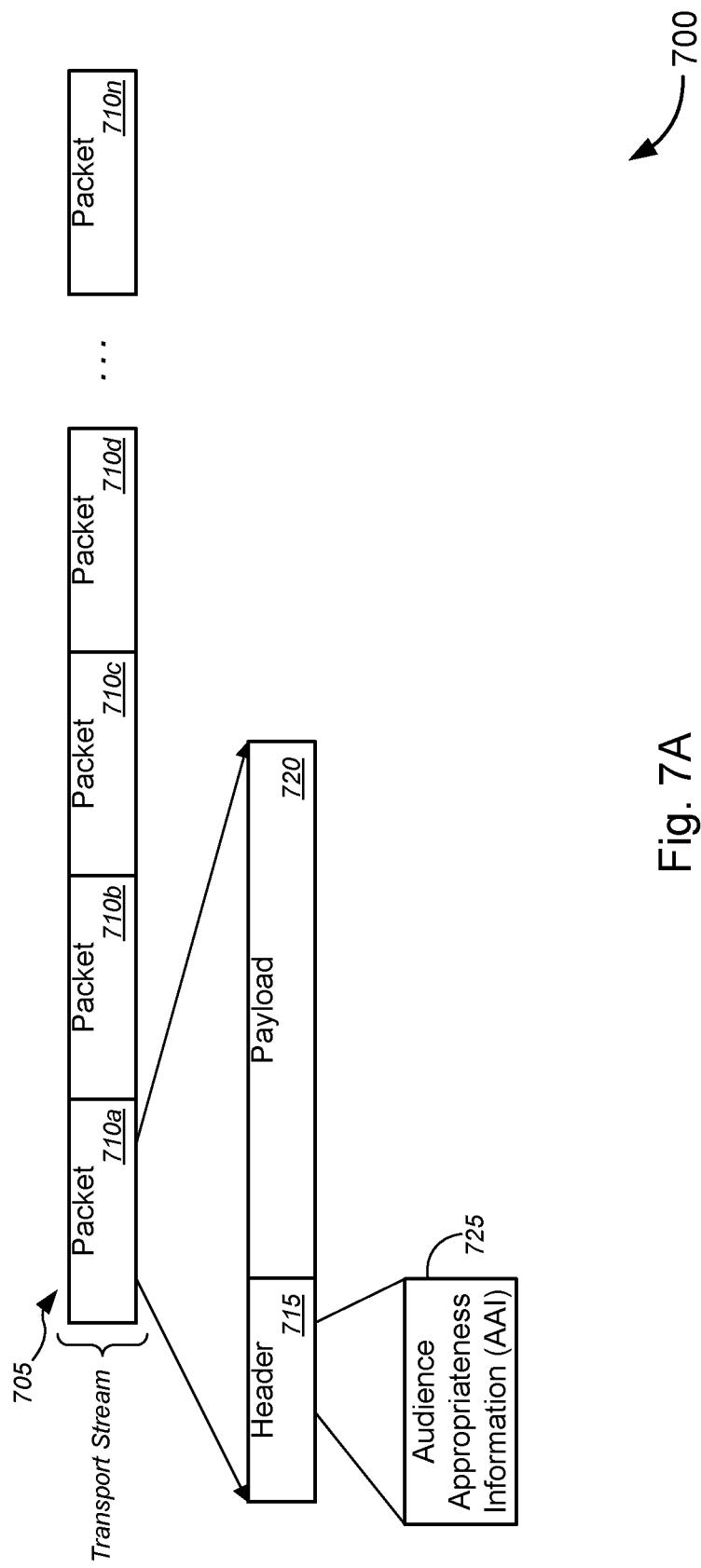
FIGS. 7A and 7B are schematic diagrams illustrating various embodiments of transport streams in which audience appropriate information ("AAI") is inserted to implement metadata solutions for media content delivery.
Figure 7B:
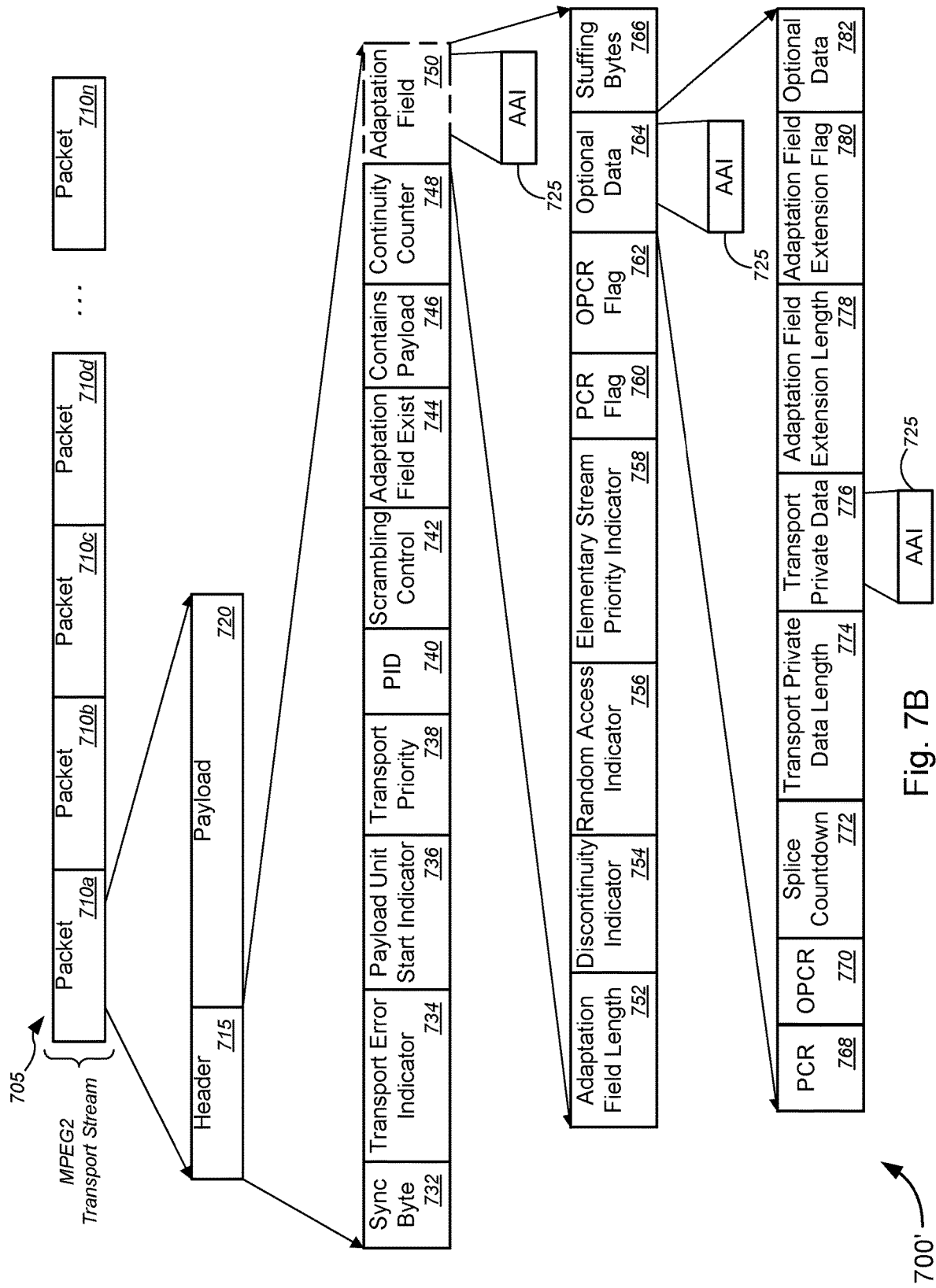

FIGS. 7A and 7B (collectively, "FIG. 7") are schematic diagrams illustrating various embodiments 700 and 700' of transport streams in which audience appropriate information ("AAI") is inserted to implement metadata solutions for media content delivery.

FIG. 7A depicts a generic media content transport stream 705, which comprises a first packet 710a, a second packet 710b, a third packet 710c, a fourth packet 710d, through an N$^{th}$ packet 710n (collectively, "packets 710"). The media content that might be contained in the transport stream 705 might include, without limitation, at least one of video content (e.g., video-on-demand ("VOD") video content, movie content, television episode content, television program content, music video content, video clip content, etc.), audio content (e.g., music, VOD audio content, movie audio content, television episode audio content, television program audio content, music video audio content, video clip audio content, etc.), image content, or gaming content (e.g., cut-scene video and audio content, game play video and audio content, game play dynamic code, character rendering content, environment rendering content, object rendering content, etc.), and/or the like. Each packet 710 might comprise a header 715 and a payload portion 720. In some embodiments, audience appropriateness information ("AAI") regarding each of one or more portions of a particular media content contained in the transport stream 705 might be embedded, encoded, or inserted in the header 715 of each packet 710 of the transport stream 705.

In some embodiments, the AAI regarding each of the one or more portions of the particular media content might include, without limitation, at least one of ratings information for each of the one or more portions of the media content, locations of any inappropriate portions in the media content, length of any inappropriate portions, or location of an appropriate portion of the media content to skip to for each inappropriate portion of the media content, and/or the like. The inappropriate portions might each include, but are not limited to, at least one of a portion containing adult content, a portion containing disturbing subject matter, a portion containing violence, a portion containing foul language, a portion containing drug use, a portion containing people smoking, or a portion containing alcohol use, and/or the like. The AAI can be in any suitable form or format and can contain any suitable number of characters that include, but are not limited to one or more of numerals, alphabetic characters, special characters, binary notations, hexadecimal notations, and/or the like.

With reference to FIG. 7B, a specific embodiment of a MPEG2 or MPEG-2 transport stream is shown for purposes of illustration. Herein, although a MPEG2 transport stream is shown, the various embodiments are not so limited and any suitable transport stream (including, MPEG2 transport streams, MPEG4 transport streams, and/or the like) may be used. The MPEG2 transport stream might contain, without limitation, at least one of video content (e.g., VOD video content, movie content, television episode content, television program content, music video content, video clip content, etc.), audio content (e.g., music, VOD audio content, movie audio content, television episode audio content, television program audio content, music video audio content, video clip audio content, etc.), image content, and/or the like. Further for purposes of illustration, as described below in some of the embodiments, the MPEG2 transport stream is used to transport VOD content (including, video, audio, image, and metadata content, and/or the like).

In the non-limiting embodiment 700' of FIG. 7B, the MPEG2 transport stream, like the generic transport stream of FIG. 7A, might comprise a first packet 710a, a second packet 710b, a third packet 710c, a fourth packet 710d, through an N$^{th}$ packet 710n (collectively, "packets 710"). Each packet 710 might comprise a header 715 and a payload portion 720. Each header 715 might comprise a sync byte 732 (which is used to synchronize transmission of the packets 710), a transport error indicator 734 (which indicates whether or not the packet is corrupt), a payload unit start indicator 736 (which indicates whether a packet begins immediately following the header), a transport priority field 738 (which indicates when a packet has a higher priority than other packets with the same PID), a packet identifier ("PID") field 740 (which identifies or describes the payload data), a scrambling control field 742 (which indicates whether or not the payload is scrambled, and if so with what key or what type of key), an adaptation field exist field 744

(which indicates whether or not there is an adaptation field), a contains payload field 746 (which indicates whether or not there is a payload), and a continuity counter 748 (which indicates the sequence number of payload packets within each stream and is incremented per PID only when a payload flag is set).

Although adaptation field 750 is generally optional (as indicated by the dash-long dash outline in FIG. 7B), for purposes of the various embodiments herein, the adaptation field 750 is assumed to be included in the headers 715 of the MPEG2 transport stream 705. The adaptation field 750 might comprise an adaptation field length field 752 (which indicates the number of bytes in the remaining portions of the adaptation field), a discontinuity indicator 754 (which indicates whether or not the packet is in a discontinuity state with respect to either the continuity counter or the program clock reference), a random access indicator 756 (which indicates whether or not the stream may be decoded without errors from this point), an elementary stream priority indicator 758 (which indicates when the stream should be considered "high priority"), a program clock reference ("PCR") flag 760 (which indicates when there is a PCR field), an original program clock reference ("OPCR") flag 762 (which indicates when there is an OPCR field), one or more optional data fields 764, and a stuffing bytes field 766. The one or more optional data fields 764 might comprise one or more of a PCR field 768 (which indicates the program clock reference value), an OPCR field 770 (which indicates the original program clock reference value, and is usually helpful when one transport stream is copied into another), a splice countdown field 772 (which indicates location of a splicing point in the form of the number of packets following the packet until the next splicing point), a transport private data length field 774 (which indicates the length of the transport private data field), a transport private data field 776 (which contains private data), an adaptation field extension length field 778 (which indicates length of an adaptation field extension field), an adaptation field extension flag 780 (which indicates whether or not there is an adaptation field extension), and one or more optional data fields 782.

As mentioned above, the presence of an adaptation field is indicated by the adaptation field control bits in the transport stream packet. If present, the adaptation field directly follows the 4 B packet header, before any payload data. It may contain a variety of data used for timing and control. One important item in most adaptation packets is the PCR field. Another important item is the splice countdown field, which is used to indicate the end of a series of elementary stream ("ES") access units. The splice countdown field allows the MPEG2 transport multiplexer to determine appropriate places in a stream were the video may be spliced to another video from another video source without introducing undesirable disruption to the video replayed by the receiver. Since MPEG2 video uses interframe coding, a seamless switch-over between sources can only occur on an I-frame boundary (which is indicated by a splice count of 0). This feature may, for instance, be used to insert a news flash in a scheduled TV transmission. One other bit of interest is the transport private data flag, which is set to 1 when the adaptation field contains private data bytes. Another bit of interest is the transport private data length field, which specifies how many private data bytes will follow the field. Private data is not allowed to increase the adaptation field beyond the transport stream payload size of 184 bytes.

According to some embodiments, AAI regarding each of one or more portions of a particular media content (e.g., VOD content) contained in the transport stream 705 might be embedded, encoded, or inserted in the header 715 of each packet 710 of the transport stream 705—specifically, embedded, encoded, or inserted in one or more of the adaptation field 750, the one or more optional data fields 764, and/or the transport private data field 776, or the like. As above, in some embodiments, the audience appropriateness information regarding each of the one or more portions of the particular media content might include, without limitation, at least one of ratings information for each of the one or more portions of the media content, locations of any inappropriate portions in the media content, length of any inappropriate portions, or location of an appropriate portion of the media content to skip to for each inappropriate portion of the media content, and/or the like. The inappropriate portions might each include, but are not limited to, at least one of a portion containing adult content, a portion containing disturbing subject matter, a portion containing violence, a portion containing foul language, a portion containing drug use, a portion containing people smoking, or a portion containing alcohol use, and/or the like.

Figure 8:
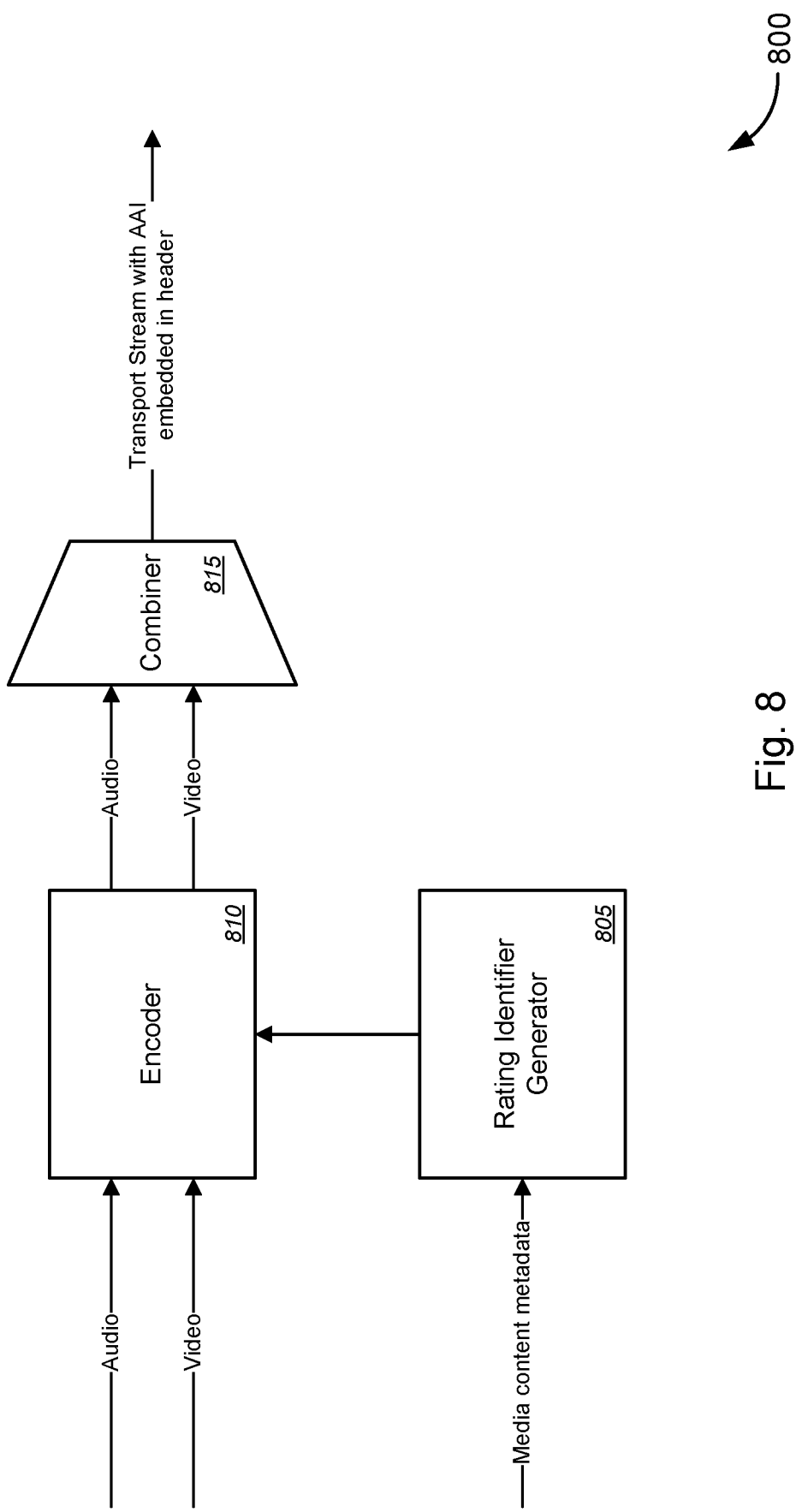
FIG. 8 is a schematic diagram illustrating a system for encoding AAI in a media content transport stream to implement metadata solutions for media content delivery, in accordance with various embodiments.

FIG. 8 is a schematic diagram illustrating a system 800 for encoding AAI in a media content transport stream to implement metadata solutions for media content delivery, in accordance with various embodiments. In the non-limiting embodiment of FIG. 8, system 800 might comprise a rating identifier generator 805, an encoder 810, and a combiner 815. The rating identifier generator 805 might receive media content metadata or the like, and might generate AAI regarding each of one or more portions of a particular media content that is being (or is intended to be) sent over the transport stream (e.g., transport stream 205 of FIG. 2A or 2B, or the like), based on the received media content metadata or the like. The rating identifier generator 805 then sends the AAI to the encoder 810. The encoder 810, which receives video and/or audio content (e.g., from a content provider server and/or database (e.g., content provider server 130a-130n and/or database 135a-135n of system 100 in FIG. 1) or from a content aggregator server and/or database (e.g., content aggregator server 140 and/or database 145 of system 100 in FIG. 1)), might encode the AAI that is received from the rating identifier generator 805 in a header of each packet of the transport stream containing the received video and/or audio content. In some cases, the AAI might be embedded, encoded, or inserted in the header of each I-frame of the transport stream of the media content. The combiner 815—which in some embodiments might include, without limitation, a multiplexer or the like—might combine (or multiplex) the various component streams of the media content (i.e., the video stream, audio stream, metadata stream, etc.) into a single transport stream (which might have the AAI embedded in the headers of the packets in the stream). The transport stream might subsequently be sent to one or more user devices over a network (e.g., over network 120 and/or 125 of system 100 in FIG. 1, or the like). The one or more user devices, in some embodiments, might include, without limitation, one or more of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like.

Figure 9:
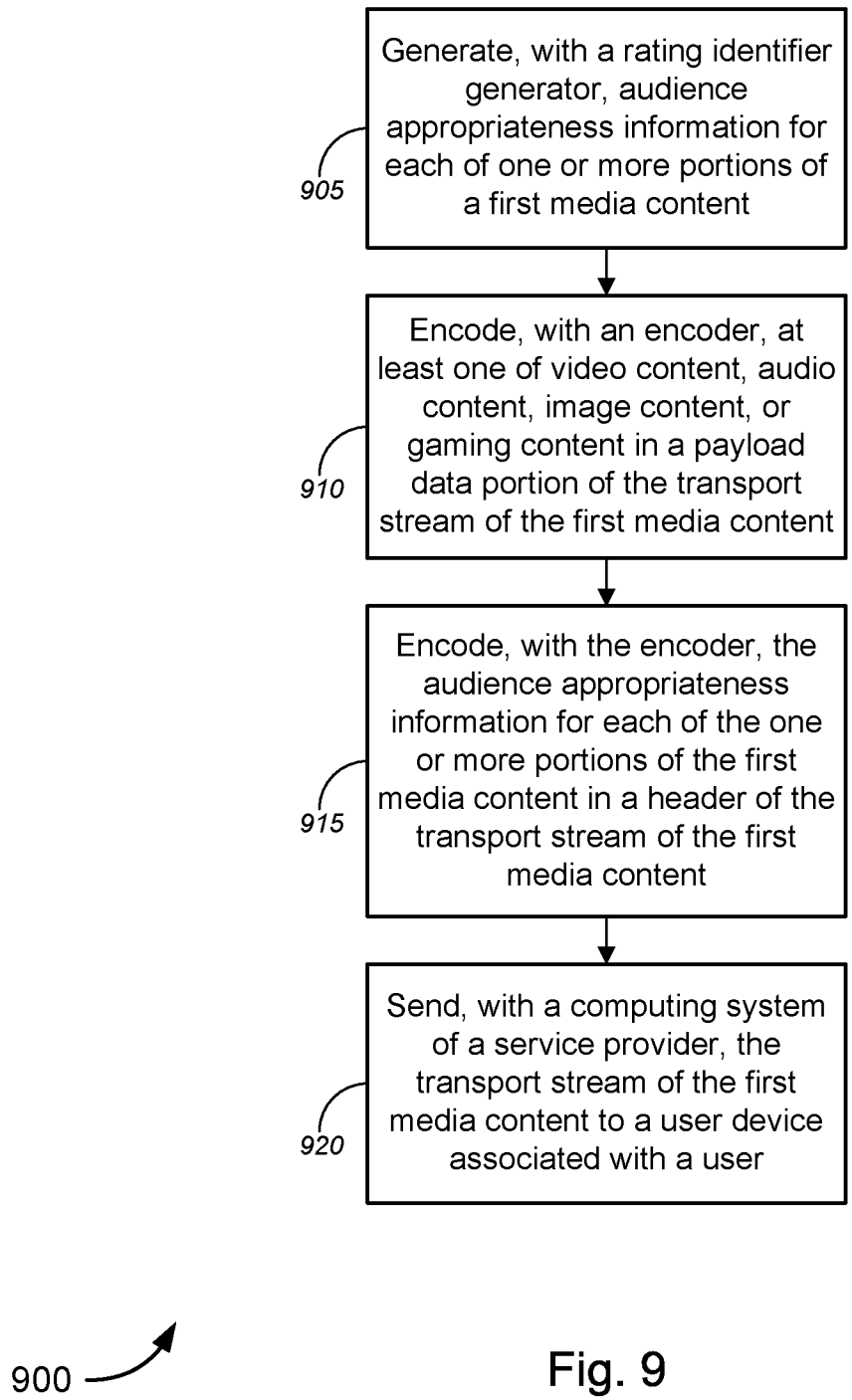
FIG. 9 is a flow diagram illustrating a method for encoding AAI in a media content transport stream to implement metadata solutions for media content delivery, in accordance with various embodiments.

FIG. 9 is a flow diagram illustrating a method 900 for encoding AAI in a media content transport stream to implement metadata solutions for media content delivery, in accordance with various embodiments.

While the techniques and procedures are depicted and/or described in a certain order for purposes of illustration, it should be appreciated that certain procedures may be reordered and/or omitted within the scope of various embodiments. Moreover, while the method 900 illustrated by FIG. 9 can be implemented by or with (and, in some cases, are described below with respect to) the systems 100 and 800 of FIGS. 1 and 8 respectively (or components thereof), such methods may also be implemented using any suitable hardware (or software) implementation. Similarly, while each of the systems 100 and 800 of FIGS. 1 and 8, respectively (or components thereof), can operate according to the method 900 illustrated by FIG. 9 (e.g., by executing instructions embodied on a computer readable medium), the systems 100 and 800 of FIGS. 1 and 8 can each also operate according to other modes of operation and/or perform other suitable procedures.

In FIG. 9, method 900, at block 905, might comprise generating, with a rating identifier generator (which might correspond to rating identifier generator 805 of system 800 in FIG. 8), audience appropriateness information ("AAI") for each of the one or more portions of a first media content. In some embodiments, the audience appropriateness information regarding each of the one or more portions of the particular media content might include, without limitation, at least one of ratings information for each of the one or more portions of the first media content, locations of any inappropriate portions in the first media content, length of any inappropriate portions, or location of an appropriate portion of the first media content to skip to for each inappropriate portion of the first media content, and/or the like. The inappropriate portions might each include, but are not limited to, at least one of a portion containing adult content, a portion containing disturbing subject matter, a portion containing violence, a portion containing foul language, a portion containing drug use, a portion containing people smoking, or a portion containing alcohol use, and/or the like.

Method 900 might further comprise encoding, with an encoder (which might correspond to encoder 810 of system 800 in FIG. 8), at least one of video content, audio content, image content, gaming content, and/or the like in a payload data portion of a transport stream of the first media content (block 910) and encoding, with the encoder, the AAI regarding each of the one or more portions of the first media content in a header of the transport stream of the first media content (block 915). At block 920, method 900 might comprise sending, with a computing system of a service provider, the transport stream of the first media content to a user device associated with a user. The user device associated with the user, in some embodiments, might include, without limitation, one or more of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like.

Figure 10:
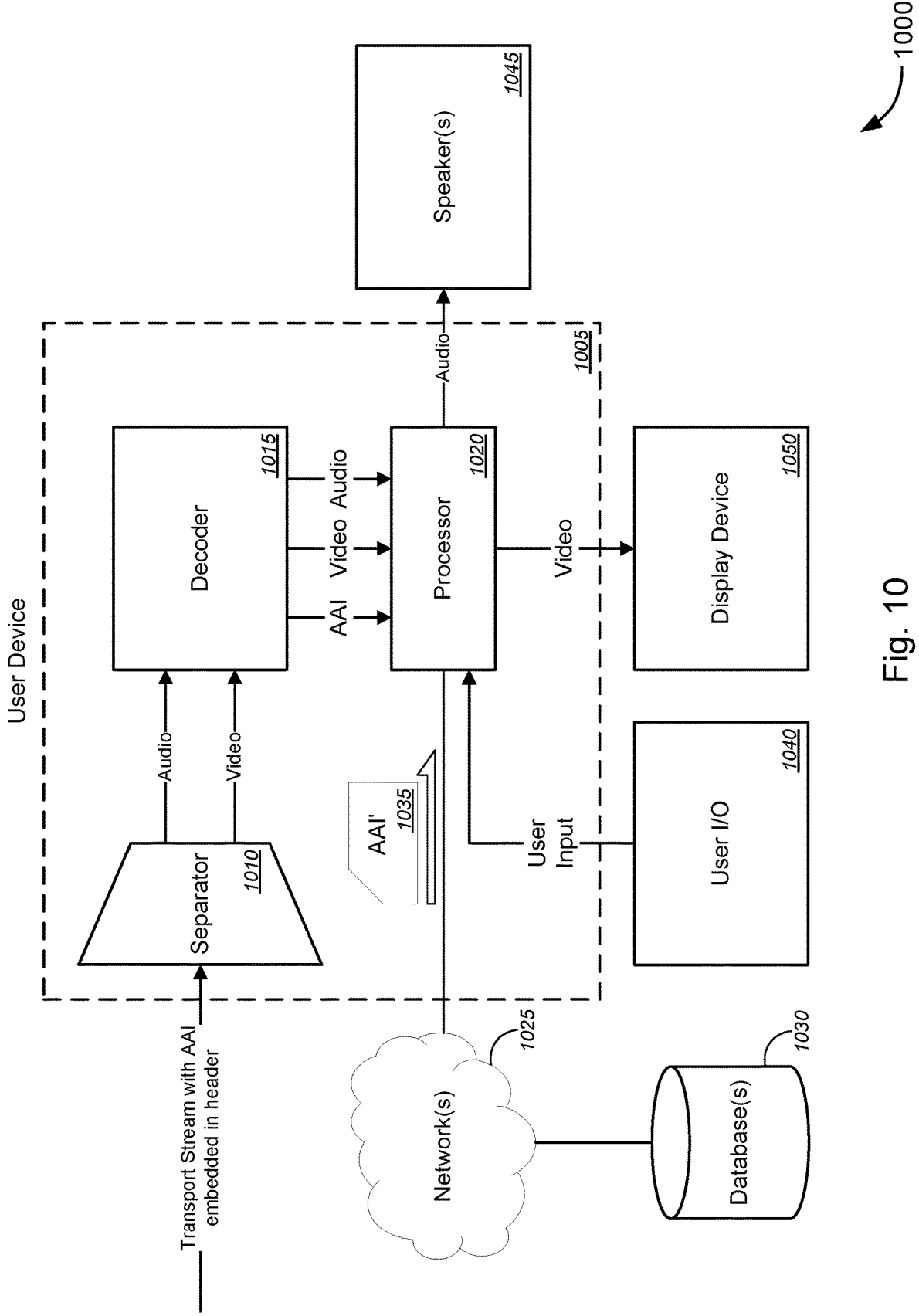
FIG. 10 is a schematic diagram illustrating a system for decoding AAI from a media content transport stream to implement metadata solutions for media content delivery based on user input regarding preferred ratings levels of one or more portions of the media content and based on the AAI, in accordance with various embodiments.

FIG. 10 is a schematic diagram illustrating a system 1000 for decoding AAI from a media content transport stream to implement metadata solutions for media content delivery based on user input regarding preferred ratings levels of one or more portions of the media content and based on the AAI, in accordance with various embodiments.

In the non-limiting embodiment of FIG. 10, system 1000 might comprise a user device 1005, a separator 1010, a decoder 1015, a processor 1020, one or more networks 1025, one or more databases 1030, one or more user input (and in some cases, input/output) devices 1040, one or more speakers 1045, and one or more display devices 1050. According to some embodiments, the user device 505 might include, but is not limited to, at least one of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like. Although FIG. 10 depicts the separator 1010 and the decoder 1015 as being disposed within the user device 1005, the various embodiments are not so limited, and the separator 1010 and/or the decoder 1015 might be separate from (i.e., external to) yet communicatively coupled to the user device 1005, or might be embodied in different user devices. Similarly, although FIG. 10 depicts the user input (or input/output) device(s) 1040, the speaker(s) 1045, and the display device(s) 1050 as being external to, yet communicatively coupled to the user device 1005, the various embodiments are not so limited, and one or more of the user input (or input/output) device(s) 1040, the speaker(s) 1045, and/or the display device(s) 1050 might be part of, or disposed within, the user device 1005. For example, the separator 1010 and decoder 1015, in some cases might be disposed within a set-top box or the like, which might send the separated and decoded media content signal to a television or digital video recording/playback device, which might send video data to display device 1050 and audio data to speaker(s) 1045 for presentation of video content (e.g., VOD content or other video content) to the user. Alternatively, the separator 1010 and decoder 1015 might be disposed within a tablet computer or a smart phone, which might present the media content (i.e., video, audio, image, game, and/or the like) to the user via built-in display 1050 (e.g., touchscreen display) and/or via built-in speakers 1045 (e.g., device speakers), and might receive user input via the touchscreen display, which might also serve as the user input (or input/output) device 1040. And so on.

According to some embodiments, the user device 1005 and/or the separator 1010 might receive the transport stream with the AAI embedded in the headers of the packets in the transport stream, and might separate the transport stream into constituent parts (e.g., video stream, audio stream, image stream, gaming content stream, metadata stream, etc.). In some cases, the AAI might be embedded, encoded, or inserted in the header of each I-frame of the transport stream of the media content. The decoder 1015 might decode the various streams and might extract or access the AAI that is embedded, encoded, or inserted in the headers of the packets (or I-frame), and might send the various decoded streams and the AAI to the processor 1020. The processor 1020 might analyze the AAI to determine if it contains complete AAI (e.g., complete AAI information for the portion of the media content contained in the payload of the same packet in which the particular AAI is contained, complete AAI information for the portions of the media content contained in payloads of multiple packets, or complete AAI information for all of the media content contained in the entire transport stream, or the like) or if it contains location information for complete AAI data for the media content or for updated or updatable AAI data for the media content. Based on a determination that the decoded AAI contains location information for complete AAI or for updated or updatable AAI, the processor 1020 might access one or more databases 1030 (which might correspond to databases 135a-135n, 145, 115, and/or the like of system 100 of FIG. 1, or might be a third party metadata database, and/or the like) via network(s) 1025 (which might correspond to networks 120 or 125 of system 100 of FIG. 1, or the like) to retrieve complete (or updated/updatable) AAI data (depicted in FIG. 10 as AAI' 1035), which might include, but is not limited to, at least one of ratings information for each of the one or more portions of the media content, locations of any inappropriate portions in the media content, length of any inappropriate portions, or location of an appropriate portion of the media content to skip to for each inappropriate portion of the media content, and/or the like. The inappropriate portions might each include, but are not limited to, at least one of a portion containing adult content, a portion containing disturbing subject matter, a portion containing violence, a portion containing foul language, a portion containing drug use, a portion containing people smoking, or a portion containing alcohol use, and/or the like.

The processor 1020 might also present to the user via the user input (or input/output) device(s) 1040 (either beforehand or in response to receive at least one packet of the transport stream of the media content) options associated with user preferences regarding ratings levels of one or more portions (e.g., scenes in video content, parts of audio content, portions of an image, scenes or parts of gaming content, etc.) in the media content based at least in part on the AAI for each of the one or more portions of the media content that is contained in the decoded headers (of the packets or I-frames) of the transport stream. In some cases, the user input might indicate appropriate ratings levels for adult viewers/listeners/gamers, for child viewers/listeners/gamers (in some cases, at particular ages or age groups), and so on. Alternatively, or additionally, the user input might indicate whether or not to present any or particular ones of portions containing adult content, portions containing disturbing subject matter, portions containing violence, portions containing foul language, portions containing drug use, portions containing people smoking, or portions containing alcohol use, and/or the like (collectively, "one or more objectionable content"). Alternatively, or additionally, the user input might indicate when particular persons—for which content should be filtered to the previously indicated/selected ratings levels or to block the previously indicated/selected one or more objectionable content—has entered the room or has come into viewing/listening range of the media content containing potentially objectionable content. Based on the retrieved AAI 1035 (whether decoded/extracted from the header of the transport stream and/or retrieved from the database 1030 via network 1025) and based on the received user input via the user input (or input/output) device 1040, the processor 1020 might modify the various media content streams and might present any video content, any image content, and/or any gaming content to the user via display device(s) 1050 and/or might present any audio content to the user via speaker(s) 1045, by filtering (as appropriate) one or more objectionable content (in accordance with the user input and AAI).

Figure 11:
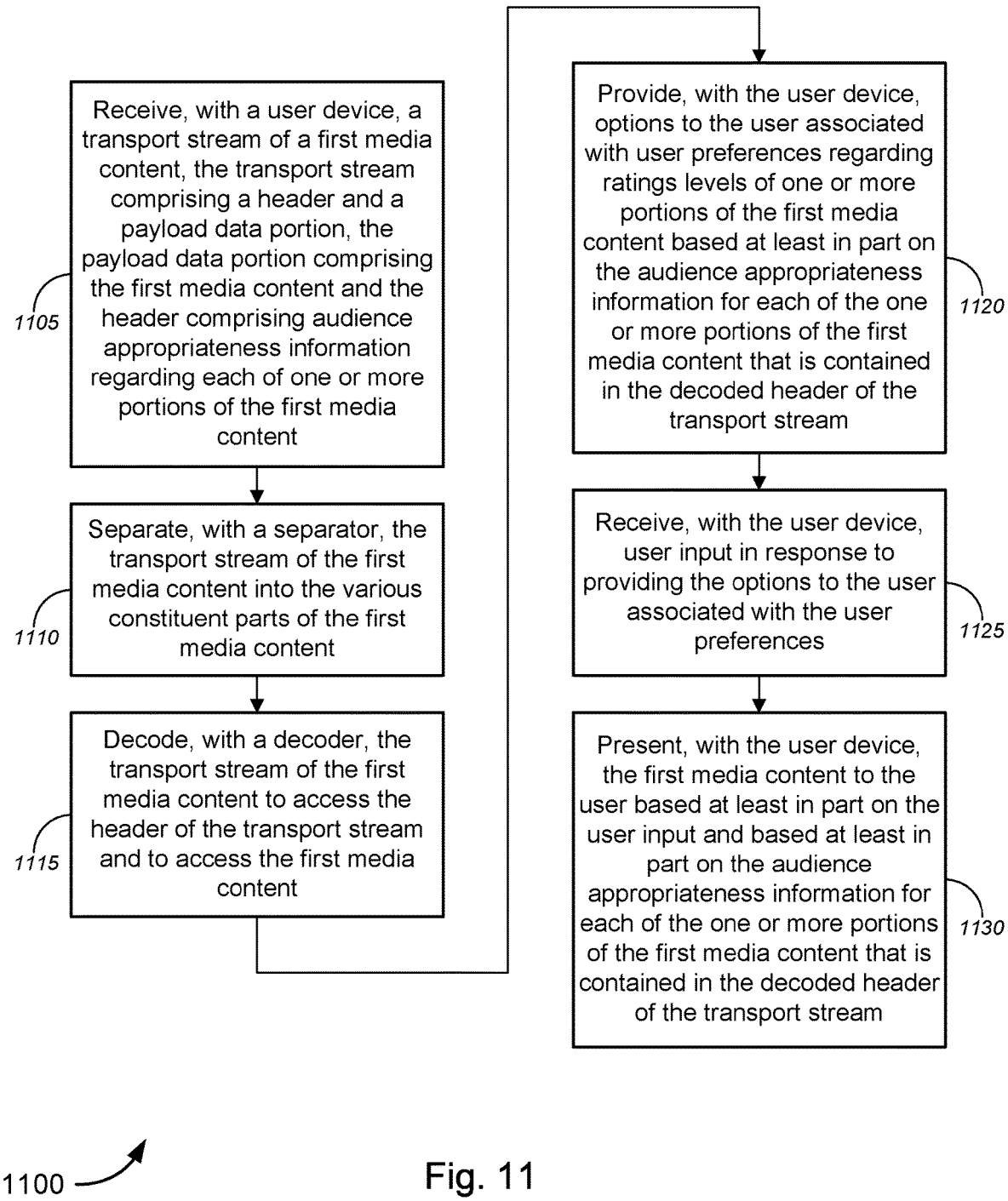
FIG. 11 is a flow diagram illustrating a method for decoding AAI from a media content transport stream to implement metadata solutions for media content delivery based on user input regarding preferred ratings levels of one or more portions of the media content and based on the AAI, in accordance with various embodiments.

FIG. 11 is a flow diagram illustrating a method 1100 for decoding AAI from a media content transport stream to implement metadata solutions for media content delivery based on user input regarding preferred ratings levels of one or more portions of the media content and based on the AAI, in accordance with various embodiments.

While the techniques and procedures are depicted and/or described in a certain order for purposes of illustration, it should be appreciated that certain procedures may be reordered and/or omitted within the scope of various embodiments. Moreover, while the method 1100 illustrated by FIG. 11 can be implemented by or with (and, in some cases, are described below with respect to) the systems 100 and 1000 of FIGS. 1 and 10 respectively (or components thereof), such methods may also be implemented using any suitable hardware (or software) implementation. Similarly, while each of the systems 100 and 1000 of FIGS. 1 and 10, respectively (or components thereof), can operate according to the method 1100 illustrated by FIG. 11 (e.g., by executing instructions embodied on a computer readable medium), the systems 100 and 1000 of FIGS. 1 and 10 can each also operate according to other modes of operation and/or perform other suitable procedures.

In FIG. 11, method 1100, at block 1105, might comprise receiving, with a user device (which might correspond to user device 1005 of system 1000 in FIG. 10, or the like), a transport stream of a first media content. The transport stream might comprise a header and a payload data portion, and the payload data portion might comprise the first media content and the header might comprise audience appropriateness information ("AAI") regarding each of one or more portions of the first media content. In some cases, the AAI might be embedded, encoded, or inserted in the header of each I-frame of the transport stream of the media content. At block 1110, method 1100 might comprise separating, with a separator (which might correspond to separator 1010 of system 1000 in FIG. 10) that is communicatively coupled to the user device or that is disposed within the user device, the transport stream of the first media content into the various constituent parts of the first media content (i.e., video stream, audio stream, image stream, gaming content stream, metadata stream, etc.). The method 1100 might further comprise decoding, with a decoder (which might correspond to decoder 1015 of system 1000 in FIG. 10) that is communicatively coupled to the user device or that is disposed within the user device, the separated parts of the transport stream of the first media content to access the header of the transport stream and to access the first media content (block 1115). In some cases, the AAI might comprise or further comprise location information for complete AAI data for the media content or for updated or updatable AAI data for the media content, and based on a determination that the decoded AAI contains location information for complete AAI or for updated or updatable AAI, the user device might access one or more databases via one or more network(s) (which might include, but are not limited to, at least one of a network associated with a content provider of the first media content, one or more networks associated with other metadata providers, or one or more networks associated with a cloud service provider, and/or the like) to retrieve the complete (or updated/updatable) AAI data (as shown in, and as described in detail above with respect to, FIG. 10). The AAI might include, without limitation, at least one of ratings information for each of the one or more portions of the media content, locations of any inappropriate portions in the media content, length of any inappropriate portions, or location of an appropriate portion of the media content to skip to for each inappropriate portion of the media content, and/or the like. The inappropriate portions might each include, but are not limited to, at least one of a portion containing adult content, a portion containing disturbing subject matter, a portion containing violence, a portion containing foul language, a portion containing drug use, a portion containing people smoking, or a portion containing alcohol use, and/or the like.

At block 1120, method 1100 might comprise providing, with the user device, options to the user associated with user preferences regarding ratings levels of one or more portions of the first media content based at least in part on the AAI for each of the one or more portions of the first media content that is contained in the decoded header (of the packets or I-frames) of the transport stream (as described in detail above with respect to FIG. 10). Method 1100 might further comprise receiving, with the user device, user input (non-limiting examples of which are described above with respect to FIG. 10) in response to providing the options to the user associated with the user preferences (block 1125). Although FIG. 11 depicts the processes of blocks 1120 and 1125 in order between decoding the transport stream and presenting the first media content to the user, the various embodiments are not so limited, and these processes of blocks 1120 and 1125 can be implemented at any time prior to receiving the transport stream of the first media content, in response to receiving the transport stream of the first media content, or after or while decoding the transport stream, as appropriate. In these embodiments, the user input might be stored on a local and/or remote data store, or the like.

Method 1130, at block 1130, might comprise presenting, with the user device, the first media content to the user based at least in part on the user input and based at least in part on the AAI for each of the one or more portions of the first media content that is contained in the decoded header (of the packets or I-frames) of the transport stream.

Figure 12A:
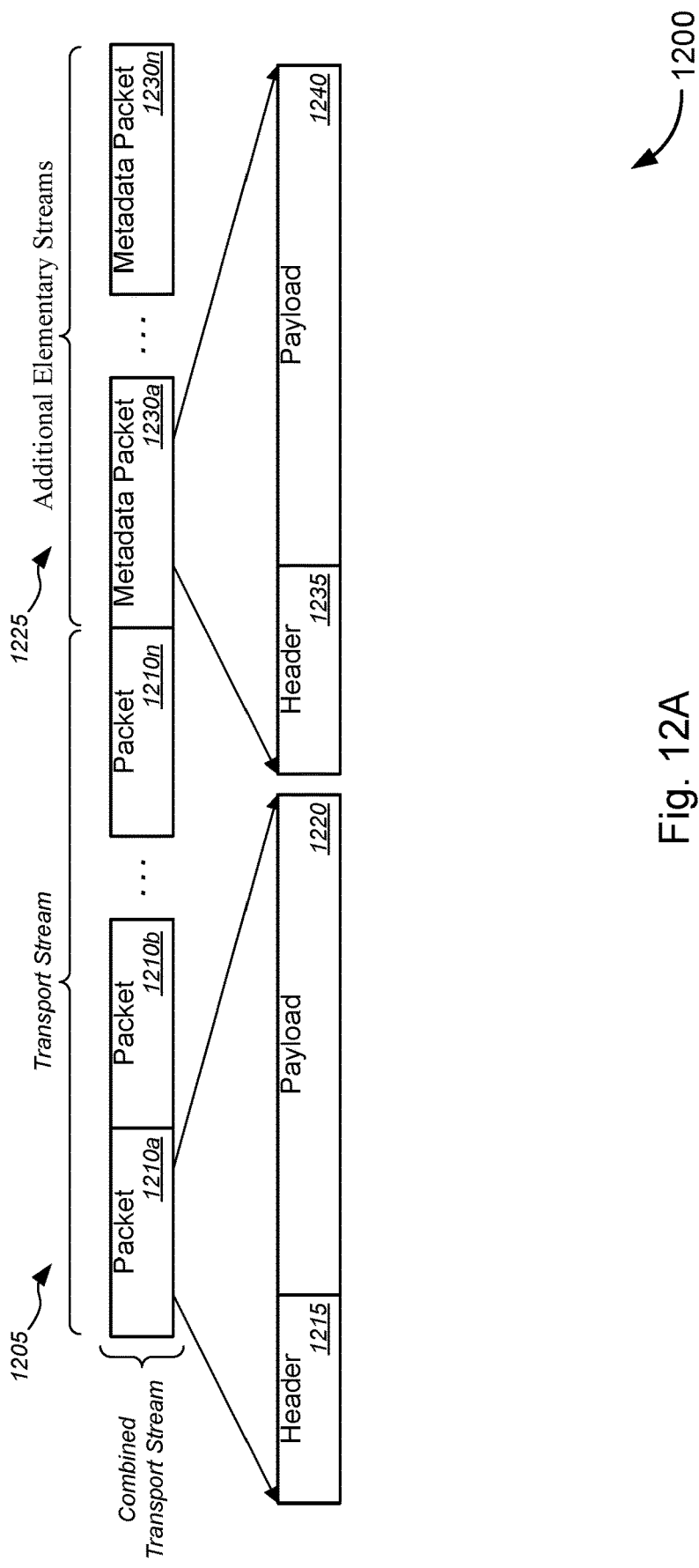
FIGS. 12A and 12B are schematic diagrams illustrating various embodiments of transport streams in which auxiliary data are combined as additional elementary streams with a media content transport stream to create a combined transport stream of the media content to implement metadata solutions for media content delivery.
Figure 12B:
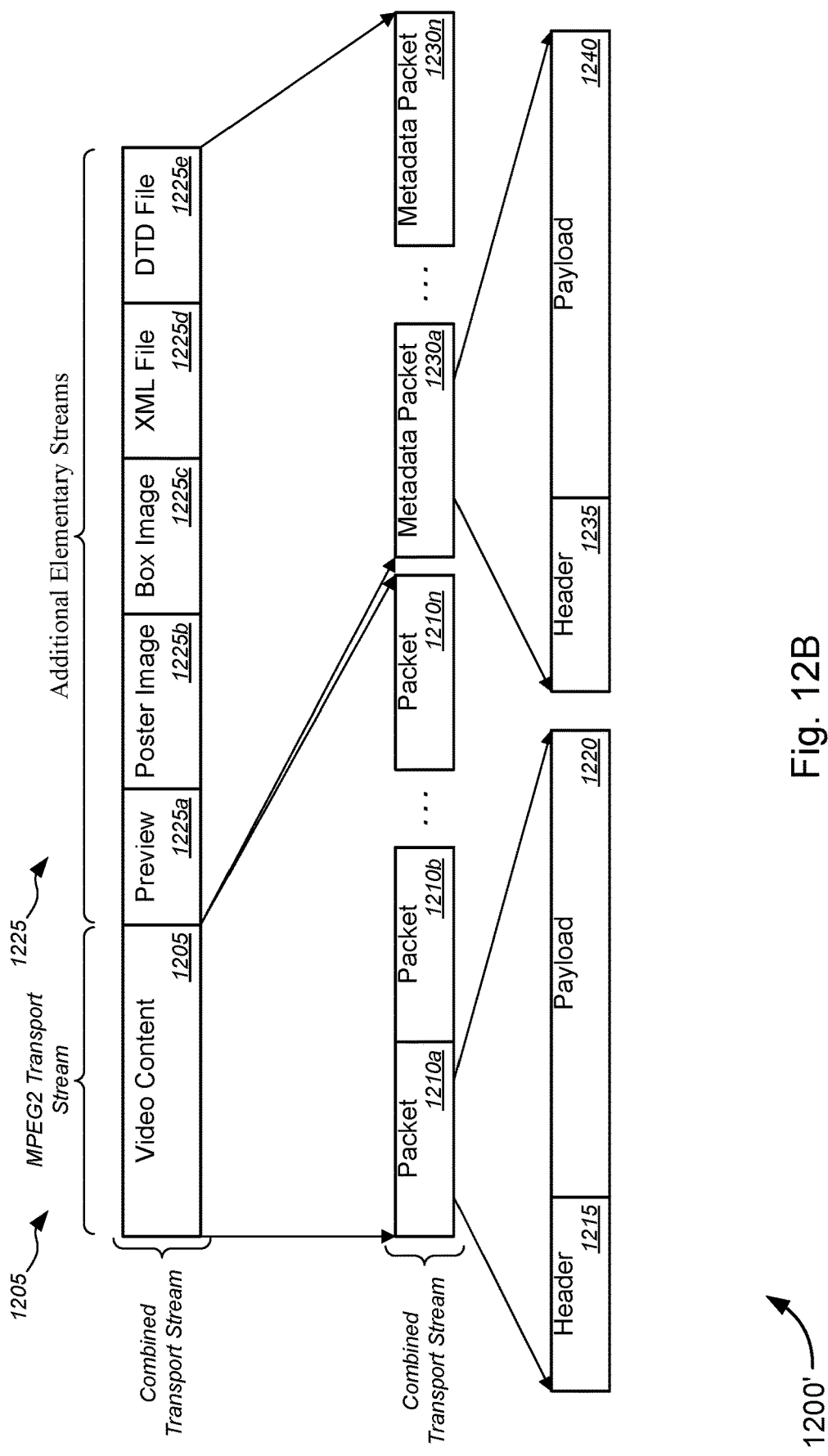

Auxiliary Data in Additional Elementary Streams Combined with Media Content Transport Stream FIGS. 12A and 12B (collectively, "FIG. 12") are schematic diagrams illustrating various embodiments 1200 and 1200' of transport streams in which auxiliary data are combined as additional elementary streams with a media content transport stream to create a combined transport stream of the media content to implement metadata solutions for media content delivery.

FIG. 12A depicts a generic media content transport stream 1205, which comprises a first packet 1210a, a second packet 1210b, through an N$^{th}$ packet 1210n (collectively, "packets 1210"). The media content that might be contained in the transport stream 1205 might include, without limitation, at least one of video content (e.g., video-on-demand ("VOD") video content, movie content, television episode content, television program content, music video content, video clip content, etc.), audio content (e.g., music, VOD audio content, movie audio content, television episode audio content, television program audio content, music video audio content, video clip audio content, etc.), image content, or gaming content (e.g., cut-scene video and audio content, game play video and audio content, game play dynamic code, character rendering content, environment rendering content, object rendering content, etc.), and/or the like. Each packet 1210 might comprise a header 1215 and a payload portion 1220. In some embodiments, a globally unique identifier ("GUID") that is specific to and uniquely identifies a particular media content contained in the transport stream 1205 might be embedded, encoded, or inserted in the header 1215 of each packet 1210 of the transport stream 1205 (as described in detail above with respect to FIGS. 2-6). Alternatively, or additionally, audience appropriateness information ("AAI") regarding each of one or more portions of a particular media content contained in the transport stream 1205 might be embedded, encoded, or inserted in the header 1215 of each packet 1210 or I-frame of the transport stream 1205 (as described in detail above with respect to FIGS. 7-11).

In the non-limiting embodiment 1200 of FIG. 12A, the transport stream 1205 might be combined with one or more additional elementary streams 1225 to create a combined transport stream. In some cases, the one or more additional elementary streams 1225 might comprise first through N$^{th}$ metadata packets 1230a-1230n (collectively, "metadata packets 1230" or "auxiliary data packets 1230"). Each metadata (or auxiliary data) packet 1230 might comprise a header 1235 and a payload portion 1240. The metadata packets 1230 might contain in the payload portions 1240 thereof any additional data or metadata associated with the particular media content contained in the transport stream 1205. According to some embodiments, a GUID that is specific to and uniquely identifies each auxiliary data stream (or additional elementary stream) of the media content might be embedded, encoded, or inserted in the header of each packet of the particular auxiliary data stream (or additional elementary stream). Alternatively, or additionally, AAI regarding each of one or more portions of particular auxiliary data might be embedded, encoded, or inserted in the header of each packet or I-frame of the corresponding particular auxiliary data stream (or additional elementary stream).

With reference to FIG. 12B, a specific embodiment of a MPEG2 or MPEG-2 transport stream is shown for purposes of illustration. Herein, although a MPEG2 transport stream is shown, the various embodiments are not so limited and any suitable transport stream (including, MPEG2 transport streams, MPEG4 transport streams, and/or the like) may be used. The MPEG2 transport stream might contain, without limitation, at least one of video content (e.g., VOD video content, movie content, television episode content, television program content, music video content, video clip content, etc.), audio content (e.g., music, VOD audio content, movie audio content, television episode audio content, television program audio content, music video audio content, video clip audio content, etc.), image content, and/or the like. Further for purposes of illustration, as described below in some of the embodiments, the MPEG2 transport stream is used to transport VOD content (including, video, audio, image, and metadata content, and/or the like).

In the non-limiting embodiment 1200' of FIG. 12B, the MPEG2 transport stream, like the generic transport stream of FIG. 12A, might comprise a first packet 1210a, a second packet 1210b, through an N$^{th}$ packet 1210n (collectively, "packets 1210"). Each packet 1210 might comprise a header 1215 and a payload portion 1220. Like the embodiment of FIG. 12A, the MPEG2 transport stream 1205 might be combined with one or more additional elementary streams 1225 to create a combined transport stream. In some cases, the one or more additional elementary streams 1225 might comprise first through N$^{th}$ metadata packets 1230a-1230n (collectively, "metadata packets 1230" or "auxiliary data packets 1230"). Each metadata (or auxiliary data) packet 1230 might comprise a header 1235 and a payload portion 1240. According to some embodiments, the one or more additional elementary streams 1225 might include, without limitation, one or more first auxiliary data streams 1225a containing one or more preview (e.g., original theatrical trailer, one or more teaser trailers, one or more alternate trailers, etc.), one or more second auxiliary data streams 1225b containing one or more poster images (e.g., original theatrical release poster images, teaser poster images, one or more other poster images, etc.), one or more third auxiliary data streams 1225c containing one or more box cover images (e.g., DVD package images, Blu-ray package images, etc.), one or more fourth auxiliary data streams 1225d containing one or more extensible markup language ("XML") documents containing metadata of the VOD or other video content or containing location in a network of at least one such XML document, one or more fifth auxiliary data streams 1225e containing one or more document type definition ("DTD") documents defining a structure of the metadata contained or referenced by the one or more XML documents or containing location in the network of at least one such DTD document, and/or the like.

In some embodiments, a GUID that is specific to and uniquely identifies a particular media content contained in the transport stream 1205 might be embedded, encoded, or inserted in the header 1215 of each packet 1210 of the transport stream 1205 (as described in detail above with respect to FIGS. 2-6). Alternatively, or additionally, AAI regarding each of one or more portions of a particular media content contained in the transport stream 1205 might be embedded, encoded, or inserted in the header 1215 of each packet 1210 or I-frame of the transport stream 1205 (as described in detail above with respect to FIGS. 7-11). In a similar manner, a GUID that is specific to and uniquely identifies each auxiliary data stream (or additional elementary stream) of the first media content might be embedded, encoded, or inserted in the header of each packet of the particular auxiliary data stream (or additional elementary stream). Alternatively, or additionally, AAI regarding each of one or more portions of particular auxiliary data (i.e., one or more previews of the first media content, one or more poster images, one or more box cover images, one or more other auxiliary content associated with the media content, and/or the like) might be embedded, encoded, or inserted in the header of each packet or I-frame of the corresponding particular auxiliary data stream (or additional elementary stream).

Figure 13:
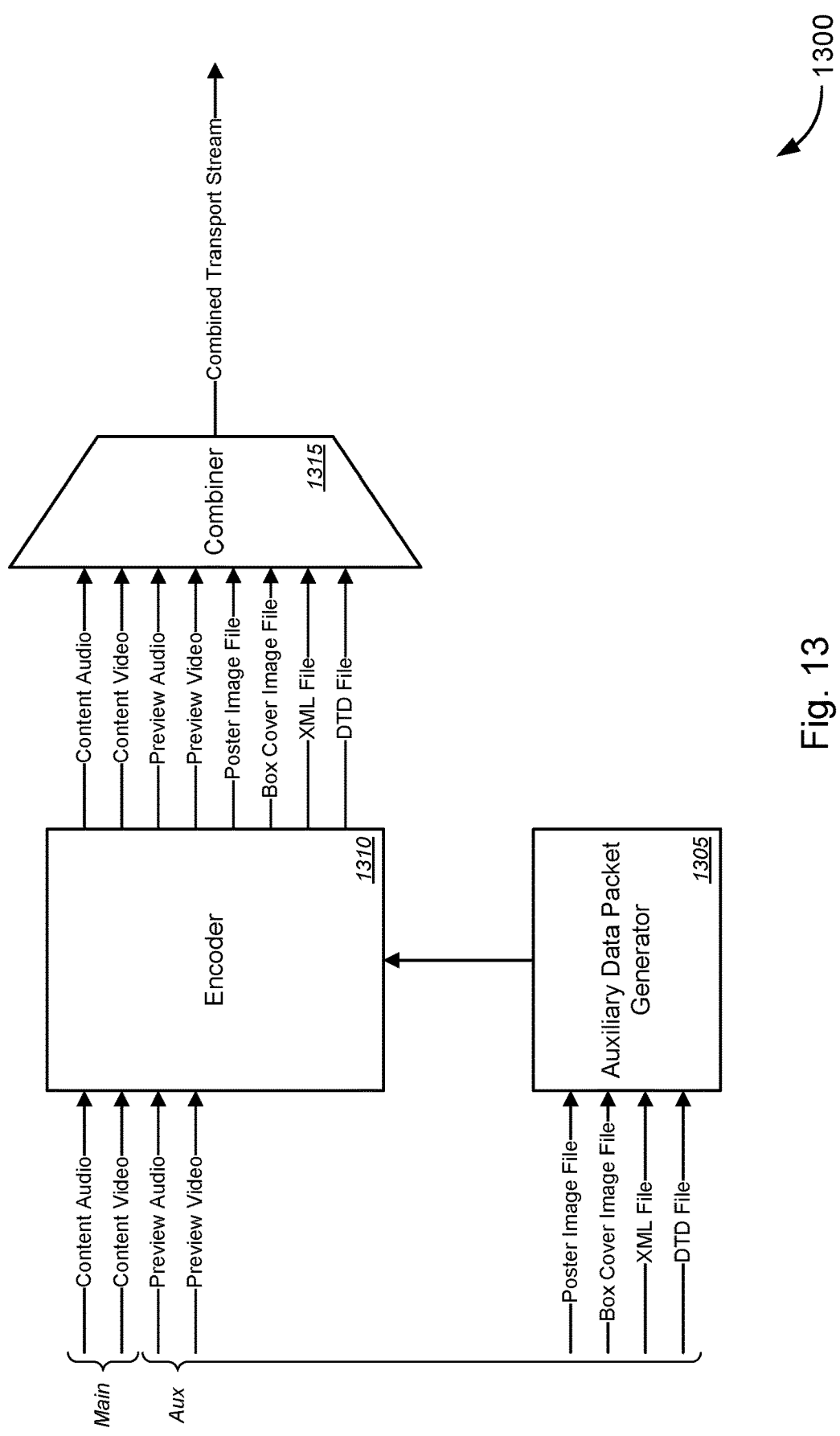
FIG. 13 is a schematic diagram illustrating a system for combining auxiliary data as additional elementary streams with a media content transport stream to create a combined transport stream of the media content to implement metadata solutions for media content delivery, in accordance with various embodiments.

FIG. 13 is a schematic diagram illustrating a system 1300 for combining auxiliary data as additional elementary streams with a media content transport stream to create a combined transport stream of the media content to implement metadata solutions for media content delivery, in accordance with various embodiments. In the non-limiting embodiment of FIG. 13, system 1300 might comprise an auxiliary data packet generator 1305, an encoder 1310, and a combiner 1315. The auxiliary data packet generator 1305 might receive VOD metadata, VOD auxiliary data or content, and/or the like—including, but not limited to, one or more poster image files containing one or more poster images (e.g., original theatrical release poster images, teaser poster images, one or more other poster images, etc.), one or more box cover image files containing one or more box cover images (e.g., DVD package images, Blu-ray package images, etc.), one or more XML files containing metadata of the VOD or other video content or containing location in a network of at least one such XML document, one or more DTD files defining a structure of the metadata contained or referenced by the one or more XML documents or containing location in the network of at least one such DTD document, and/or the like—and might generate auxiliary data packets associated with a particular media content that is being (or is intended to be) sent over the transport stream (e.g., transport stream 1205 of FIG. 12A or 12B, or the like), based on the received VOD metadata, VOD auxiliary data or content, and/or the like. The auxiliary data packet generator 1305 then sends the auxiliary data packets to the encoder 1310. The encoder 1310—which receives, from a content provider server and/or database (e.g., content provider server 130a-130n and/or database 135a-135n of system 100 in FIG. 1) or from a content aggregator server and/or database (e.g., content aggregator server 140 and/or database 145 of system 100 in FIG. 1), video and/or audio content as well as any preview video and/or audio content (e.g., original theatrical trailer, one or more teaser trailers, one or more alternate trailers, etc.)—might encode the auxiliary data packets that are received from the auxiliary data packet generator 1305 while also encoding the video and/or audio content as well as the preview video and/or audio content (if any). Here, the video and/or audio content might be sent as a media content stream, and might be referred to as the "main content," while the preview video and/or audio content, the one or more poster image files in the auxiliary data packets, the one or more box cover image files in the auxiliary data packets, the one or more XML files in the auxiliary data packets, the one or more DTD files in the auxiliary data packets, and/or the like might be sent as auxiliary data streams or as additional elementary streams, and might be referred to as the "auxiliary content."

The combiner 1315—which in some embodiments might include, without limitation, a multiplexer or the like—might combine (or multiplex) the various component streams of the media content (i.e., the video stream, audio stream, metadata stream, etc.) in the main content (i.e., in the transport stream of the media content) with the various component streams of the auxiliary content (i.e., the auxiliary data including, but not limited to, the preview video and/or audio content, the one or more poster image files, the one or more box cover image files, the one or more XML files, the one or more DTD files, and/or the like) into a single combined transport stream (which might have the auxiliary data packets sent in additional elementary streams together with the transport stream in the combined transport stream). The combined transport stream might subsequently be sent to one or more user devices over a network (e.g., over network 120 and/or 125 of system 100 in FIG. 1, or the like). The one or more user devices, in some embodiments, might include, without limitation, one or more of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like.

Figure 14:
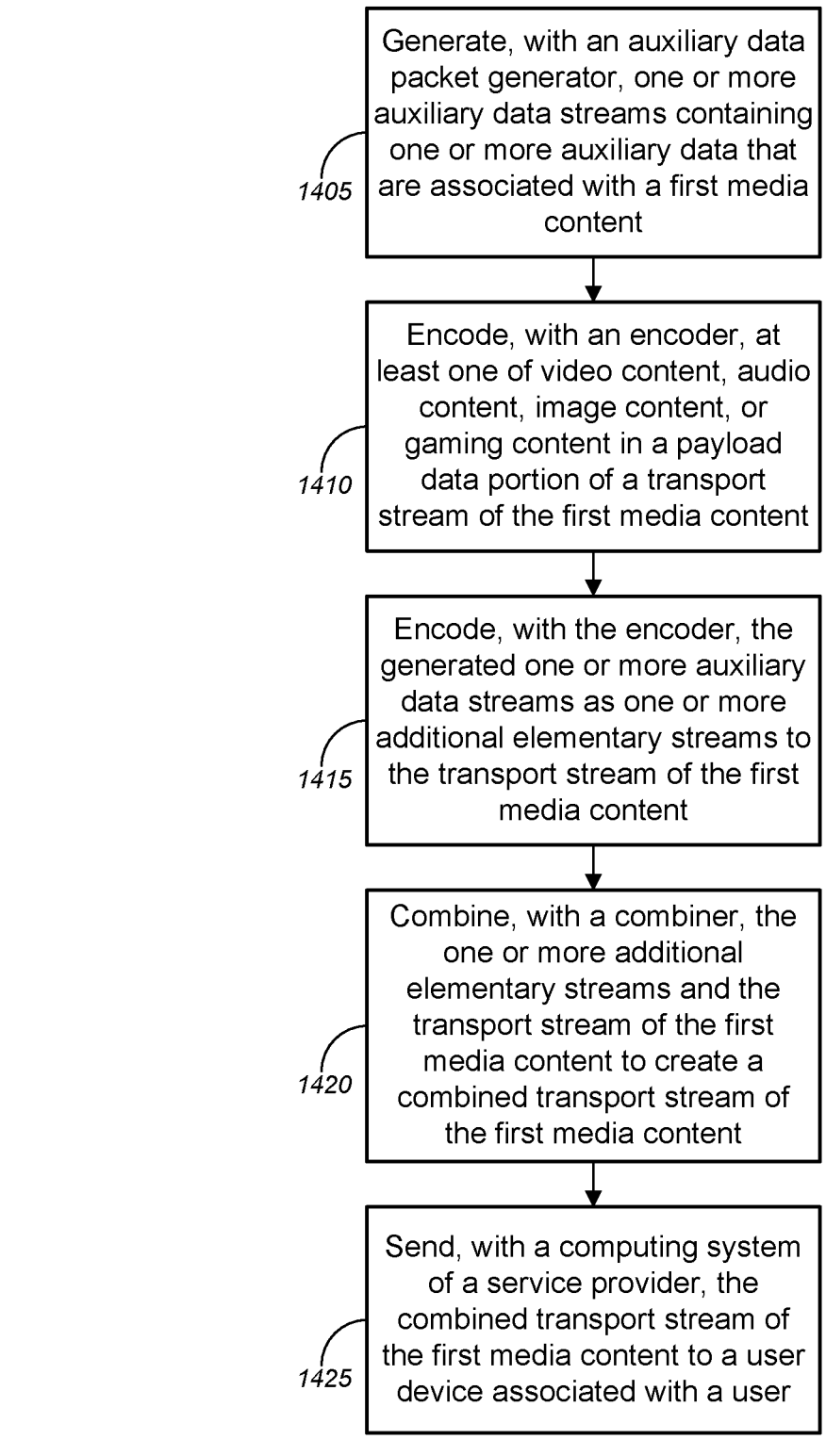
FIG. 14 is a flow diagram illustrating a method for combining auxiliary data as additional elementary streams with a media content transport stream to create a combined transport stream of the media content to implement metadata solutions for media content delivery, in accordance with various embodiments.

FIG. 14 is a flow diagram illustrating a method 1400 for combining auxiliary data as additional elementary streams with a media content transport stream to create a combined transport stream of the media content to implement metadata solutions for media content delivery, in accordance with various embodiments.

While the techniques and procedures are depicted and/or described in a certain order for purposes of illustration, it should be appreciated that certain procedures may be reordered and/or omitted within the scope of various embodiments. Moreover, while the method 1400 illustrated by FIG. 14 can be implemented by or with (and, in some cases, are described below with respect to) the systems 100 and 1300 of FIGS. 1 and 13 respectively (or components thereof), such methods may also be implemented using any suitable hardware (or software) implementation. Similarly, while each of the systems 100 and 1300 of FIGS. 1 and 13, respectively (or components thereof), can operate according to the method 1400 illustrated by FIG. 14 (e.g., by executing instructions embodied on a computer readable medium), the systems 100 and 1300 of FIGS. 1 and 13 can each also operate according to other modes of operation and/or perform other suitable procedures.

In FIG. 14, method 1400, at block 1405, might comprise generating, with an auxiliary data packet generator (which might correspond to auxiliary data packet generator 1305 of system 1300 in FIG. 13), one or more auxiliary data streams containing one or more auxiliary data that are associated with a first media content. Method 1400 might further comprise encoding, with an encoder (which might correspond to encoder 1310 of system 1300 in FIG. 13), at least one of video content (e.g., video-on-demand ("VOD") video content, movie content, television episode content, television program content, music video content, video clip content, etc.), audio content (e.g., music, VOD audio content, movie audio content, television episode audio content, television program audio content, music video audio content, video clip audio content, etc.), image content, gaming content (e.g., cut-scene video and audio content, game play video and audio content, game play dynamic code, character rendering content, environment rendering content, object rendering content, etc.), and/or the like in a payload data portion of a transport stream of the first media content (block 1410) and encoding, with the encoder, the generated one or more auxiliary data streams as one or more additional elementary streams to the transport stream of the first media content (block 1415).

The one or more auxiliary data streams might contain in the payload portions thereof any additional data or metadata associated with the first media content contained in the transport stream. In the case that the first media content is VOD content, the one or more auxiliary data streams might include, without limitation, one or more first auxiliary data streams containing one or more preview (e.g., original theatrical trailer, one or more teaser trailers, one or more alternate trailers, etc.), one or more second auxiliary data streams containing one or more poster images (e.g., original theatrical release poster images, teaser poster images, one or more other poster images, etc.), one or more third auxiliary data streams containing one or more box cover images (e.g., DVD package images, Blu-ray package images, etc.), one or more fourth auxiliary data streams containing one or more extensible markup language ("XML") documents containing metadata of the VOD or other video content or containing location in a network of at least one such XML document, one or more fifth auxiliary data streams containing one or more document type definition ("DTD") documents defining a structure of the metadata contained or referenced by the one or more XML documents or containing location in the network of at least one such DTD document, and/or the like. The header portions of the transport stream and each of the auxiliary data streams of the VOD content might be similar, if not identical to, the header portions as shown and described above with respect to FIGS. 2B and 7B. In some embodiments, a globally unique identifier ("GUID") that is specific to and uniquely identifies a particular media content contained in the transport stream might be embedded, encoded, or inserted in the header of each packet of the transport stream (as described in detail above with respect to FIGS. 2-6). Alternatively, or additionally, audience appropriateness information ("AAI") regarding each of one or more portions of a particular media content contained in the transport stream might be embedded, encoded, or inserted in the header of each packet or I-frame of the transport stream (as described in detail above with respect to FIGS. 7-11). In a similar manner, a GUID that is specific to and uniquely identifies each auxiliary data stream (or additional elementary stream) of the first media content might be embedded, encoded, or inserted in the header of each packet of the particular auxiliary data stream (or additional elementary stream). Alternatively, or additionally, AAI regarding each of one or more portions of particular auxiliary data (i.e., one or more previews of the first media content, one or more poster images, one or more box cover images, and/or the like) might be embedded, encoded, or inserted in the header of each packet or I-frame of the corresponding particular auxiliary data stream (or additional elementary stream).

At block 1420, method 1400 might comprise combining, with a combiner (which might correspond to combiner 1315 of system 1300 in FIG. 13), the one or more additional elementary streams and the transport stream of the first media content to create a combined transport stream of the first media content. Method 1400 might further comprise, at block 1425, sending, with a computing system of a service provider, the combined transport stream of the first media content to a user device associated with a user. The user device associated with the user, in some embodiments, might include, without limitation, one or more of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like.

Figure 15:
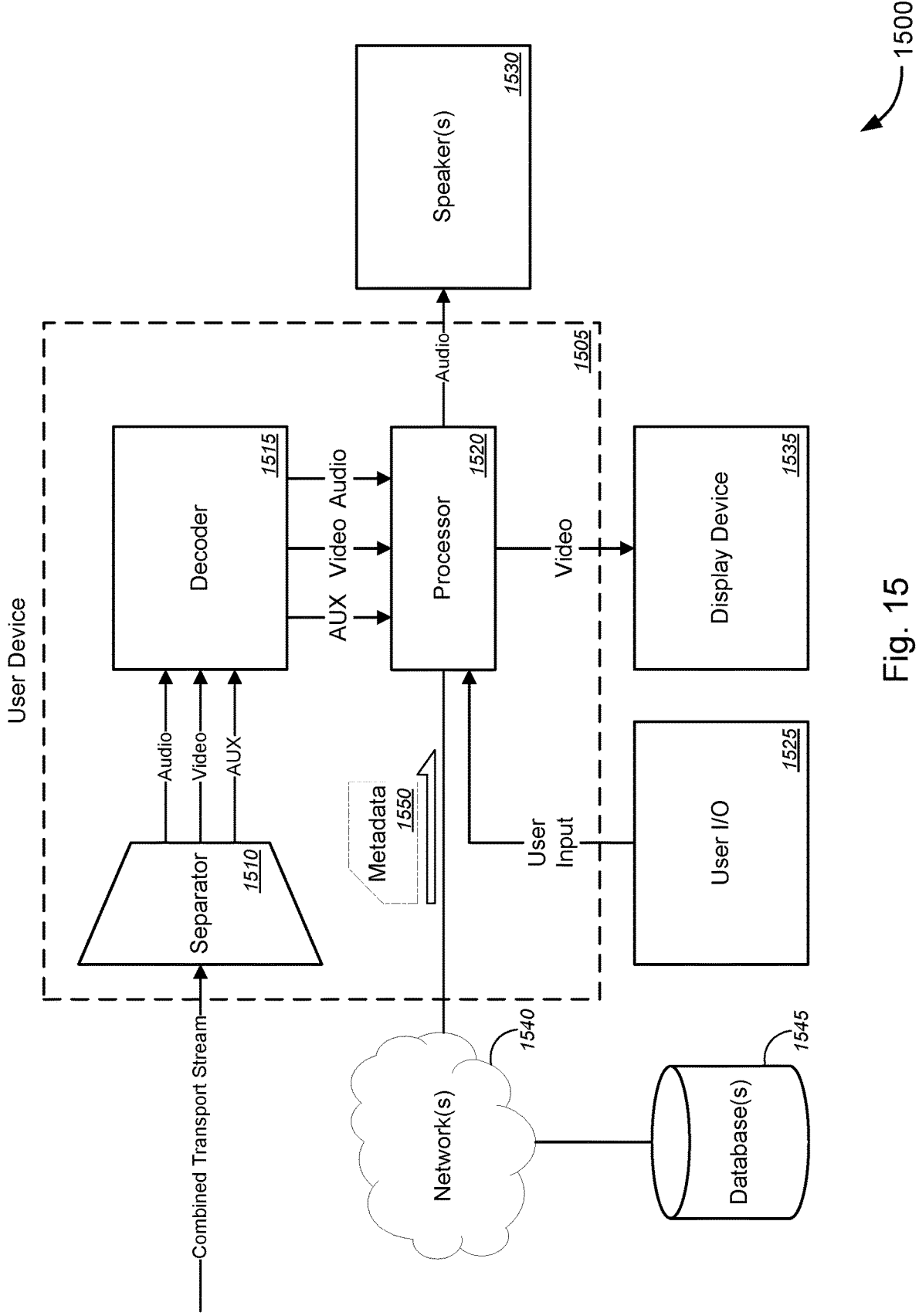
FIG. 15 is a schematic diagram illustrating a system for separating a combined transport stream of the media content to access auxiliary data in additional elementary streams and to access media content in media content transport stream to present the media content based on metadata in the auxiliary data to implement metadata solutions for media content delivery, in accordance with various embodiments.

FIG. 15 is a schematic diagram illustrating a system 1500 for separating a combined transport stream of the media content to access auxiliary data in additional elementary streams and to access media content in media content transport stream to present the media content based on metadata in the auxiliary data to implement metadata solutions for media content delivery, in accordance with various embodiments.

In the non-limiting embodiment of FIG. 15, system 1500 might comprise a user device 1505, a separator 1510, a decoder 1515, a processor 1520, one or more user input (and in some cases, input/output) devices 1525, one or more speakers 1530, one or more display devices 1535, one or more networks 1540, and one or more databases 1545. According to some embodiments, the user device 1505 might include, but is not limited to, at least one of a tablet computer, a desktop computer, a television, a set-top box, a digital video recording/playback device, an audio player (e.g., CD player, MP3 player, etc.), a digital content streaming device, a gaming console, a portable gaming device, a smart phone, a mobile phone, and/or the like. Although FIG. 15 depicts the separator 1510 and the decoder 1515 as being disposed within the user device 1505, the various embodiments are not so limited, and the separator 1510 and/or the decoder 1515 might be separate from (i.e., external to) yet communicatively coupled to the user device 1505, or might be embodied in different user devices. Similarly, although FIG. 15 depicts the speaker(s) 1530, and the display device (s) 1535 as being external to, yet communicatively coupled to the user device 1505, the various embodiments are not so limited, and one or both of the speaker(s) 1530 and/or the display device(s) 1535 might be part of, or disposed within, the user device 1505. For example, the separator 1510 and decoder 1515, in some cases might be disposed within a set-top box or the like, which might send the separated and decoded media content signal to a television or digital video recording/playback device, which might send video data to display device 1535 and audio data to speaker(s) 1530 for presentation of video content (e.g., VOD content or other video content) to the user. Alternatively, the separator 1510 and decoder 1515 might be disposed within a tablet computer or a smart phone, which might present the media content (i.e., video, audio, image, game, and/or the like) to the user via built-in display 1535 (e.g., touchscreen display) and/or via built-in speakers 1530 (e.g., device speakers), and might receive user input via the touchscreen display, which might also serve as the user input (or input/output) device 1525. And so on.

According to some embodiments, the user device 1505 and/or the separator 1510 might receive the combined transport stream comprising the transport stream and one or more auxiliary data streams (or additional elementary streams), and might separate the transport stream into constituent parts (e.g., main video stream, main audio stream, main image stream, main gaming content stream, main metadata stream, auxiliary video stream, auxiliary audio stream, auxiliary image stream, auxiliary gaming content stream, auxiliary metadata stream, etc.). The decoder 1515 might decode the various streams (whether main and/or auxiliary), and might send the various decoded streams to the processor 1520.

The processor 1520 might present to the user via the user input (or input/output) device(s) 1525 options regarding what the user would like to view or listen to (i.e., the main media content, one or more previews of the media content, one or more poster images of the media content, one or more box cover images of the media content, one or more other auxiliary content associated with the media content, and/or the like. In response to receiving the user input regarding what the user would like to view or listen to, the processor 1520 might format the media content audio and/or video stream or the auxiliary stream(s) corresponding to the user selection and might present any selected video content, any selected image content, and/or any selected gaming content to the user via display device(s) 1535 and/or might present any selected audio content to the user via speaker(s) 1530. Prior to presentation, metadata contained in the XML auxiliary data stream (as defined by the metadata structure contained in the DTD auxiliary data stream) might be used to format the selected media content audio and/or video stream or the selected auxiliary streams for presentation by the display device 1535 and/or by the speaker(s) 1530. Based on a determination that the XML documents and/or DTD documents contain location information (e.g., in the form one or more GUIDs, other location identifiers, or the like) for actual, new, updated, or updatable metadata/XML documents/DTD documents/etc., the processor 1520 might access one or more databases 1545 (which might correspond to databases 135a-135n, 145, 115, and/or the like of system 100 of FIG. 1, or might be a third party metadata database, and/or the like) via network(s) 1540 (which might correspond to networks 120 or 125 of system 100 of FIG. 1, or the like) to retrieve metadata 1550 (which might include, but is not limited to, metadata, an XML document containing metadata, and/or a DTD document defining the structure of the metadata, and/or the like). The retrieved metadata, XML documents, and/or DTD documents might likewise be used to format the selected media content audio and/or video stream or the selected auxiliary streams for presentation by the display device 1535 and/or by the speaker(s) 1530. The use of GUIDs or other location information in the headers of the main media content stream and/or in the headers of the auxiliary data streams is described in detail above with respect to FIGS. 2-6, 12, and 14.

In some embodiments, based on a determination that the headers or I-frames of the data packets of the main media content transport stream and/or the headers or I-frames of the data packets of at least one auxiliary stream contains audience appropriateness information ("AAI") or location information for complete, updated, or updatable AAI data for each of the one or more portions of the media content or for each of one or more portions of each auxiliary data (e.g., previews, poster images, box cover images, other auxiliary content associated with the media content, etc.), the processor 1520 might also present to the user via the user input (or input/output) device(s) 1525 (either beforehand or in response to receive at least one packet of the transport stream of the media content) options associated with user preferences regarding ratings levels of one or more portions (e.g., scenes in video content, parts of audio content, portions of an image, scenes or parts of gaming content, etc.) in the media content based at least in part on the AAI for each of the one or more portions of the media content that is contained in the decoded headers (of the packets or I-frames) of the transport stream or regarding ratings levels of one or more portions (e.g., scenes in preview video content, parts of preview audio content, portions of a poster or box cover image, scenes or parts of gaming content, parts of other auxiliary content associated with the media content, etc.) in the auxiliary content based at least in part on the AAI for each of the one or more portions of the auxiliary content that is contained in the decoded headers (of the packets or I-frames) of the one or more auxiliary streams. In some cases, the user input might indicate appropriate ratings levels for adult viewers/listeners/gamers, for child viewers/listeners/gamers (in some cases, at particular ages or age groups), and so on. Alternatively, or additionally, the user input might indicate whether or not to present any or particular ones of portions containing adult content, portions containing disturbing subject matter, portions containing violence, portions containing foul language, portions containing drug use, portions containing people smoking, or portions containing alcohol use, and/or the like (collectively, "one or more objectionable content"). Alternatively, or additionally, the user input might indicate when particular persons—for which content should be filtered to the previously indicated/selected ratings levels or to block the previously indicated/selected one or more objectionable content—has entered the room or has come into viewing/listening range of the media content containing potentially objectionable content. Based on the retrieved AAI (whether decoded/extracted from the header of packets or I-frames of the transport stream and/or the auxiliary stream(s), and/or retrieved from the database 1545 via network 1540) and based on the received user input via the user input (or input/output) device 1525, the processor 1520 might modify the various media content streams and/or auxiliary streams and might present any video content, any image content, and/or any gaming content to the user via display device(s) 1535 and/or might present any audio content to the user via speaker(s) 1530, by filtering (as appropriate) one or more objectionable content (in accordance with the user input and AAI). The use of AAIs or other location information in the headers of the packets or I-frames of the main media content stream and/or in the headers of the packets or I-frames of the auxiliary data streams is described in detail above with respect to FIGS. 7-12 and 14.

Figure 16:
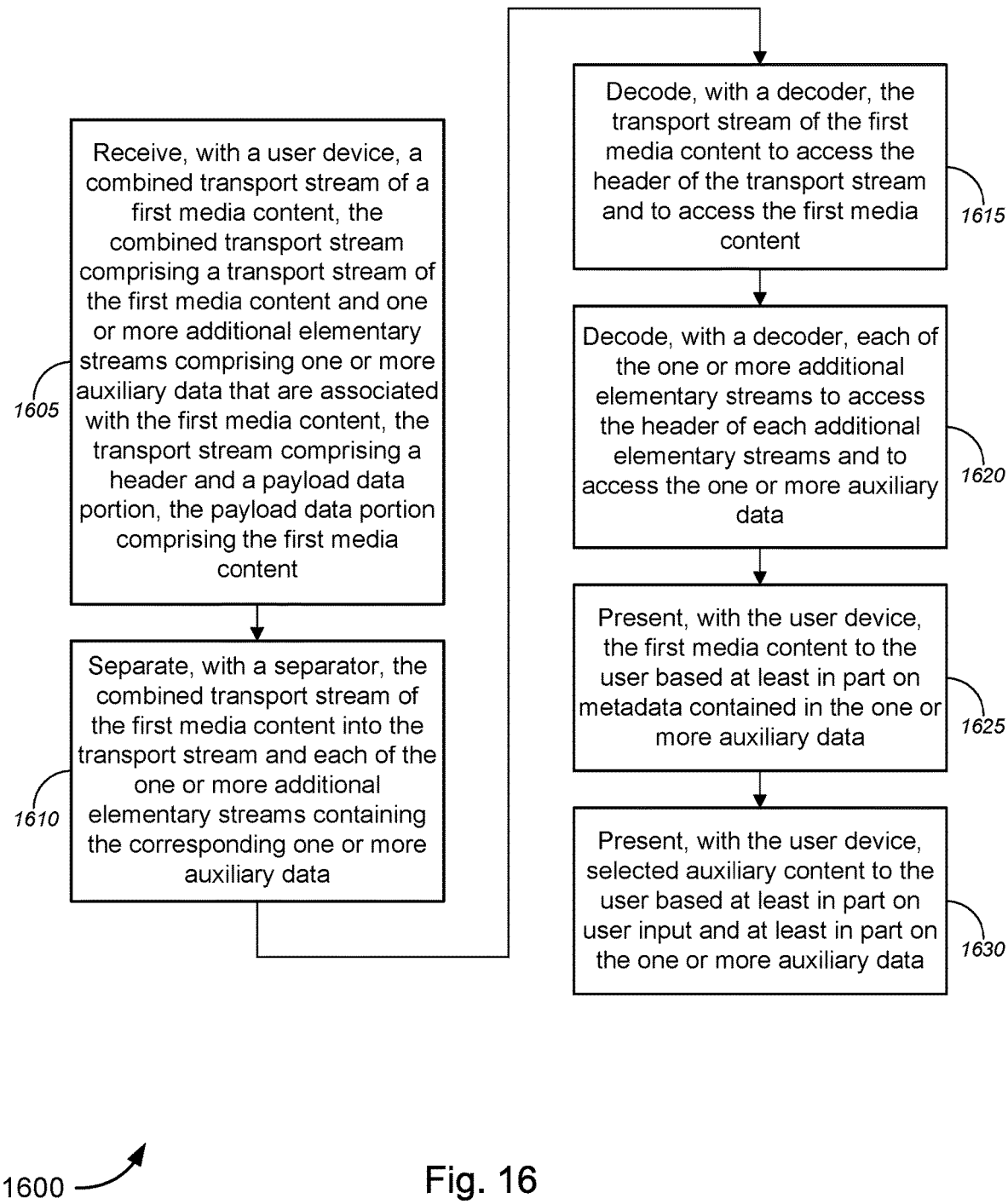
FIG. 16 is a flow diagram illustrating a method for separating a combined transport stream of the media content to access auxiliary data in additional elementary streams and to access media content in media content transport stream to present the media content based on metadata in the auxiliary data to implement metadata solutions for media content delivery, in accordance with various embodiments.

FIG. 16 is a flow diagram illustrating a method 1600 for separating a combined transport stream of the media content to access auxiliary data in additional elementary streams and to access media content in media content transport stream to present the media content based on metadata in the auxiliary data to implement metadata solutions for media content delivery, in accordance with various embodiments.

While the techniques and procedures are depicted and/or described in a certain order for purposes of illustration, it should be appreciated that certain procedures may be reordered and/or omitted within the scope of various embodiments. Moreover, while the method 1600 illustrated by FIG. 16 can be implemented by or with (and, in some cases, are described below with respect to) the systems 100 and 1500 of FIGS. 1 and 15 respectively (or components thereof), such methods may also be implemented using any suitable hardware (or software) implementation. Similarly, while each of the systems 100 and 1500 of FIGS. 1 and 15, respectively (or components thereof), can operate according to the method 1600 illustrated by FIG. 16 (e.g., by executing instructions embodied on a computer readable medium), the systems 100 and 1500 of FIGS. 1 and 15 can each also operate according to other modes of operation and/or perform other suitable procedures.

In FIG. 16, method 1600, at block 1605, might comprise receiving, with a user device (which might correspond to user device 1505 of system 1500 in FIG. 15, or the like), a combined transport stream of a first media content, the combined transport stream comprising a transport stream of the first media content and one or more additional elementary streams (or auxiliary data streams) comprising one or more auxiliary data that are associated with the first media content. The transport stream might comprise a header and a payload data portion. The payload data portion might comprise the first media content. At block 1610, method 1600 might comprise separating, with a separator (which might correspond to separator 1510 of system 1500 in FIG. 15, or the like), the combined transport stream of the first media content into the transport stream and each of the one or more additional elementary streams containing the corresponding one or more auxiliary data.

Method 1600 might further comprise decoding, with a decoder (which might correspond to decoder 1515 of system 1500 in FIG. 15, or the like) that is communicatively coupled to the user device or that is disposed within the user device, the transport stream of the first media content to access the header of the data packets of the transport stream and to access the first media content in the payload of the data packets of the transport stream (block 1615) and decoding, with the decoder, each of the one or more additional elementary streams (or auxiliary data streams) to access the header of each additional elementary stream (or auxiliary data stream) and to access the one or more auxiliary data in the payload of the data packets of each additional elementary stream (or auxiliary data stream) (block 1620).

At block 1625, method 1600 might comprise presenting, with the user device, the first media content to the user based at least in part on the metadata contained in the one or more auxiliary data. Method 1600 might further comprise, at block 1630, presenting, with the user device, selected auxiliary content to the user based at least in part on user input or user selection of auxiliary content to view/listen to and based at least in part on the one or more auxiliary data.

Exemplary System and Hardware Implementation

Figure 17:
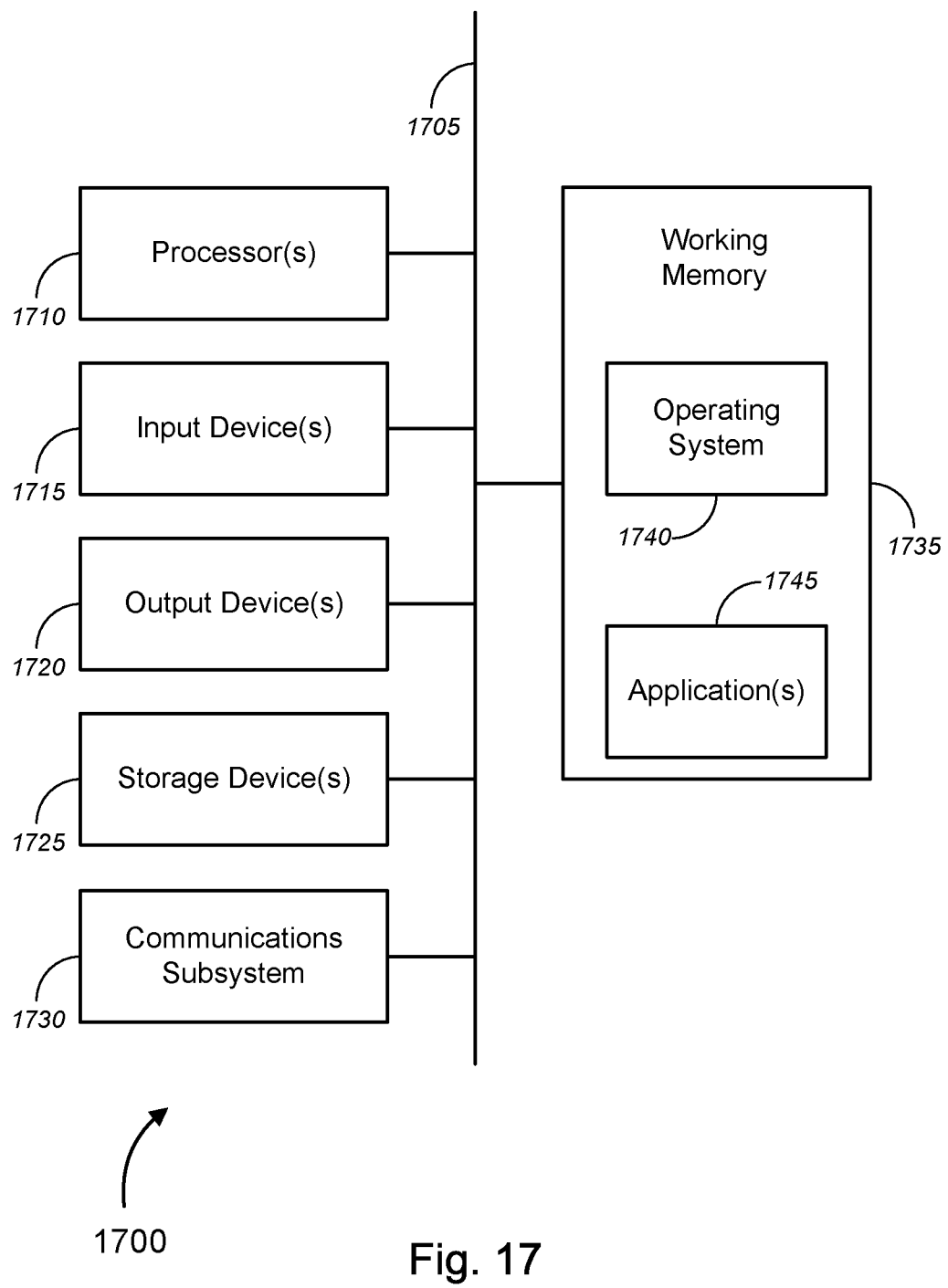
FIG. 17 is a block diagram illustrating an exemplary computer or system hardware architecture, in accordance with various embodiments.

FIG. 17 is a block diagram illustrating an exemplary computer or system hardware architecture, in accordance with various embodiments. FIG. 17 provides a schematic illustration of one embodiment of a computer system 1700 of the service provider system hardware that can perform the methods provided by various other embodiments, as described herein, and/or can perform the functions of computer or hardware system (i.e., computing system 110, content provider servers 130a-130n, content aggregator servers 140, globally unique identifier ("GUID") generators 150a and 305, rating identifier generators 150b and 805, video-on-demand ("VOD") auxiliary data packet generators 150c and 1305, encoders 155, 310, 810, and 1310, combiners 160, 315, 815, and 1315, user devices 170a-170n, 505, 1005, and 1505, separators 180, 510, 1010, and 1510, decoders 185, 515, 1015, and 1515, etc.), as described above. It should be noted that FIG. 17 is meant only to provide a generalized illustration of various components, of which one or more (or none) of each may be utilized as appropriate. FIG. 17, therefore, broadly illustrates how individual system elements may be implemented in a relatively separated or relatively more integrated manner.

The computer or hardware system 1700—which might represent an embodiment of the computer or hardware system (i.e., computing system 110, content provider servers 130a-130n, content aggregator servers 140, GUID generators 150a and 305, rating identifier generators 150b and 805, auxiliary data packet generators 150c and 1305, encoders 155, 310, 810, and 1310, combiners 160, 315, 815, and 1315, user devices 170a-170n, 505, 1005, and 1505, separators 180, 510, 1010, and 1510, decoders 185, 515, 1015, and 1515, etc.), described above with respect to FIGS. 1-16—is shown comprising hardware elements that can be electrically coupled via a bus 1705 (or may otherwise be in communication, as appropriate). The hardware elements may include one or more processors 1710 (e.g., processors 520, 1020, 1520, and/or the like), including, without limitation, one or more general-purpose processors and/or one or more special-purpose processors (such as microprocessors, digital signal processing chips, graphics acceleration processors, and/or the like); one or more input devices 1715, which can include, without limitation, a mouse, a keyboard, and/or the like; and one or more output devices 1720, which can include, without limitation, a display device (e.g., display devices 550, 1050, 1550, and/or the like), a printer, one or more speakers (e.g., speakers 545, 1045, 1545, and/or the like), and/or the like.

The computer or hardware system 1700 may further include (and/or be in communication with) one or more storage devices 1725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 1700 might also include a communications subsystem 1730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or the like. The communications subsystem 1730 may permit data to be exchanged with a network (such as the network described below, to name one example), with other computer or hardware systems, and/or with any other devices described herein. In many embodiments, the computer or hardware system 1700 will further comprise a working memory 1735, which can include a RAM or ROM device, as described above.

The computer or hardware system 1700 also may comprise software elements, shown as being currently located within the working memory 1735, including an operating system 1740, device drivers, executable libraries, and/or other code, such as one or more application programs 1745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1725 described above. In some cases, the storage medium might be incorporated within a computer system, such as the system 1700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 1700 and/or might take the form of source and/or installable code, which, upon compilation and/or installation on the computer or hardware system 1700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1700) to perform methods in accordance with various embodiments of the invention. According to a set of embodiments, some or all of the procedures of such methods are performed by the computer or hardware system 1700 in response to processor 1710 executing one or more sequences of one or more instructions (which might be incorporated into the operating system 1740 and/or other code, such as an application program 1745) contained in the working memory 1735. Such instructions may be read into the working memory 1735 from another computer readable medium, such as one or more of the storage device(s) 1725. Merely by way of example, execution of the sequences of instructions contained in the working memory 1735 might cause the processor(s) 1710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1700, various computer readable media might be involved in providing instructions/code to processor(s) 1710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 1725. Volatile media includes, without limitation, dynamic memory, such as the working memory 1735. In some alternative embodiments, a computer readable medium may take the form of transmission media, which includes, without limitation, coaxial cables, copper wire and fiber optics, including the wires that comprise the bus 1705, as well as the various components of the communication subsystem 1730 (and/or the media by which the communications subsystem 1730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1700. These signals, which might be in the form of electromagnetic signals, acoustic signals, optical signals, and/or the like, are all examples of carrier waves on which instructions can be encoded, in accordance with various embodiments of the invention.

The communications subsystem 1730 (and/or components thereof) generally will receive the signals, and the bus 1705 then might carry the signals (and/or the data, instructions, etc. carried by the signals) to the working memory 1735, from which the processor(s) 1705 retrieves and executes the instructions. The instructions received by the working memory 1735 may optionally be stored on a storage device 1725 either before or after execution by the processor(s) 1710.

Figure 18:
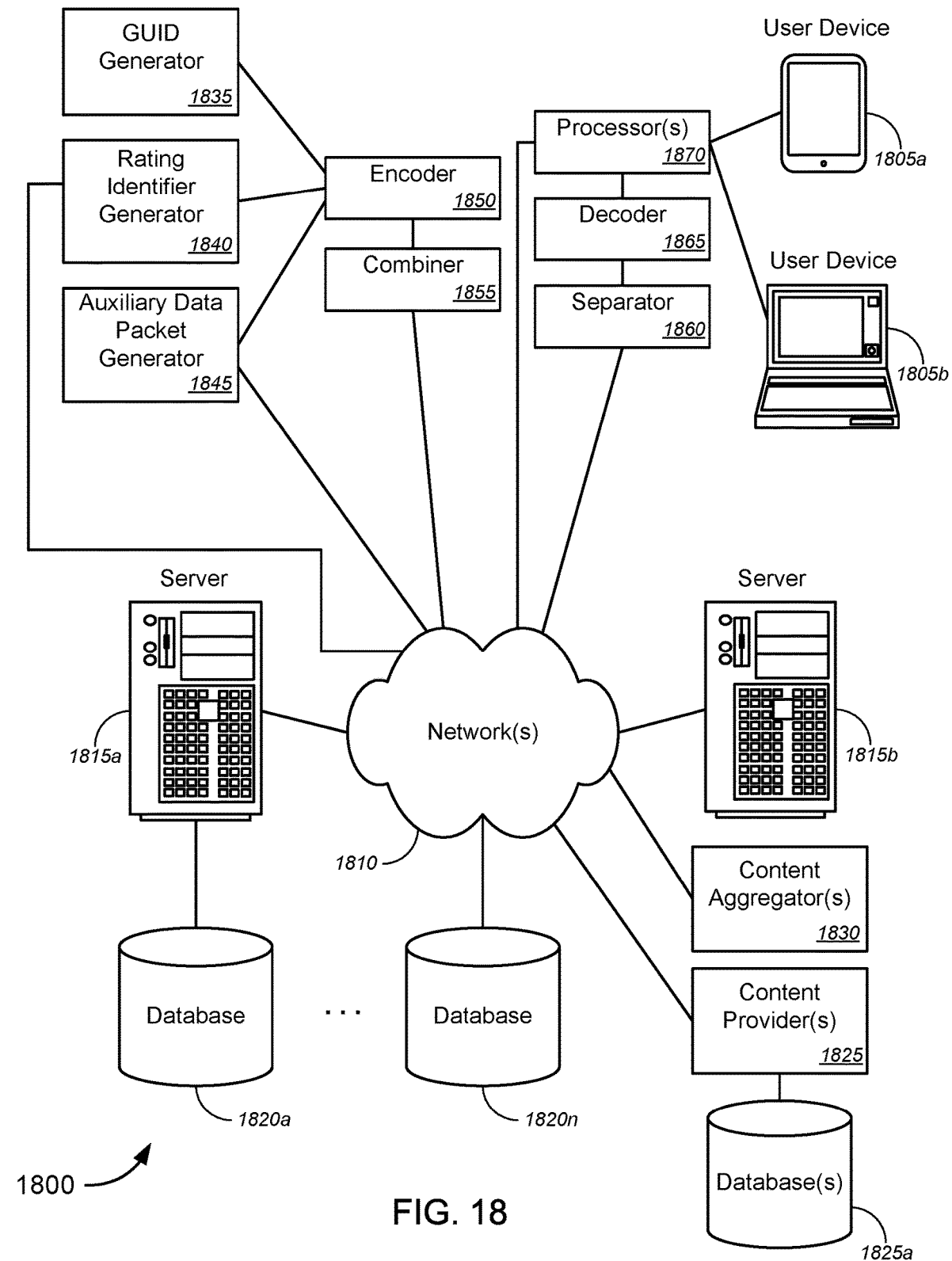
FIG. 18 is a block diagram illustrating an example of a networked system of computers, computing systems, or system hardware architecture, which can be used in accordance with various embodiments.

As noted above, a set of embodiments comprises methods and systems for implementing media content delivery, and, in particular embodiments, to methods, systems, apparatus, and computer software for implementing metadata solutions for media content delivery. FIG. 18 illustrates a schematic diagram of a system 1800 that can be used in accordance with various embodiments. The system 1800 can each include one or more user computers, user devices, or customer devices 1805. A user computer, user device, or customer device 1805 can be a general purpose personal computer (including, merely by way of example, desktop computers, tablet computers, laptop computers, handheld computers, televisions, set-top boxes, digital video recording/playback devices, gaming consoles, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1805 can be any other electronic device, such as a thin-client computer, Internet-enabled mobile telephone, and/or personal digital assistant, capable of communicating via a network (e.g., the network(s) 1810 described below) and/or of displaying and navigating web pages or other types of electronic documents. Although the exemplary system 1800 is shown with two user computers, user devices, or customer devices 1805, any number of user computers, user devices, or customer devices can be supported.

Certain embodiments operate in a networked environment, which can include a network(s) 1810. The network(s) 1810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1810 (similar to networks 120, 125, 525, 1025, and 1525 of FIGS. 1, 5, 10, and 15, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1815. Each of the server computers 1815 may be configured with an operating system, including, without limitation, any of those discussed above, as well as any commercially (or freely) available server operating systems. Each of the servers 1815 may also be running one or more applications, which can be configured to provide services to one or more clients 1805 and/or other servers 1815.

Merely by way of example, one of the servers 1815 might be a data server, a web server, a cloud computing device(s), or the like, as described above. The data server might include (or be in communication with) a web server, which can be used, merely by way of example, to process requests for web pages or other electronic documents from user computers 1805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1805 to perform methods of the invention.

The server computers 1815, in some embodiments, might include one or more application servers, which can be configured with one or more applications accessible by a client running on one or more of the client computers 1805 and/or other servers 1815. Merely by way of example, the server(s) 1815 can be one or more general purpose computers capable of executing programs or scripts in response to the user computers 1805 and/or other servers 1815, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1805 and/or another server 1815. In some embodiments, an application server can perform one or more of the processes for implementing media content delivery, and, in particular embodiments, to methods, systems, apparatus, and computer software for implementing metadata solutions for media content delivery, as described in detail above. Data provided by an application server may be formatted as one or more web pages (comprising HTML, JavaScript, etc., for example) and/or may be forwarded to a user computer 1805 via a web server (as described above, for example). Similarly, a web server might receive web page requests and/or input data from a user computer 1805 and/or forward the web page requests and/or input data to an application server. In some cases, a web server may be integrated with an application server.

In accordance with further embodiments, one or more servers 1815 can function as a file server and/or can include one or more of the files (e.g., application code, data files, etc.) necessary to implement various disclosed methods, incorporated by an application running on a user computer 1805 and/or another server 1815. Alternatively, as those skilled in the art will appreciate, a file server can include all necessary files, allowing such an application to be invoked remotely by a user computer, user device, or customer device 1805 and/or server 1815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1820a-1820n (collectively, "databases 1820"). The location of each of the databases 1820 is discretionary: merely by way of example, a database 1820a might reside on a storage medium local to (and/or resident in) a server 1815a (and/or a user computer, user device, or customer device 1805). Alternatively, a database 1820n can be remote from any or all of the computers 1805, 1815, so long as it can be in communication (e.g., via the network 1810) with one or more of these. In a particular set of embodiments, a database 1820 can reside in a storage-area network ("SAN") familiar to those skilled in the art. (Likewise, any necessary files for performing the functions attributed to the computers 1805, 1815 can be stored locally on the respective computer and/or remotely, as appropriate.) In one set of embodiments, the database 1820 can be a relational database, such as an Oracle database, that is adapted to store, update, and retrieve data in response to SQL-formatted commands. The database might be controlled and/or maintained by a database server, as described above, for example.

With reference to FIG. 18, according to some embodiments, system 1800 might further comprise one or more content provider servers 1825, one or more databases 1825a associated with the one or more content provider servers 1825, one or more content aggregator servers 1830, a GUID generator 1835, a rating identifier generator 1840, an auxiliary data packet generator 1845, a combiner 1855, an encoder 1850, a separator 1860, a decoder 1865, and a processor(s) 1870. In some embodiments, the content provider servers 1825 (from its databases 1825a) might provide one or more media content, along with auxiliary data (including, but not limited to, images, previews, metadata, and information about the metadata, etc.), which might be compiled, collected, or aggregated by the content aggregator servers 1830.

In some embodiments, the GUID generator 1835 might generate a globally unique identifier ("GUID") that is specific to and uniquely identifies a particular media content (including the particular edition, release, version, etc.). The media content might be a video-on-demand ("VOD") content, including, but not limited to, a movie, a television episode, etc. Alternatively, the media content might include, without limitation, (other) video content, audio content, image content, or gaming content, and/or the like. The encoder 1850 and/or the combiner 1855 might encode or insert the GUID in a header of a media content transport stream of the particular media content, and might send the resultant media content transport stream to one or more user devices 1805 via network 1810, in some cases, without the need to concurrently send metadata or any of the auxiliary data to the user devices 1805. The user devices 1805 and/or the separator 1860 (which, in some embodiments, might be disposed within a user device 1805) might receive the transport stream. The separator 1860 might separate the transport stream into its constituent parts (i.e., video, audio, metadata, etc., where applicable), and might send the separated parts to the decoder 1865 for decoding. The decoder 1865 (which may be disposed within the user device or may be separate but communicatively coupled to the user device) might decode the separated parts of the transport stream to access the media content and the GUID in the header of the transport stream, and/or the like. The processor(s) 1870 might use the GUID, which might contain location information for metadata and information about the metadata for the media content, to retrieve the metadata (e.g., an extensible markup language ("XML") document containing the metadata, etc.) and the information about the metadata (e.g., a document type definition ("DTD") document that defines the structure of the metadata, etc.) from the location as indicated in the location information contained in the GUID. The processor(s) 1870 (which might be disposed within the user device 1805 or disposed in a separate but communicatively coupled device) might then format the media content based on the retrieved metadata (as defined in the retrieved DTD document), and might send the formatted media content to the user device(s) 1805 (if separate from the user device) or might present the formatted media content to the user (if part of the user device).

Alternatively, or additionally, according to some embodiments, the rating identifier generator 1840 might generate audience appropriate information ("AAI") regarding each of the one or more portions of the media content. The AAI might include, without limitation, at least one of ratings information for each of the one or more portions of the media content, locations of any inappropriate portions in the first media content, length of any inappropriate portions, or location of an appropriate portion of the first media content to skip to for each inappropriate portion of the first media content, wherein the inappropriate portions each comprise at least one of a portion containing adult content, a portion containing disturbing subject matter, a portion containing violence, a portion containing foul language, a portion containing drug use, a portion containing people smoking, or a portion containing alcohol use, and/or the like. The encoder 1850 and/or the combiner 1855 might encode or insert the AAI or location information associated with the AAI in a header of a media content transport stream, and might send the resultant media content transport stream to one or more user devices 1805 via network 1810. The user devices 1805 and/or the separator 1860 (which, in some embodiments, might be disposed within a user device 1805) might receive the transport stream. The separator 1860 might separate the transport stream into its constituent parts (i.e., video, audio, metadata, etc., where applicable), and might send the separated parts to the decoder 1865 for decoding. The decoder 1865 (which may be disposed within the user device or may be separate but communicatively coupled to the user device) might decode the separated parts of the transport stream to access the media content and the AAI (or location information of the AAI) in the header of the transport stream, and/or the like. In the case that location information of the AAI (rather than the AAI itself) is embedded in the header of the transport stream, the processor(s) 1870 might use the location information of the AAI to retrieve the AAI. The processor(s) 1870 (which might be disposed within the user device 1805 or disposed in a separate but communicatively coupled device) might then provide (or might have previously provided) the user with options associated with user preferences regarding ratings levels of one or more portions in the media content (e.g., scenes in video content, parts of audio content, portions of an image, scenes or parts of gaming content, etc.). Based on user input received in response to providing such options to the user and based on the AAI, the processor(s) 1870 might modify the media content (e.g., by deleting or skipping presentation of particular scenes or portions), and might send the modified media content to the user device(s) 1805 (if separate from the user device) or might present the modified media content to the user (if part of the user device).

Alternatively, or additionally, in some embodiments, the auxiliary data packet generator 1845 might generate auxiliary data in the form of additional elementary streams. The auxiliary data, in the case of VOD content for example, might include, but are not limited to, at least one of a preview content file, a poster image file, a box cover image file, an extensible markup language ("XML") document containing metadata of the VOD content, or a document type definition ("DTD") document defining a structure of the metadata of the VOD content, and/or the like. The various embodiments, however, are not limited to the media content being only VOD content, and the auxiliary data can include any suitable additional or related data associated with the media content. The encoder 1850 might encode the various portions of the media content to form a media content transport stream, and the combiner 1855 might combine the media content transport stream with each of the additional elementary streams to form a combined media content transport stream that is subsequently sent to one or more user devices 1805 via network 1810. The user devices 1805 and/or the separator 1860 (which, in some embodiments, might be disposed within a user device 1805 or may be separate but communicatively coupled to the user device) might receive the combined media content transport stream. The separator 1860 might separate the combined media content transport stream into the transport stream and into each of the additional elementary streams, and might further separate these components into their constituent parts (i.e., video, audio, metadata, etc., where applicable), and might send the separated parts to the decoder 1865 for decoding. The decoder 1865 (which may be disposed within the user device or may be separate but communicatively coupled to the user device) might decode the separated parts of the transport stream to access the media content and the auxiliary data, and/or the like. The processor(s) 1870 (which might be disposed within the user device 1805 or disposed in a separate but communicatively coupled device) might then format the media content based on metadata (as defined by information on the metadata), which might be contained in the auxiliary data, and might send the formatted media content to the user device(s) 1805 (if separate from the user device) or might present the formatted media content to the user (if part of the user device). In some cases, the GUID might be embedded in the header of the transport stream (in the manner as described above) and might provide the system with access to updates to the metadata so that the transport stream and/or the auxiliary data need not be resent to the user devices when metadata updates or other new/updated information associated with the media content are available. Alternatively or additionally, AAI might be embedded in the header of the transport stream (in the manner as described above) and might allow modification of the media content based on the AAI and based on user input received in response to providing to the user options associated with user preferences regarding ratings levels of one or more portions in the media content.

These and other functions of the system 1800 (and its components) are described in greater detail above with respect to FIGS. 1-16.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
encoding, with an encoder, audience appropriateness information regarding each of one or more portions of a first media content in a header of a transport stream of the first media content, wherein the audience appropriateness information encoded within the header of the transport stream and regarding each of the one or more portions of the first media content comprises a location of an appropriate portion of the first media content to skip to for each inappropriate portion of the first media content, the location of the appropriate portion of the first media content to skip to for each inappropriate portion of the first media content being encoded in the header of the transport stream; and
sending, with a computing system of a service provider, the transport stream of the first media content to a user device associated with a user.

2. The method of claim 1, wherein the audience appropriateness information regarding each of the one or more portions of the first media content further comprises ratings information for each of the one or more portions of the first media content, wherein the inappropriate portions each comprises at least one of a portion containing adult content, a portion containing disturbing subject matter, a portion containing violence, a portion containing foul language, a portion containing drug use, a portion containing people smoking, or a portion containing alcohol use.

3. The method of claim 1, wherein encoding the audience appropriateness information regarding each of the one or more portions of the first media content comprises encoding, with the encoder, audience appropriateness information regarding each of the one or more portions of the first media content in a header of each I-frame of the transport stream of the first media content.

4. The method of claim 1, further comprising:
generating, with a rating identifier generator, the audience appropriateness information for each of the one or more portions of the first media content.

5. The method of claim 1, wherein the first media content comprises video on demand ("VOD") content, wherein the one or more portions of the first media content comprise one or more scenes of the VOD content.

6. The method of claim 5, further comprising:
decoding, with a decoder communicatively coupled to the user device, the transport stream of the VOD content to access the header of the transport stream and to access the VOD content;
providing, with the user device, options to the user associated with user preferences regarding ratings levels of one or more scenes in the VOD content based at least in part on the audience appropriateness information for each of the one or more portions of the first media content that is contained in the decoded header of the transport stream;

receiving, with the user device, user input in response to providing the options to the user associated with the user preferences; and presenting, with the user device and on a display screen and through one or more speakers, the VOD content to the user based at least in part on the user input and based at least in part on the audience appropriateness information for each of the one or more portions of the VOD content that is contained in the decoded header of the transport stream.

7. The method of claim 6, wherein the audience appropriateness information further comprises a globally unique identifier ("GUID") that is specific to and uniquely identifies the first media content, wherein the GUID further comprises information regarding locations of an XML document and a DTD document within a network associated with a content provider of the VOD content, wherein the XML document comprises metadata comprising at least one of ratings information for each of the one or more portions of the first media content, locations of any inappropriate portions in the first media content, length of any inappropriate portions, or location of an appropriate portion of the first media content to skip to for each inappropriate portion of the first media content, wherein the method further comprises:

retrieving, with the user device, the XML document and the DTD document of the VOD content based on the information regarding the locations of the XML document and the DTD document within the network associated with the content provider of the VOD content that is contained in the GUID that is encoded in the header of the transport stream;

wherein presenting the VOD content to the user comprises presenting, with the user device and on a display screen and through one or more speakers, the VOD content to the user based at least in part on the user input and at least in part on the audience appropriateness information for each of the one or more portions of the first media content as contained in the metadata contained in the retrieved XML document of the VOD content.

8. The method of claim 7, wherein the GUID uniquely represents characteristics of the VOD content, the characteristics comprising at least one of a VOD package from a particular content provider, name of the particular content provider, title name of the VOD content, one or more actor names associated with the VOD content, series name of the VOD content, release year of the VOD content, run time of the VOD content, rating of the VOD content, issued-to information of the VOD content, director's cut of the VOD content, extended edition of the VOD content, anniversary edition of the VOD content, special edition of the VOD content, or preview of the VOD content.

9. The method of claim 5, wherein the transport stream of the VOD content is a MPEG2 transport stream, and wherein encoding the audience appropriateness information comprises encoding, with the encoder, the audience appropriateness information regarding each of the one or more portions of the VOD content in at least one of an adaptation field, an optional data field, or a private data field of the header of the MPEG2 transport stream of the VOD content.

10. The method of claim 5, wherein the transport stream of the VOD content is a MPEG4 transport stream.

11. The method of claim 1, wherein the first media content comprises at least one of video content, audio content, image content, or gaming content.

12. A media content encoding system, comprising:
a rating identifier generator, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the rating identifier generator to:
generate audience appropriateness information for each of one or more portions of a first media content, wherein the audience appropriateness information regarding each of the one or more portions of the first media content comprises a location of an appropriate portion of the first media content to skip to for each inappropriate portion of the first media content; and
send the generated audience appropriateness information for each of the one or more portions of the first media content to an encoder;

the encoder, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the encoder to:
encode the audience appropriateness information for each of the one or more portions of the first media content in a header of a transport stream of the first media content, wherein the audience appropriateness information encoded within the header of the transport stream and regarding each of the one or more portions of the first media content comprises the location of the appropriate portion of the first media content to skip to for each inappropriate portion of the first media content being encoded in the header of the transport stream; and
send the resultant transport stream of the first media content to a computing system of a service provider; and the computing system of the service provider, the computing system comprising:
at least one third processor; and
a third non-transitory computer readable medium communicatively coupled to the at least one third processor, the third non-transitory computer readable medium having stored thereon computer software comprising a third set of instructions that, when executed by the at least one third processor, causes the computing system to:
receive the transport stream of the first media content; and
send the transport stream of the first media content to a user device associated with a user.

13. The media content encoding system of claim 12, wherein the audience appropriateness information regarding each of the one or more portions of the first media content further comprises ratings information for each of the one or more portions of the first media content, wherein the inappropriate portions each comprise at least one of a portion containing adult content, a portion containing disturbing subject matter, a portion containing violence, a portion containing foul language, a portion containing drug use, a portion containing people smoking, or a portion containing alcohol use.

14. The media content encoding system of claim 12, wherein encoding the audience appropriateness information regarding each of the one or more portions of the first media content comprises encoding, with the encoder, audience appropriateness information regarding each of the one or more portions of the first media content in a header of each I-frame of the transport stream of the first media content.

15. The media content encoding system of claim 12, wherein the first media content comprises video on demand ("VOD") content, wherein the one or more portions of the first media content comprise one or more scenes of the VOD content.

16. The media content encoding system of claim 15, wherein the audience appropriateness information further comprises a globally unique identifier ("GUID") that is specific to and uniquely identifies the first media content, wherein the GUID further comprises information regarding locations of an XML document and a DTD document within a network associated with a content provider of the VOD content, wherein the XML document comprises metadata comprising at least one of ratings information for each of the one or more portions of the first media content, locations of any inappropriate portions in the first media content, length of any inappropriate portions, or location of an appropriate portion of the first media content to skip to for each inappropriate portion of the first media content.

17. The media content encoding system of claim 15, wherein the transport stream of the VOD content is a MPEG2 transport stream, and wherein encoding the audience appropriateness information comprises encoding, with the encoder, the audience appropriateness information regarding each of the one or more portions of the VOD content in at least one of an adaptation field, an optional data field, or a private data field of the header of the MPEG2 transport stream of the VOD content.

18. The media content encoding system of claim 15, wherein the transport stream of the VOD content is a MPEG4 transport stream.

19. The media content encoding system of claim 12, wherein the first media content comprises at least one of video content, audio content, image content, or gaming content.

20. The media content encoding system of claim 19, wherein the second set of instructions, when executed by the at least one second processor, further causes the encoder to:
encode the at least one of video content, audio content, image content, or gaming content in a payload data portion of the transport stream of the first media content.

21. A method, comprising:
receiving, with a user device, a transport stream of a first media content, the transport stream comprising a header and a payload data portion, the payload data portion comprising the first media content and the header comprising audience appropriateness information regarding each of one or more portions of the first media content, wherein the audience appropriateness information encoded within the header of the transport stream and regarding each of the one or more portions of the first media content comprises a location of an appropriate portion of the first media content to skip to for each inappropriate portion of the first media content;
decoding, with a decoder communicatively coupled to the user device, the transport stream of the first media content to access the header of the transport stream and to access the first media content;
providing, with the user device, options to the user associated with user preferences regarding ratings levels of one or more portions of the first media content based at least in part on the audience appropriateness information for each of the one or more portions of the first media content that is contained in the decoded header of the transport stream;
receiving, with the user device, user input in response to providing the options to the user associated with the user preferences; and
presenting, with the user device, the first media content to the user based at least in part on the user input and based at least in part on the audience appropriateness information for each of the one or more portions of the first media content that is contained in the decoded header of the transport stream.

22. The method of claim 21, wherein the audience appropriateness information further comprises a globally unique identifier ("GUID") that is specific to and uniquely identifies the first media content, wherein the GUID further comprises information regarding locations of an XML document and a DTD document within a network associated with a content provider of the first media content, wherein the XML document comprises metadata comprising at least one of ratings information for each of the one or more portions of the first media content, locations of any inappropriate portions in the first media content, length of any inappropriate portions, or location of an appropriate portion of the first media content to skip to for each inappropriate portion of the first media content.

23. The method of claim 22, further comprising:
retrieving, with the user device, the XML document and the DTD document of the first media content based on the information regarding the locations of the XML document and the DTD document within the network associated with the content provider of the first media content that is contained in the GUID that is encoded in the header of the transport stream;
wherein presenting the first media content to the user comprises presenting, with the user device, the first media content to the user based at least in part on the user input and at least in part on the audience appropriateness information for each of the one or more portions of the first media content as contained in the metadata contained in the retrieved XML document of the first media content.

24. The method of claim 22, wherein the GUID uniquely represents characteristics of the first media content, the characteristics comprising at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content.

25. The method of claim 21, wherein the first media content comprises at least one of video content, audio content, image content, or gaming content.

26. The method of claim 21, wherein the first media content comprises video on demand ("VOD") content, wherein the transport stream of the VOD content is a MPEG2 transport stream, and wherein encoding the generated audience appropriateness information in the header of the transport stream of the first media content comprises encoding, with the encoder, the generated audience appropriateness information in at least one of an adaptation field, an optional data field, or a private data field of the header of the MPEG2 transport stream of the VOD content.

27. The method of claim 21, wherein the transport stream of the VOD content is a MPEG4 transport stream.

28. A media content decoding system, comprising:
a user device, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the user device to:
receive a transport stream of a first media content, the transport stream comprising a header and a payload data portion, the payload data portion comprising the first media content and the header comprising audience appropriateness information regarding each of one or more portions of the first media content, wherein the audience appropriateness information encoded within the header of the transport stream and regarding each of the one or more portions of the first media content comprises a location of an appropriate portion of the first media content to skip to for each inappropriate portion of the first media content; and
a decoder communicatively coupled to the user device, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the decoder to:
decode the transport stream of the first media content to access the header of the transport stream and to access the first media content;
wherein the first set of instructions, when executed by the at least one first processor, further causes the user device to:
provide options to the user associated with user preferences regarding ratings levels of one or more portions of the first media content based at least in part on the audience appropriateness information for each of the one or more portions of the first media content that is contained in the decoded header of the transport stream;
receive user input in response to providing the options to the user associated with the user preferences; and
present the first media content to the user based at least in part on the user input and based at least in part on the audience appropriateness information for each of the one or more portions of the first media content that is contained in the decoded header of the transport stream.

29. The media content decoding system of claim 28, wherein the audience appropriateness information further comprises a globally unique identifier ("GUID") that is specific to and uniquely identifies the first media content, wherein the GUID further comprises information regarding locations of an XML document and a DTD document within a network associated with a content provider of the first media content, wherein the XML document comprises metadata comprising at least one of ratings information for each of the one or more portions of the first media content, locations of any inappropriate portions in the first media content, length of any inappropriate portions, or location of an appropriate portion of the first media content to skip to for each inappropriate portion of the first media content.

30. The media content decoding system of claim 29, wherein the first set of instructions, when executed by the at least one first processor, further causes the user device to:
retrieve the XML document and the DTD document of the first media content based on the information regarding the locations of the XML document and the DTD document within the network associated with the content provider of the first media content that is contained in the GUID that is encoded in the header of the transport stream;
wherein presenting the first media content to the user comprises presenting, with the user device, the first media content to the user based at least in part on the user input and at least in part on the audience appropriateness information for each of the one or more portions of the first media content as contained in the metadata contained in the retrieved XML document of the first media content.

31. The media content decoding system of claim 29, wherein the GUID uniquely represents characteristics of the first media content, the characteristics comprising at least one of a media content package from a particular content provider, name of the particular content provider, title name of the first media content, one or more artist names or actor names associated with the first media content, series name or album name of the first media content, release year of the first media content, run time of the first media content, rating of the first media content, issued-to information of the first media content, director's cut of the first media content, extended edition of the first media content, anniversary edition of the first media content, special edition of the first media content, or preview of the first media content.

32. The media content decoding system of claim 28, wherein the first media content comprises at least one of video content, audio content, image content, or gaming content.

33. The media content decoding system of claim 28, wherein the first media content comprises video on demand ("VOD") content, wherein the transport stream of the VOD content is a MPEG2 transport stream, and wherein encoding the generated audience appropriateness information in the header of the transport stream of the first media content comprises encoding, with the encoder, the generated audience appropriateness information in at least one of an adaptation field, an optional data field, or a private data field of the header of the MPEG2 transport stream of the VOD content.

34. The media content decoding system of claim 28, wherein the transport stream of the VOD content is a MPEG4 transport stream.

* * * * *